(12) United States Patent
Voicu et al.

(10) Patent No.: US 12,529,771 B2
(45) Date of Patent: Jan. 20, 2026

(54) RECONSTRUCTION OF PULSED SIGNALS

(71) Applicant: Luminar Technologies, Inc., Orlando, FL (US)

(72) Inventors: Liviu I. Voicu, Casselberry, FL (US); Christopher Gary Sentelle, Orlando, FL (US)

(73) Assignee: Luminar Technologies, Inc., Orlando, FL (US)

( * ) Notice: Subject to any disclaimer, the term of this patent is extended or adjusted under 35 U.S.C. 154(b) by 889 days.

(21) Appl. No.: 17/709,991

(22) Filed: Mar. 31, 2022

(65) Prior Publication Data
US 2022/0317267 A1 Oct. 6, 2022

Related U.S. Application Data

(60) Provisional application No. 63/170,165, filed on Apr. 2, 2021.

(51) Int. Cl.
| | | |
|---|---|---|
| *G01S 7/48* | (2006.01) | |
| *G01S 7/486* | (2020.01) | |
| *G01S 7/4865* | (2020.01) | |
| *G01S 17/26* | (2020.01) | |
| *G01S 17/931* | (2020.01) | |

(52) U.S. Cl.
CPC .......... *G01S 7/4865* (2013.01); *G01S 7/4868* (2013.01); *G01S 17/26* (2020.01); *G01S 17/931* (2020.01)

(58) Field of Classification Search
None
See application file for complete search history.

(56) References Cited

U.S. PATENT DOCUMENTS

| | | |
|---|---|---|
| 2011/0294450 A1 | 12/2011 | Budianu et al. |
| 2019/0101625 A1 | 4/2019 | LaPlante et al. |
| 2019/0129009 A1 | 5/2019 | Eichenholz et al. |
| 2020/0142039 A1* | 5/2020 | Liu .................. G01S 7/4865 |

FOREIGN PATENT DOCUMENTS

WO 2020/061967 4/2020

OTHER PUBLICATIONS

International Search Report and Written Opinion for PCT/US2022/022739 dated Jul. 15, 2022.

* cited by examiner

*Primary Examiner* — Hovhannes Baghdasaryan
(74) *Attorney, Agent, or Firm* — Van Pelt, Yi & James LLP

(57) ABSTRACT

A system includes a signal transmitter configured to emit a signal pulse and a signal receiver configured to receive one or more reflected pulses of the emitted signal pulse, wherein the signal receiver includes a plurality of comparators configured to sample the one or more reflected pulses at different intensity threshold levels to determine a group of slices representative of the received one or more reflected pulses, wherein each slice of at least a portion of the group of slices identifies a corresponding timing of when at least a portion of the received one or more reflected pulses met a corresponding intensity threshold level. The system further includes one or more processors configured to use the determined slices to reconstruct the one or more reflected pulses.

20 Claims, 30 Drawing Sheets

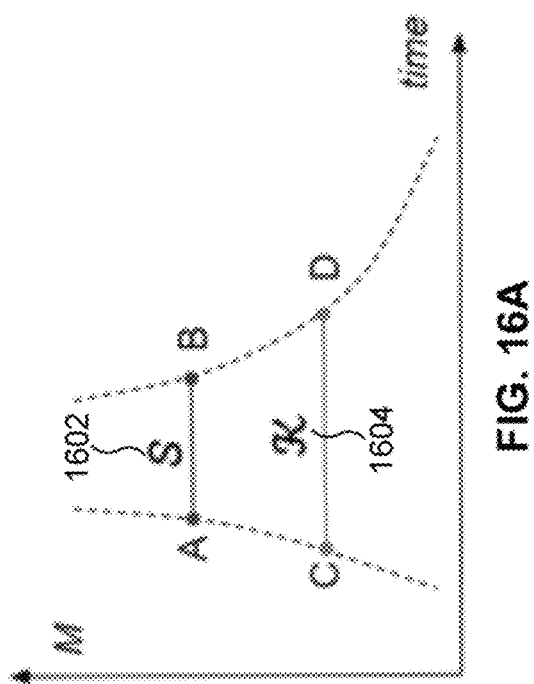

FIG. 19

1902 — Layer 0 – Layer 1 u-Nodes / d-Nodes

| u-Nodes \ d-Nodes | | | | | | |
|---|---|---|---|---|---|---|
| 0 | 1 | 1 | 1 | 1 | 1 | 1 |
| 0 | 1 | 1 | 1 | 1 | 1 | 1 |
| 1 | 1 | 0 | 1 | 1 | 1 | 1 |
| 1 | 1 | 1 | 1 | 0 | 1 | 1 |
| 1 | 1 | 1 | 1 | 1 | 0 | 1 |
| 1 | 1 | 1 | 1 | 1 | 1 | 0 |

1904 — Sparse Representation

| Rows | 1 | 2 | 3 | 4 | 5 | 6 |
|---|---|---|---|---|---|---|
| Cols | 1 | 3 | 3 | 6 | 7 | 8 |

1906 — Rises and falls before floating pulse restoration (Layer 0)

| Rises | 20 | 300 | 420 | 540 | 640 | 820 | 920 |
|---|---|---|---|---|---|---|---|
| Falls | 180 | 360 | 500 | 600 | 700 | 860 | 980 |

1908 — Rises and falls after floating pulse restoration (Layer 0)

| Rises | 20 | 300 | 420 | 540 | 640 | 740 | 820 | 920 |
|---|---|---|---|---|---|---|---|---|
| Falls | 180 | 360 | 500 | 600 | 700 | 780 | 860 | 980 |

RECONSTRUCTION OF PULSED SIGNALS

CROSS REFERENCE TO OTHER APPLICATIONS

This application claims priority to U.S. Provisional Patent Application No. 63/170,165 entitled RECONSTRUCTION OF PULSED SIGNALS filed Apr. 2, 2021, which is incorporated herein by reference for all purposes.

BACKGROUND OF THE INVENTION

Light detection and ranging (lidar) is a technology that can be used to measure distances to remote targets. Typically, a lidar system includes a light source and an optical receiver. The light source can include, for example, a laser which emits light having a particular operating wavelength. The operating wavelength of a lidar system may lie, for example, in the infrared, visible, or ultraviolet portions of the electromagnetic spectrum. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

BRIEF DESCRIPTION OF THE DRAWINGS

Various embodiments of the invention are disclosed in the following detailed description and the accompanying drawings.

FIGS. 16A and 16B illustrate determination of a connection cost.

FIG. 19 illustrates cost matrix updates reflecting corrections for the floating pulses in FIG. 12.

DETAILED DESCRIPTION

Figure 1:
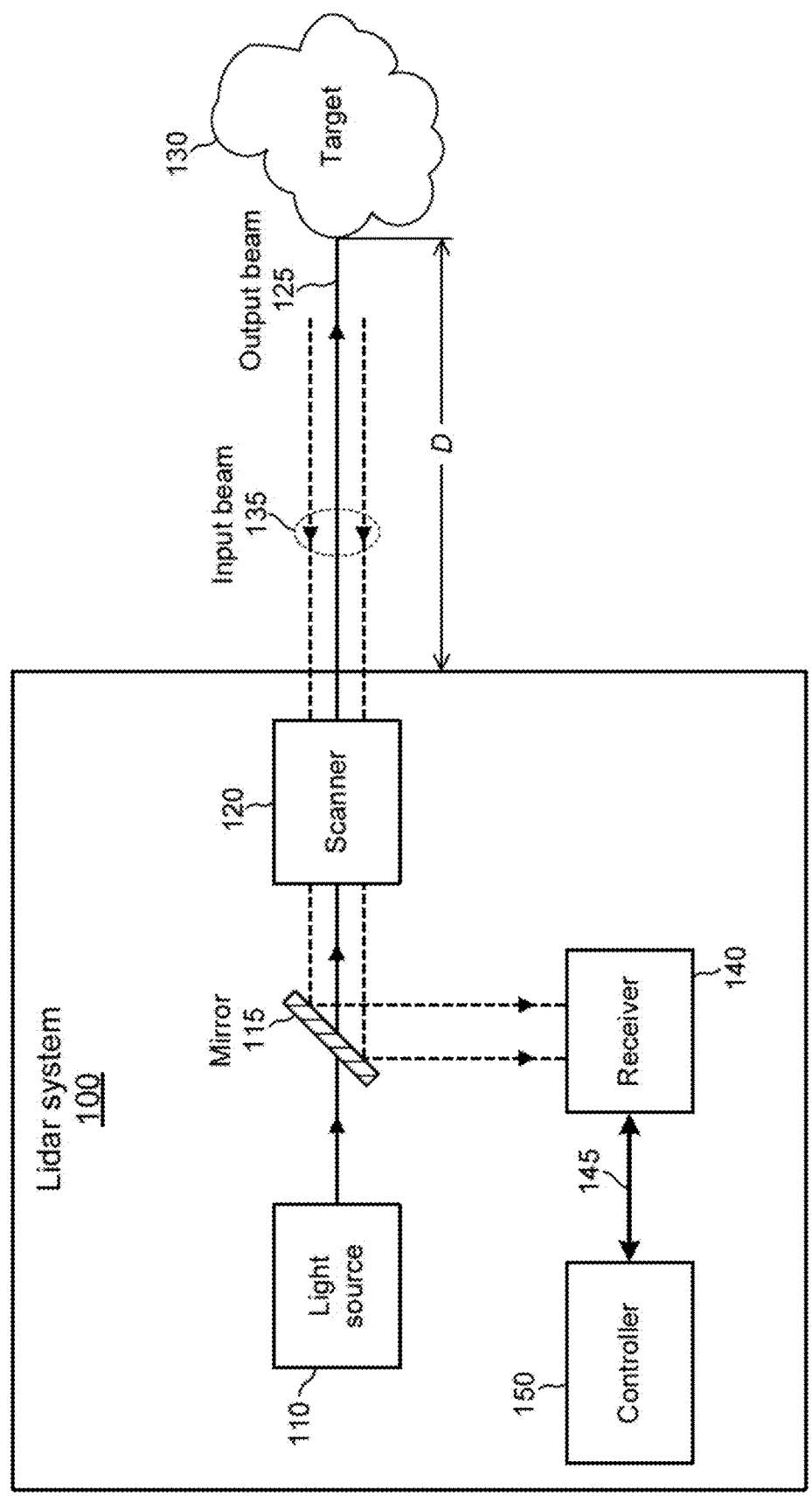
FIG. 1 illustrates an example light detection and ranging (lidar) system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system includes a signal transmitter configured to emit a signal pulse and a signal receiver configured to receive one or more reflected pulses of the emitted signal pulse, wherein the signal receiver includes a plurality of comparators configured to sample the one or more reflected pulses at different intensity threshold levels to determine a group of slices representative of the received one or more reflected pulses, wherein each slice of at least a portion of the group of slices identifies a corresponding timing of when at least a portion of the received one or more reflected pulses met a corresponding intensity threshold level. The system further includes one or more processors configured to use the determined slices to reconstruct the one or more reflected pulses including by being configured to analyze timing overlaps between a first subgroup of one or more slices of the determined slices at a first threshold level of the different intensity threshold levels and a second subgroup of one or more slices of the determined slices at a second threshold level of the different intensity threshold levels.

This disclosure generally relates to pulse reconstruction from sparse or nonuniform samples. In particular embodiments, these samples are generated by a lidar system (e.g., lidar system 100 as described below). The techniques disclosed herein may also be applied to samples generated by other types of ranging systems, such as radio detection and ranging (radar), sound navigation and ranging (sonar), ultrasound, and other systems in which pulses carrying information can return to a receiver with one or more of the problems described herein for which the techniques disclosed herein are utilized to solve. Technological advantages of the techniques disclose herein include accurate reconstruction of reflected pulses with various types of pulse artifacts and computational efficiency. The techniques disclosed herein solve the problem of how to accurately and efficiently reconstruct pulses under difficult conditions that produce pulse artifacts.

FIG. 1 illustrates an example light detection and ranging (lidar) system 100. In particular embodiments, a lidar system 100 may be referred to as a laser ranging system, a laser radar system, a LIDAR system, a lidar sensor, or a laser detection and ranging (LADAR or ladar) system. In particular embodiments, a lidar system 100 may include a light source 110, mirror 115, scanner 120, receiver 140, or controller 150. The light source 110 may include, for example, a laser which emits light having a particular operating wavelength in the infrared, visible, or ultraviolet portions of the electromagnetic spectrum. As an example, light source 110 may include a laser with one or more operating wavelengths between approximately 900 nanometers (nm) and 2000 nm. The light source 110 emits an output beam of light 125 which may be continuous wave (CW), pulsed, or modulated in any suitable manner for a given application. The output beam of light 125 is directed downrange toward a remote target 130. As an example, the remote target 130 may be located a distance D of approximately 1 m to 1 km from the lidar system 100.

Once the output beam 125 reaches the downrange target 130, the target may scatter or reflect at least a portion of light from the output beam 125, and some of the scattered or reflected light may return toward the lidar system 100. In the example of FIG. 1, the scattered or reflected light is represented by input beam 135, which passes through scanner 120 and is reflected by mirror 115 and directed to receiver 140. In particular embodiments, a relatively small fraction of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (μJ), then the pulse energy of a corresponding pulse of input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, 1 aJ, or 0.1 aJ.

In particular embodiments, output beam 125 may include or may be referred to as an optical signal, output optical signal, emitted optical signal, emitted pulse of light, laser beam, light beam, optical beam, emitted beam, emitted light, emitted signal pulse, or beam. In particular embodiments, input beam 135 may include or may be referred to as a received optical signal, received pulse of light, input pulse of light, input optical signal, return beam, received beam, return light, received light, input light, scattered light, reflected pulse, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In particular embodiments, receiver 140 may receive or detect photons from input beam 135 and produce one or more representative signals. For example, the receiver 140 may produce an output electrical signal 145 that is representative of the input beam 135, and the electrical signal 145 may be sent to controller 150. In particular embodiments, receiver 140 or controller 150 may include a processor, computing system (e.g., an ASIC or FPGA), or other suitable circuitry. A controller 150 may be configured to analyze one or more characteristics of the electrical signal 145 from the receiver 140 to determine one or more characteristics of the target 130, such as its distance downrange from the lidar system 100. This may be done, for example, by analyzing a time of flight or a frequency or phase of a transmitted beam of light 125 or a received beam of light 135. If lidar system 100 measures a time of flight of $\Delta T$ (e.g., $\Delta T$ represents a round-trip time of flight for an emitted pulse of light to travel from the lidar system 100 to the target 130 and back to the lidar system 100), then the distance D from the target 130 to the lidar system 100 may be expressed as $D = c \cdot \Delta T / 2$, where c is the speed of light (approximately $3.0 \times 10^8$ m/s). As an example, if a time of flight is measured to be $\Delta T = 300$ ns, then the distance from the target 130 to the lidar system 100 may be determined to be approximately $D = 45.0$ m. As another example, if a time of flight is measured to be $\Delta T = 1.33$ μs, then the distance from the target 130 to the lidar system 100 may be determined to be approximately $D = 199.5$ m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed or CW laser. As an example, light source 110 may be a pulsed laser configured to produce or emit pulses of light with a pulse duration or pulse width of approximately 10 picoseconds (ps) to 100 nanoseconds (ns). The pulses may have a pulse duration ($\Delta \tau$) of approximately 100 ps, 200 ps, 400 ps, 1 ns, 2 ns, 5 ns, 10 ns, 20 ns, 50 ns, 100 ns, or any other suitable pulse duration. As another example, light source 110 may be a pulsed laser that produces pulses with a pulse duration of approximately 1-5 ns. As another example, light source 110 may be a pulsed laser that produces pulses at a pulse repetition frequency of approximately 80 kHz to 10 MHz or a pulse period (e.g., a time between consecutive pulses) of approximately 100 ns to 12.5 μs. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 μs. As another example, light source 110 may have a pulse repetition frequency (which may be referred to as a repetition rate) that can be varied from approximately 200 kHz to 3 MHz. As used herein, a pulse of light may be referred to as an optical pulse, a light pulse, or a pulse.

In particular embodiments, light source 110 may include a pulsed or CW laser that produces a free-space output beam 125 having any suitable average optical power. As an example, output beam 125 may have an average power of approximately 1 milliwatt (mW), 10 mW, 100 mW, 1 watt (W), 10 W, or any other suitable average power. In particular embodiments, output beam 125 may include optical pulses with any suitable pulse energy or peak optical power. As an example, output beam 125 may include pulses with a pulse energy of approximately 0.01 μJ, 0.1 μJ, 0.5 μJ, 1 μJ, 2 μJ, 10 μJ, 100 μJ, 1 mJ, or any other suitable pulse energy. As another example, output beam 125 may include pulses with a peak power of approximately 10 W, 100 W, 1 kW, 5 kW, 10 kW, or any other suitable peak power. The peak power ($P_{peak}$) of a pulse of light can be related to the pulse energy (E) by the expression $E=P_{peak} \cdot \Delta t$, where $\Delta t$ is the duration of the pulse, and the duration of a pulse may be defined as the full width at half maximum duration of the pulse. For example, an optical pulse with a duration of 1 ns and a pulse energy of 10 has a peak power of approximately 1 kW. The average power ($P_{av}$) of an output beam 125 can be related to the pulse repetition frequency (PRF) and pulse energy by the expression $P_{av}=PRF \cdot E$. For example, if the pulse repetition frequency is 500 kHz, then the average power of an output beam 125 with 1-μJ pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, a vertical-cavity surface-emitting laser (VCSEL), a quantum dot laser diode, a grating-coupled surface-emitting laser (GCSEL), a slab-coupled optical waveguide laser (SCOWL), a single-transverse-mode laser diode, a multi-mode broad area laser diode, a laser-diode bar, a laser-diode stack, or a tapered-stripe laser diode. As an example, light source 110 may include an aluminum-gallium-arsenide (AlGaAs) laser diode, an indium-gallium-arsenide (InGaAs) laser diode, an indium-gallium-arsenide-phosphide (InGaAsP) laser diode, or a laser diode that includes any suitable combination of aluminum (Al), indium (In), gallium (Ga), arsenic (As), phosphorous (P), or any other suitable material. In particular embodiments, light source 110 may include a pulsed or CW laser diode with a peak emission wavelength between 1200 nm and 1600 nm. As an example, light source 110 may include a current-modulated InGaAsP DFB laser diode that produces optical pulses at a wavelength of approximately 1550 nm. As another example, light source 110 may include a laser diode that emits light at a wavelength between 1500 nm and 1510 nm.

In particular embodiments, light source 110 may include a pulsed or CW laser diode followed by one or more optical-amplification stages. For example, a seed laser diode may produce a seed optical signal, and an optical amplifier may amplify the seed optical signal to produce an amplified optical signal that is emitted by the light source 110. In particular embodiments, an optical amplifier may include a fiber-optic amplifier or a semiconductor optical amplifier (SOA). For example, a pulsed laser diode may produce relatively low-power optical seed pulses which are amplified by a fiber-optic amplifier. As another example, a light source 110 may include a fiber-laser module that includes a current-modulated laser diode with an operating wavelength of approximately 1550 nm followed by a single-stage or a multi-stage erbium-doped fiber amplifier (EDFA) or erbium-ytterbium-doped fiber amplifier (EYDFA) that amplifies the seed pulses from the laser diode. As another example, light source 110 may include a continuous-wave (CW) or quasi-CW laser diode followed by an external optical modulator (e.g., an electro-optic amplitude modulator). The optical modulator may modulate the CW light from the laser diode to produce optical pulses which are sent to a fiber-optic amplifier or SOA. As another example, light source 110 may include a pulsed or CW seed laser diode followed by a semiconductor optical amplifier (SOA). The SOA may include an active optical waveguide configured to receive light from the seed laser diode and amplify the light as it propagates through the waveguide. The optical gain of the SOA may be provided by pulsed or direct-current (DC) electrical current supplied to the SOA. The SOA may be integrated on the same chip as the seed laser diode, or the SOA may be a separate device with an anti-reflection coating on its input facet or output facet. As another example, light source 110 may include a seed laser diode followed by a SOA, which in turn is followed by a fiber-optic amplifier. For example, the seed laser diode may produce relatively low-power seed pulses which are amplified by the SOA, and the fiber-optic amplifier may further amplify the optical pulses.

In particular embodiments, light source 110 may include a direct-emitter laser diode. A direct-emitter laser diode (which may be referred to as a direct emitter) may include a laser diode which produces light that is not subsequently amplified by an optical amplifier. A light source 110 that includes a direct-emitter laser diode may not include an optical amplifier, and the output light produced by a direct emitter may not be amplified after it is emitted by the laser diode. The light produced by a direct-emitter laser diode (e.g., optical pulses, CW light, or frequency-modulated light) may be emitted directly as a free-space output beam 125 without being amplified. A direct-emitter laser diode may be driven by an electrical power source that supplies current pulses to the laser diode, and each current pulse may result in the emission of an output optical pulse.

In particular embodiments, light source 110 may include a diode-pumped solid-state (DPSS) laser. A DPSS laser (which may be referred to as a solid-state laser) may refer to a laser that includes a solid-state, glass, ceramic, or crystal-based gain medium that is pumped by one or more pump laser diodes. The gain medium may include a host material that is doped with rare-earth ions (e.g., neodymium, erbium, ytterbium, or praseodymium). For example, a gain medium may include a yttrium aluminum garnet (YAG) crystal that is doped with neodymium (Nd) ions, and the gain medium may be referred to as a Nd:YAG crystal. A DPSS laser with a Nd:YAG gain medium may produce light at a wavelength between approximately 1300 nm and approximately 1400 nm, and the Nd:YAG gain medium may be pumped by one or more pump laser diodes with an operating wavelength between approximately 730 nm and approximately 900 nm. A DPSS laser may be a passively Q-switched laser that includes a saturable absorber (e.g., a vanadium-doped crystal that acts as a saturable absorber). Alternatively, a DPSS laser may be an actively Q-switched laser that includes an active Q-switch (e.g., an acousto-optic modulator or an electro-optic modulator). A passively or actively Q-switched DPSS laser may produce output optical pulses that form an output beam 125 of a lidar system 100.

In particular embodiments, an output beam of light 125 emitted by light source 110 may be a collimated optical beam having any suitable beam divergence, such as for example, a full-angle beam divergence of approximately 0.5 to 10 milliradians (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a full-angle beam divergence of 2 mrad may have a beam diameter or spot size of approximately 20 cm at a distance of 100 m from lidar system 100. In particular embodiments, output beam 125 may have a substantially elliptical cross section characterized by two divergence values. As an example, output beam 125 may have a fast axis and a slow axis, where the fast-axis divergence is greater than the slow-axis divergence. As another example, output beam 125 may be an elliptical beam with a fast-axis divergence of 4 mrad and a slow-axis divergence of 2 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce light with no specific polarization or may produce light that is linearly polarized.

In particular embodiments, lidar system 100 may include one or more optical components configured to reflect, focus, filter, shape, modify, steer, or direct light within the lidar system 100 or light produced or received by the lidar system 100 (e.g., output beam 125 or input beam 135). As an example, lidar system 100 may include one or more lenses, mirrors, filters (e.g., band-pass or interference filters), beam splitters, polarizers, polarizing beam splitters, wave plates (e.g., half-wave or quarter-wave plates), diffractive elements, holographic elements, isolators, optical splitters, couplers, detectors, beam combiners, or collimators. The optical components in a lidar system 100 may be free-space optical components, fiber-coupled optical components, or a combination of free-space and fiber-coupled optical components.

In particular embodiments, lidar system 100 may include a telescope, one or more lenses, or one or more mirrors configured to expand, focus, or collimate the output beam 125 or the input beam 135 to a desired beam diameter or divergence. As an example, the lidar system 100 may include one or more lenses to focus the input beam 135 onto a photodetector of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto a photodetector of receiver 140. As illustrated in FIG. 1, the lidar system 100 may include mirror 115 (which may be a metallic or dielectric mirror), and mirror 115 may be configured so that light beam 125 passes through the mirror 115 or passes along an edge or side of the mirror 115 and input beam 135 is reflected toward the receiver 140. As an example, mirror 115 (which may be referred to as an overlap mirror, superposition mirror, or beam-combiner mirror) may include a hole, slot, or aperture which output light beam 125 passes through. As another example, rather than passing through the mirror 115, the output beam 125 may be directed to pass alongside the mirror 115 with a gap (e.g., a gap of width approximately 0.1 mm, 0.5 mm, 1 mm, 2 mm, 5 mm, or 10 mm) between the output beam 125 and an edge of the mirror 115.

In particular embodiments, mirror 115 may provide for output beam 125 and input beam 135 to be substantially coaxial so that the two beams travel along approximately the same optical path (albeit in opposite directions). The input and output beams being substantially coaxial may refer to the beams being at least partially overlapped or sharing a common propagation axis so that input beam 135 and output beam 125 travel along substantially the same optical path (albeit in opposite directions). As an example, output beam 125 and input beam 135 may be parallel to each other to within less than 10 mrad, 5 mrad, 2 mrad, 1 mrad, 0.5 mrad, or 0.1 mrad. As output beam 125 is scanned across a field of regard, the input beam 135 may follow along with the output beam 125 so that the coaxial relationship between the two beams is maintained.

In particular embodiments, lidar system 100 may include a scanner 120 configured to scan an output beam 125 across a field of regard of the lidar system 100. As an example, scanner 120 may include one or more scanning mirrors configured to pivot, rotate, oscillate, or move in an angular manner about one or more rotation axes. The output beam 125 may be reflected by a scanning mirror, and as the scanning mirror pivots or rotates, the reflected output beam 125 may be scanned in a corresponding angular manner. As an example, a scanning mirror may be configured to periodically pivot back and forth over a 30-degree range, which results in the output beam 125 scanning back and forth across a 60-degree range (e.g., a 0-degree rotation by a scanning mirror results in a 20-degree angular scan of output beam 125).

In particular embodiments, a scanning mirror (which may be referred to as a scan mirror) may be attached to or mechanically driven by a scanner actuator or mechanism which pivots or rotates the mirror over a particular angular range (e.g., over a 5° angular range, 30° angular range, 60° angular range, 120° angular range, 360° angular range, or any other suitable angular range). A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism. As an example, a scanner 120 may include a scanning mirror attached to a galvanometer scanner configured to pivot back and forth over a 1° to 30° angular range. As another example, a scanner 120 may include a scanning mirror that is attached to or is part of a MEMS device configured to scan over a 1° to 30° angular range. As another example, a scanner 120 may include a polygon mirror configured to rotate continuously in the same direction (e.g., rather than pivoting back and forth, the polygon mirror continuously rotates 360 degrees in a clockwise or counterclockwise direction). The polygon mirror may be coupled or attached to a synchronous motor configured to rotate the polygon mirror at a substantially fixed rotational frequency (e.g., a rotational frequency of approximately 1 Hz, 10 Hz, 50 Hz, 100 Hz, 500 Hz, or 1,000 Hz).

In particular embodiments, scanner 120 may be configured to scan the output beam 125 (which may include at least a portion of the light emitted by light source 110) across a field of regard of the lidar system 100. A field of regard (FOR) of a lidar system 100 may refer to an area, region, or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scanning mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, 360°, or any other suitable FOR.

In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first scan mirror and a second scan mirror, where the first scan mirror directs the output beam 125 toward the second scan mirror, and the second scan mirror directs the output beam 125 downrange from the lidar system 100. As an example, the first scan mirror may scan the output beam 125 along a first direction, and the second scan mirror may scan the output beam 125 along a second direction that is substantially orthogonal to the first direction. As another example, the first scan mirror may scan the output beam 125 along a substantially horizontal direction, and the second scan mirror may scan the output beam 125 along a substantially vertical direction (or vice versa). As another example, the first and second scan mirrors may each be driven by galvanometer scanners. As another example, the first or second scan mirror may include a polygon mirror driven by an electric motor. In particular embodiments, scanner 120 may be referred to as a beam scanner, optical scanner, or laser scanner.

In particular embodiments, one or more scanning mirrors may be communicatively coupled to controller 150 which may control the scanning mirror(s) so as to guide the output beam 125 in a desired direction downrange or along a desired scan pattern. In particular embodiments, a scan pattern may refer to a pattern or path along which the output beam 125 is directed. As an example, scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20° FOR. Alternatively, the pixels may have a particular non-uniform distribution (e.g., the pixels may be distributed across all or a portion of the 60°×20° FOR, and the pixels may have a higher density in one or more particular regions of the 60°×20° FOR).

In particular embodiments, a lidar system 100 may include a scanner 120 with a solid-state scanning device. A solid-state scanning device may refer to a scanner 120 that scans an output beam 125 without the use of moving parts (e.g., without the use of a mechanical scanner, such as a mirror that rotates or pivots). For example, a solid-state scanner 120 may include one or more of the following: an optical phased array scanning device; a liquid-crystal scanning device; or a liquid lens scanning device. A solid-state scanner 120 may be an electrically addressable device that scans an output beam 125 along one axis (e.g., horizontally) or along two axes (e.g., horizontally and vertically). In particular embodiments, a scanner 120 may include a solid-state scanner and a mechanical scanner. For example, a scanner 120 may include an optical phased array scanner configured to scan an output beam 125 in one direction and a galvanometer scanner that scans the output beam 125 in an orthogonal direction. The optical phased array scanner may scan the output beam relatively rapidly in a horizontal direction across the field of regard (e.g., at a scan rate of 50 to 1,000 scan lines per second), and the galvanometer may pivot a mirror at a rate of 1-30 Hz to scan the output beam 125 vertically.

In particular embodiments, a lidar system 100 may include a light source 110 configured to emit pulses of light and a scanner 120 configured to scan at least a portion of the emitted pulses of light across a field of regard of the lidar system 100. One or more of the emitted pulses of light may be scattered by a target 130 located downrange from the lidar system 100, and a receiver 140 may detect at least a portion of the pulses of light scattered by the target 130. A receiver 140 may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and a n-type semiconductor, where the PN acronym refers to the structure having p-doped and n-doped regions) or one or more PIN photodiodes (e.g., a photodiode structure formed by an undoped intrinsic semiconductor region located between p-type and n-type regions, where the PIN acronym refers to the structure having p-doped, intrinsic, and n-doped regions). An APD, SPAD, PN photodiode, or PIN photodiode may each be referred to as a detector, photodetector, or photodiode. A detector may have an active region or an avalanche-multiplication region that includes silicon, germanium, InGaAs, InAsSb (indium arsenide antimonide), AlAsSb (aluminum arsenide antimonide), or AlInAsSb (aluminum indium arsenide antimonide). The active region may refer to an area over which a detector may receive or detect input light. An active region may have any suitable size or diameter, such as for example, a diameter of approximately 10 μm, 25 μm, 50 μm, 80 μm, 100 μm, 200 μm, 500 μm, 1 mm, 2 mm, or 5 mm.

In particular embodiments, receiver 140 may include electronic circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a received photocurrent (e.g., a current produced by an APD in response to a received optical signal) into a voltage signal. The voltage signal may be sent to pulse-detection circuitry that produces an analog or digital output signal 145 that corresponds to one or more optical characteristics (e.g., rising edge, falling edge, amplitude, duration, or energy) of a received optical pulse. As an example, the pulse-detection circuitry may perform a time-to-digital conversion to produce a digital output signal 145. The electrical output signal 145 may be sent to controller 150 for processing or analysis (e.g., to determine a time-of-flight value corresponding to a received optical pulse).

In particular embodiments, a controller 150 (which may include or may be referred to as a processor, an FPGA, an ASIC, a computer, or a computing system) may be located within a lidar system 100 or outside of a lidar system 100. Alternatively, one or more parts of a controller 150 may be located within a lidar system 100, and one or more other parts of a controller 150 may be located outside a lidar system 100. In particular embodiments, one or more parts of a controller 150 may be located within a receiver 140 of a lidar system 100, and one or more other parts of a controller 150 may be located in other parts of the lidar system 100. For example, a receiver 140 may include an FPGA or ASIC configured to process an output electrical signal from the receiver 140, and the processed signal may be sent to a computing system located elsewhere within the lidar system 100 or outside the lidar system 100. In particular embodiments, a controller 150 may include any suitable arrangement or combination of logic circuitry, analog circuitry, or digital circuitry.

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and controller 150 may determine a time-of-flight value for an optical pulse based on timing information associated with when the pulse was emitted by light source 110 and when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection.

In particular embodiments, lidar system 100 may include one or more processors (e.g., a controller 150) configured to determine a distance D from the lidar system 100 to a target 130 based at least in part on a round-trip time of flight for an emitted pulse of light to travel from the lidar system 100 to the target 130 and back to the lidar system 100. The target 130 may be at least partially contained within a field of regard of the lidar system 100 and located a distance D from the lidar system 100 that is less than or equal to an operating range ($R_{OP}$) of the lidar system 100. In particular embodiments, an operating range (which may be referred to as an operating distance) of a lidar system 100 may refer to a distance over which the lidar system 100 is configured to sense or identify targets 130 located within a field of regard of the lidar system 100. The operating range of lidar system 100 may be any suitable distance, such as for example, 25 m, 50 m, 100 m, 200 m, 250 m, 500 m, or 1 km. As an example, a lidar system 100 with a 200-m operating range may be configured to sense or identify various targets 130 located up to 200 m away from the lidar system 100. The operating range $R_{OP}$ of a lidar system 100 may be related to the time τ between the emission of successive optical signals by the expression $R_{OP}=c·τ/2$. For a lidar system 100 with a 200-m operating range ($R_{OP}=200$ m), the time τ between successive pulses (which may be referred to as a pulse period, a pulse repetition interval (PRI), or a time period between pulses) is approximately 2 $R_{OP}/c≅1.33$ μs. The pulse period τ may also correspond to the time of flight for a pulse to travel to and from a target 130 located a distance $R_{OP}$ from the lidar system 100. Additionally, the pulse period τ may be related to the pulse repetition frequency (PRF) by the expression τ=1/PRF. For example, a pulse period of 1.33 μs corresponds to a PRF of approximately 752 kHz.

In particular embodiments, a lidar system 100 may be used to determine the distance to one or more downrange targets 130. By scanning the lidar system 100 across a field of regard, the system may be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. As an example, a point cloud may cover a field of regard that extends 60° horizontally and 15° vertically, and the point cloud may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5×10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds.

In particular embodiments, a lidar system 100 may be configured to sense, identify, or determine distances to one or more targets 130 within a field of regard. As an example, a lidar system 100 may determine a distance to a target 130, where all or part of the target 130 is contained within a field of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects. In particular embodiments, a target may be referred to as an object.

In particular embodiments, light source 110, scanner 120, and receiver 140 may be packaged together within a single housing, where a housing may refer to a box, case, or enclosure that holds or contains all or part of a lidar system 100. As an example, a lidar-system enclosure may contain a light source 110, mirror 115, scanner 120, and receiver 140 of a lidar system 100. Additionally, the lidar-system enclosure may include a controller 150. The lidar-system enclosure may also include one or more electrical connections for conveying electrical power or electrical signals to or from the enclosure. In particular embodiments, one or more components of a lidar system 100 may be located remotely from a lidar-system enclosure. As an example, all or part of light source 110 may be located remotely from a lidar-system enclosure, and pulses of light produced by the light source 110 may be conveyed to the enclosure via optical fiber. As another example, all or part of a controller 150 may be located remotely from a lidar-system enclosure.

In particular embodiments, light source 110 may include an eye-safe laser, or lidar system 100 may be classified as an eye-safe laser system or laser product. An eye-safe laser, laser system, or laser product may refer to a system that includes a laser with an emission wavelength, average power, peak power, peak intensity, pulse energy, beam size, beam divergence, exposure time, or scanned output beam such that emitted light from the system presents little or no possibility of causing damage to a person's eyes. As an example, light source 110 or lidar system 100 may be classified as a Class 1 laser product (as specified by the 60825-1:2014 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, lidar system 100 may be an eye-safe laser product (e.g., with a Class 1 or Class I classification) configured to operate at any suitable wavelength between approximately 900 nm and approximately 2100 nm. As an example, lidar system 100 may include a laser with an operating wavelength between approximately 1200 nm and approximately 1400 nm or between approximately 1400 nm and approximately 1600 nm, and the laser or the lidar system 100 may be operated in an eye-safe manner. As another example, lidar system 100 may be an eye-safe laser product that includes a scanned laser with an operating wavelength between approximately 900 nm and approximately 1700 nm. As another example, lidar system 100 may be a Class 1 or Class I laser product that includes a laser diode, fiber laser, or solid-state laser with an operating wavelength between approximately 1200 nm and approximately 1600 nm. As another example, lidar system 100 may have an operating wavelength between approximately 1500 nm and approximately 1510 nm.

In particular embodiments, one or more lidar systems 100 may be integrated into a vehicle. As an example, multiple lidar systems 100 may be integrated into a car to provide a complete 360-degree horizontal FOR around the car. As another example, 2-10 lidar systems 100, each system having a 45-degree to 180-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-30 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), unmanned aerial vehicle (e.g., drone), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) to assist a driver of the vehicle in operating the vehicle. For example, a lidar system 100 may be part of an ADAS that provides information (e.g., about the surrounding environment) or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may be configured to guide the autonomous vehicle through an environment surrounding the vehicle and toward a destination. An autonomous-vehicle driving system may include one or more computing systems that receive information from a lidar system 100 about the surrounding environment, analyze the received information, and provide control signals to the vehicle's driving systems (e.g., brakes, accelerator, steering mechanism, lights, or turn signals). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

In particular embodiments, an optical signal (which may be referred to as a light signal, a light waveform, an optical waveform, an output beam, an emitted optical signal, or emitted light) may include pulses of light, CW light, amplitude-modulated light, frequency-modulated (FM) light, or any suitable combination thereof. Although this disclosure describes or illustrates example embodiments of lidar systems 100 or light sources 110 that produce optical signals that include pulses of light, the embodiments described or illustrated herein may also be applied, where appropriate, to other types of optical signals, including continuous-wave (CW) light, amplitude-modulated optical signals, or frequency-modulated optical signals. For example, a lidar system 100 as described or illustrated herein may be a pulsed lidar system and may include a light source 110 configured to produce pulses of light. Alternatively, a lidar system 100 may be configured to operate as a frequency-modulated continuous-wave (FMCW) lidar system and may include a light source 110 configured to produce CW light or a frequency-modulated optical signal.

In particular embodiments, a lidar system 100 may be a FMCW lidar system where the emitted light from the light source 110 (e.g., output beam 125 in FIG. 1 or FIG. 3) includes frequency-modulated light. A pulsed lidar system is a type of lidar system 100 in which the light source 110 emits pulses of light, and the distance to a remote target 130 is determined based on the round-trip time-of-flight for a pulse of light to travel to the target 130 and back. Another type of lidar system 100 is a frequency-modulated lidar system, which may be referred to as a frequency-modulated continuous-wave (FMCW) lidar system. A FMCW lidar system uses frequency-modulated light to determine the distance to a remote target 130 based on a frequency of received light (which includes emitted light scattered by the remote target) relative to a frequency of local-oscillator (LO) light. A round-trip time for the emitted light to travel to a target 130 and back to the lidar system may correspond to a frequency difference between the received scattered light and the LO light. A larger frequency difference may correspond to a longer round-trip time and a greater distance to the target 130. The frequency difference between the received scattered light and the LO light may be referred to as a beat frequency.

For example, for a linearly chirped light source (e.g., a frequency modulation that produces a linear change in frequency with time), the larger the frequency difference between the LO light and the received light, the farther away the target 130 is located. The frequency difference may be determined by mixing the received light with the LO light (e.g., by coupling the two beams onto a detector so that they are coherently mixed or combined together, or by mixing analog electric signals corresponding to the received light and the emitted light) to produce a beat signal and determining the beat frequency of the beat signal. For example, an electrical signal from an APD may be analyzed using a fast Fourier transform (FFT) technique to determine the frequency difference between the emitted light and the received light. If a linear frequency modulation m (e.g., in units of Hz/s) is applied to a CW laser, then the round-trip time $\Delta T$ may be related to the frequency difference between the received scattered light and the emitted light $\Delta \Phi$ by the expression $\Delta T = \Delta \Phi / m$. Additionally, the distance D from the target 130 to the lidar system 100 may be expressed as $D = c \cdot \Delta \Phi / (2m)$, where c is the speed of light. For example, for a light source 110 with a linear frequency modulation of $10^{12}$ Hz/s (or, 1 MHz/µs), if a frequency difference (between the received scattered light and the emitted light) of 330 kHz is measured, then the distance to the target is approximately 50 meters (which corresponds to a round-trip time of approximately 330 ns). As another example, a frequency difference of 1.33 MHz corresponds to a target located approximately 200 meters away.

A light source 110 for a FMCW lidar system may include (i) a direct-emitter laser diode, (ii) a seed laser diode followed by a SOA, (iii) a seed laser diode followed by a fiber-optic amplifier, or (iv) a seed laser diode followed by a SOA and then a fiber-optic amplifier. A seed laser diode or a direct-emitter laser diode may be operated in a CW manner (e.g., by driving the laser diode with a substantially constant DC current), and a frequency modulation may be provided by an external modulator (e.g., an electro-optic phase modulator may apply a frequency modulation to seed-laser light). Alternatively, a frequency modulation may be produced by applying a current modulation to a seed laser diode or a direct-emitter laser diode. The current modulation (which may be provided along with a DC bias current) may produce a corresponding refractive-index modulation in the laser diode, which results in a frequency modulation of the light emitted by the laser diode. The current-modulation component (and the corresponding frequency modulation) may have any suitable frequency or shape (e.g., piecewise linear, sinusoidal, triangle-wave, or sawtooth). For example, the current-modulation component (and the resulting frequency modulation of the emitted light) may increase or decrease monotonically over a particular time interval. As another example, the current-modulation component may include a triangle or sawtooth wave with an electrical current that increases or decreases linearly over a particular time interval, and the light emitted by the laser diode may include a corresponding frequency modulation in which the optical frequency increases or decreases approximately linearly over the particular time interval. For example, a light source 110 that emits light with a linear frequency change of 200 MHz over a 2-μs time interval may be referred to as having a frequency modulation m of $10^{14}$ Hz/s (or, 100 MHz/μs).

Figure 2:
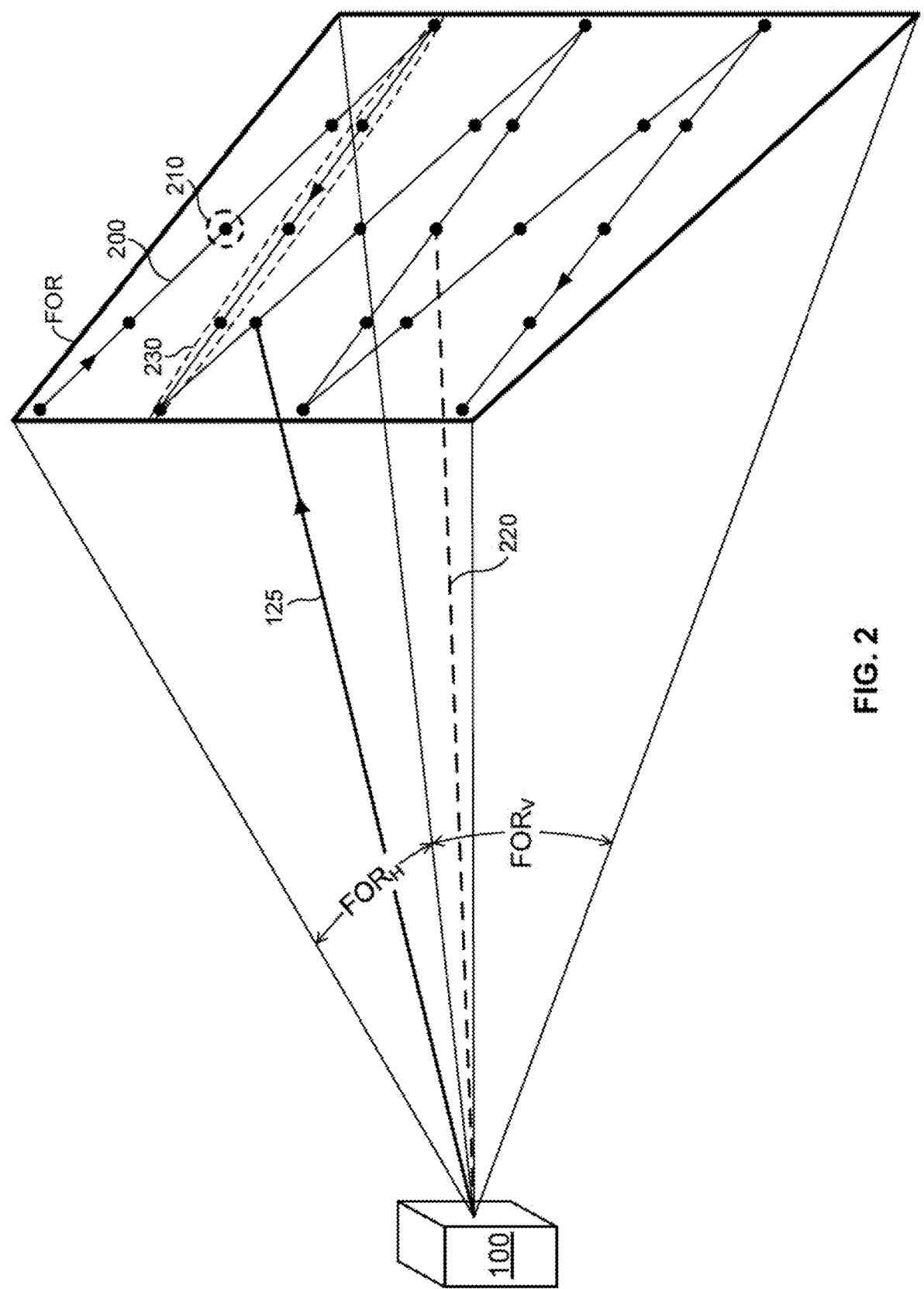
FIG. 2 illustrates an example scan pattern produced by a lidar system.

FIG. 2 illustrates an example scan pattern 200 produced by a lidar system 100. A scanner 120 of the lidar system 100 may scan the output beam 125 (which may include multiple emitted optical signals) along a scan pattern 200 that is contained within a FOR of the lidar system 100. A scan pattern 200 (which may be referred to as an optical scan pattern, optical scan path, scan path, or scan) may represent a path or course followed by output beam 125 as it is scanned across all or part of a FOR. Each traversal of a scan pattern 200 may correspond to the capture of a single frame or a single point cloud. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR ($FOR_H$) and any suitable vertical FOR ($FOR_V$). For example, a scan pattern 200 may have a field of regard represented by angular dimensions (e.g., $FOR_H \times FOR_V$) 40°×30°, 90°×40°, or 60°×15°. As another example, a scan pattern 200 may have a $FOR_H$ greater than or equal to 10°, 25°, 30°, 40°, 60°, 90°, or 120°. As another example, a scan pattern 200 may have a $FOR_V$ greater than or equal to 2°, 5°, 10°, 15°, 20°, 30°, or 45°.

In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of 0°), or reference line 220 may have a nonzero horizontal angle or a nonzero inclination (e.g., a vertical angle of +10° or)—10°. In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and +3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more laser pulses or one or more distance measurements. Additionally, a scan pattern 200 may include multiple scan lines 230, where each scan line represents one scan across at least part of a field of regard, and each scan line 230 may include multiple pixels 210. In FIG. 2, scan line 230 includes five pixels 210 and corresponds to an approximately horizontal scan across the FOR from right to left, as viewed from the lidar system 100. In particular embodiments, a cycle of scan pattern 200 may include a total of $P_x \times P_y$ pixels 210 (e.g., a two-dimensional distribution of $P_x$ by $P_y$ pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, each pixel 210 may be associated with a distance (e.g., a distance to a portion of a target 130 from which an associated laser pulse was scattered) or one or more angular values. As an example, a pixel 210 may be associated with a distance value and two angular values (e.g., an azimuth and altitude) that represent the angular location of the pixel 210 with respect to the lidar system 100. A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scanning mirrors of scanner 120.

Figure 3:
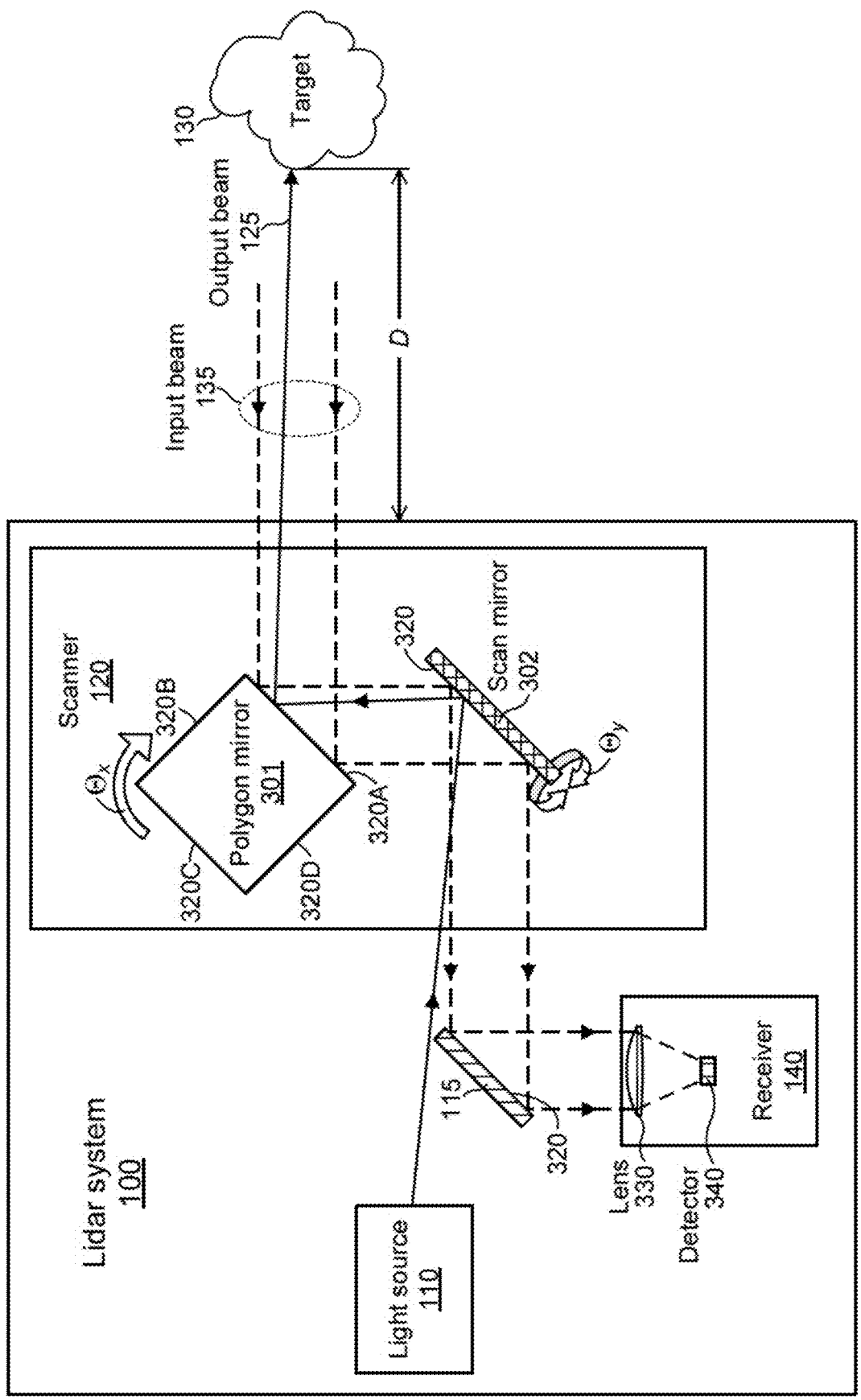
FIG. 3 illustrates an example lidar system with an example rotating polygon mirror.

FIG. 3 illustrates an example lidar system 100 with an example rotating polygon mirror 301. In particular embodiments, a scanner 120 may include a polygon mirror 301 configured to scan output beam 125 along a particular direction. In the example of FIG. 3, scanner 120 includes two scanning mirrors: (1) a polygon mirror 301 that rotates along the $\Theta_x$ direction and (2) a scanning mirror 302 that oscillates back and forth along the $\Theta_y$ direction. The output beam 125 from light source 110, which passes alongside mirror 115, is reflected by reflecting surface 320 of scan mirror 302 and is then reflected by a reflecting surface (e.g., surface 320A, 320B, 320C, or 320D) of polygon mirror 301. Scattered light from a target 130 returns to the lidar system 100 as input beam 135. The input beam 135 reflects from polygon mirror 301, scan mirror 302, and mirror 115, which directs input beam 135 through focusing lens 330 and to the detector 340 of receiver 140. The detector 340 may be a PN photodiode, a PIN photodiode, an APD, a SPAD, or any other suitable detector. A reflecting surface 320 (which may be referred to as a reflective surface) may include a reflective metallic coating (e.g., gold, silver, or aluminum) or a reflective dielectric coating, and the reflecting surface 320 may have any suitable reflectivity R at an operating wavelength of the light source 110 (e.g., R greater than or equal to 70%, 80%, 90%, 95%, 98%, or 99%).

In particular embodiments, a polygon mirror 301 may be configured to rotate along a $\Theta_x$ or $\Theta_y$ direction and scan output beam 125 along a substantially horizontal or vertical direction, respectively. A rotation along a Ox direction may refer to a rotational motion of mirror 301 that results in output beam 125 scanning along a substantially horizontal direction. Similarly, a rotation along a $\Theta_y$ direction may refer to a rotational motion that results in output beam 125 scanning along a substantially vertical direction. In FIG. 3, mirror 301 is a polygon mirror that rotates along the $\Theta_x$ direction and scans output beam 125 along a substantially horizontal direction, and mirror 302 pivots along the $\Theta_y$ direction and scans output beam 125 along a substantially vertical direction. In particular embodiments, a polygon mirror 301 may be configured to scan output beam 125 along any suitable direction. As an example, a polygon mirror 301 may scan output beam 125 at any suitable angle with respect to a horizontal or vertical direction, such as for example, at an angle of approximately 0°, 10°, 20°, 30°, 45°, 60°, 70°, 80°, or 90° with respect to a horizontal or vertical direction.

In particular embodiments, a polygon mirror 301 may refer to a multi-sided object having reflective surfaces 320 on two or more of its sides or faces. As an example, a polygon mirror may include any suitable number of reflective faces (e.g., 2, 3, 4, 5, 6, 7, 8, or 10 faces), where each face includes a reflective surface 320. A polygon mirror 301 may have a cross-sectional shape of any suitable polygon, such as for example, a triangle (with three reflecting surfaces 320), square (with four reflecting surfaces 320), pentagon (with five reflecting surfaces 320), hexagon (with six reflecting surfaces 320), heptagon (with seven reflecting surfaces 320), or octagon (with eight reflecting surfaces 320). In FIG. 3, the polygon mirror 301 has a substantially square cross-sectional shape and four reflecting surfaces (320A, 320B, 320C, and 320D). The polygon mirror 301 in FIG. 3 may be referred to as a square mirror, a cube mirror, or a four-sided polygon mirror. In FIG. 3, the polygon mirror 301 may have a shape similar to a cube, cuboid, or rectangular prism. Additionally, the polygon mirror 301 may have a total of six sides, where four of the sides include faces with reflective surfaces (320A, 320B, 320C, and 320D).

In particular embodiments, a polygon mirror 301 may be continuously rotated in a clockwise or counter-clockwise rotation direction about a rotation axis of the polygon mirror 301. The rotation axis may correspond to a line that is perpendicular to the plane of rotation of the polygon mirror 301 and that passes through the center of mass of the polygon mirror 301. In FIG. 3, the polygon mirror 301 rotates in the plane of the drawing, and the rotation axis of the polygon mirror 301 is perpendicular to the plane of the drawing. An electric motor may be configured to rotate a polygon mirror 301 at a substantially fixed frequency (e.g., a rotational frequency of approximately 1 Hz (or 1 revolution per second), 10 Hz, 50 Hz, 100 Hz, 500 Hz, or 1,000 Hz). As an example, a polygon mirror 301 may be mechanically coupled to an electric motor (e.g., a synchronous electric motor) which is configured to spin the polygon mirror 301 at a rotational speed of approximately 160 Hz (or, 9600 revolutions per minute (RPM)).

In particular embodiments, output beam 125 may be reflected sequentially from the reflective surfaces 320A, 320B, 320C, and 320D as the polygon mirror 301 is rotated. This results in the output beam 125 being scanned along a particular scan axis (e.g., a horizontal or vertical scan axis) to produce a sequence of scan lines, where each scan line corresponds to a reflection of the output beam 125 from one of the reflective surfaces of the polygon mirror 301. In FIG. 3, the output beam 125 reflects off of reflective surface 320A to produce one scan line. Then, as the polygon mirror 301 rotates, the output beam 125 reflects off of reflective surfaces 320B, 320C, and 320D to produce a second, third, and fourth respective scan line. In particular embodiments, a lidar system 100 may be configured so that the output beam 125 is first reflected from polygon mirror 301 and then from scan mirror 302 (or vice versa). As an example, an output beam 125 from light source 110 may first be directed to polygon mirror 301, where it is reflected by a reflective surface of the polygon mirror 301, and then the output beam 125 may be directed to scan mirror 302, where it is reflected by reflective surface 320 of the scan mirror 302. In the example of FIG. 3, the output beam 125 is reflected from the polygon mirror 301 and the scan mirror 302 in the reverse order. In FIG. 3, the output beam 125 from light source 110 is first directed to the scan mirror 302, where it is reflected by reflective surface 320, and then the output beam 125 is directed to the polygon mirror 301, where it is reflected by reflective surface 320A.

Figure 4:
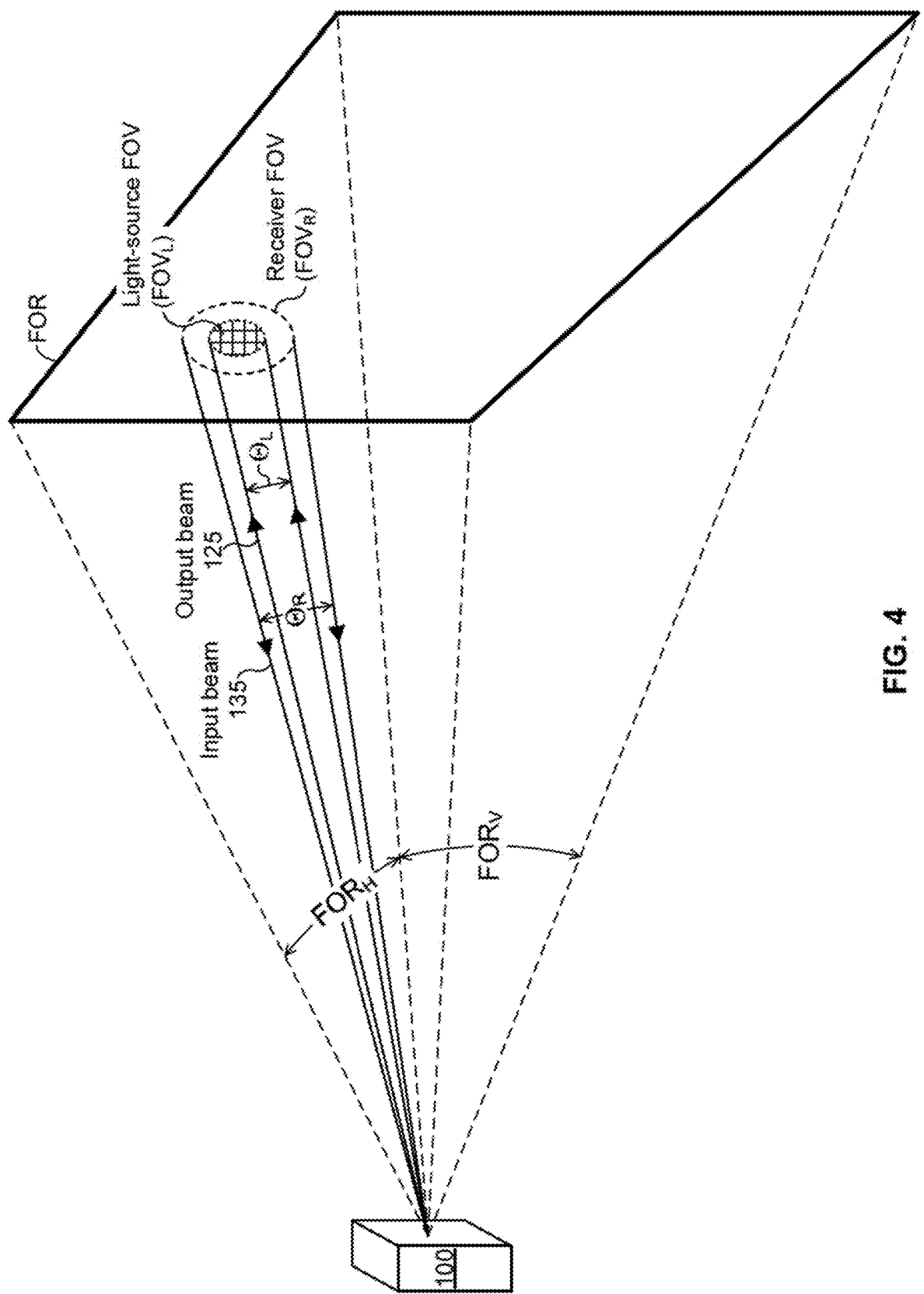
FIG. 4 illustrates an example light-source field of view ($FOV_L$) and receiver field of view ($FOV_R$) for a lidar system.

FIG. 4 illustrates an example light-source field of view ($\text{FOV}_L$) and receiver field of view ($\text{FOV}_R$) for a lidar system 100. A light source 110 of lidar system 100 may emit pulses of light as the $\text{FOV}_L$ and $\text{FOV}_R$ are scanned by scanner 120 across a field of regard (FOR). In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent downrange from lidar system 100, and the pulse of light may be sent in the direction that the $\text{FOV}_L$ is pointing at the time the pulse is emitted. The pulse of light may scatter off a target 130, and the receiver 140 may receive and detect a portion of the scattered light that is directed along or contained within the $\text{FOV}_R$.

In particular embodiments, scanner 120 may be configured to scan both a light-source field of view and a receiver field of view across a field of regard of the lidar system 100. Multiple pulses of light may be emitted and detected as the scanner 120 scans the $\text{FOV}_L$ and $\text{FOV}_R$ across the field of regard of the lidar system 100 while tracing out a scan pattern 200. In particular embodiments, the light-source field of view and the receiver field of view may be scanned synchronously with respect to one another, so that as the $\text{FOV}_L$ is scanned across a scan pattern 200, the $\text{FOV}_R$ follows substantially the same path at the same scanning speed. Additionally, the $\text{FOV}_L$ and $\text{FOV}_R$ may maintain the same relative position to one another as they are scanned across the field of regard. As an example, the $\text{FOV}_L$ may be substantially overlapped with or centered inside the $\text{FOV}_R$ (as illustrated in FIG. 4), and this relative positioning between $\text{FOV}_L$ and $\text{FOV}_R$ may be maintained throughout a scan. As another example, the $\text{FOV}_R$ may lag behind the $\text{FOV}_L$ by a particular, fixed amount throughout a scan (e.g., the $\text{FOV}_R$ may be offset from the $\text{FOV}_L$ in a direction opposite the scan direction).

In particular embodiments, the $\text{FOV}_L$ may have an angular size or extent $\Theta_L$ that is substantially the same as or that corresponds to the divergence of the output beam 125, and the $\text{FOV}_R$ may have an angular size or extent $\Theta_R$ that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The $\text{FOV}_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\Theta_L$ and $\Theta_R$ may both be approximately equal to 1 mrad, 2 mrad, or 4 mrad. In particular embodiments, the receiver field of view may be larger than the light-source field of view, or the light-source field of view may be larger than the receiver field of view. As an example, $\Theta_L$ may be approximately equal to 3 mrad, and $\Theta_R$ may be approximately equal to 4 mrad. As another example, $\Theta_R$ may be approximately L times larger than $\Theta_L$, where L is any suitable factor, such as for example, 1.1, 1.2, 1.5, 2, 3, 5, or 10.

In particular embodiments, a pixel 210 may represent or may correspond to a light-source field of view or a receiver field of view. As the output beam 125 propagates from the light source 110, the diameter of the output beam 125 (as well as the size of the corresponding pixel 210) may increase according to the beam divergence $\Theta_L$. As an example, if the output beam 125 has a $\Theta_L$ of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 5:
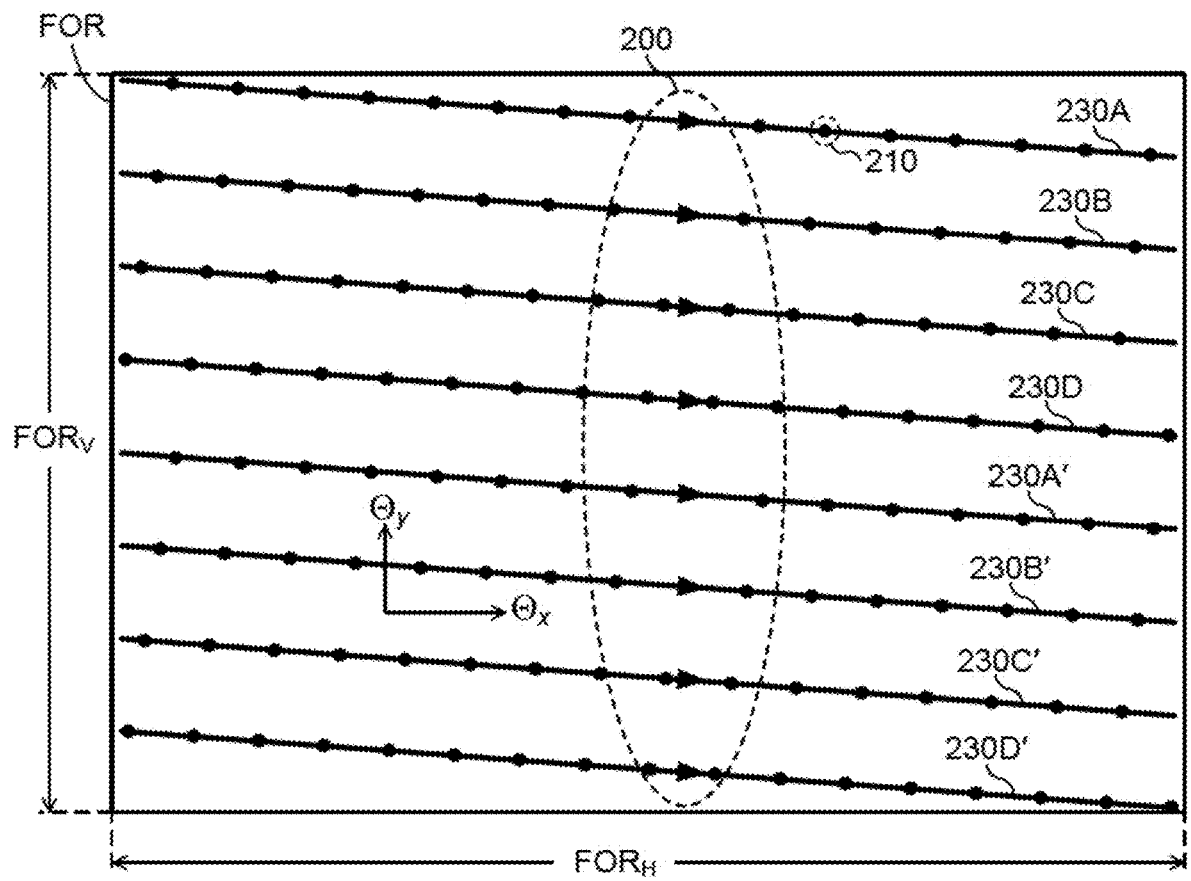
FIG. 5 illustrates an example unidirectional scan pattern that includes multiple pixels and multiple scan lines.

FIG. 5 illustrates an example unidirectional scan pattern 200 that includes multiple pixels 210 and multiple scan lines 230. In particular embodiments, scan pattern 200 may include any suitable number of scan lines 230 (e.g., approximately 1, 2, 5, 10, 20, 50, 100, 500, or 1,000 scan lines), and each scan line 230 of a scan pattern 200 may include any suitable number of pixels 210 (e.g., 1, 2, 5, 10, 20, 50, 100, 200, 500, 1,000, 2,000, or 5,000 pixels). The scan pattern 200 illustrated in FIG. 5 includes eight scan lines 230, and each scan line 230 includes approximately 16 pixels 210. In particular embodiments, a scan pattern 200 where the scan lines 230 are scanned in two directions (e.g., alternately scanning from right to left and then from left to right) may be referred to as a bidirectional scan pattern 200, and a scan pattern 200 where the scan lines 230 are scanned in the same direction may be referred to as a unidirectional scan pattern 200. The scan pattern 200 in FIG. 2 may be referred to as a bidirectional scan pattern, and the scan pattern 200 in FIG. 5 may be referred to as a unidirectional scan pattern 200 where each scan line 230 travels across the FOR in substantially the same direction (e.g., approximately from left to right as viewed from the lidar system 100). In particular embodiments, scan lines 230 of a unidirectional scan pattern 200 may be directed across a FOR in any suitable direction, such as for example, from left to right, from right to left, from top to bottom, from bottom to top, or at any suitable angle (e.g., at a 0°, 5°, 10°, 30°, or 45° angle) with respect to a horizontal or vertical axis. In particular embodiments, each scan line 230 in a unidirectional scan pattern 200 may be a separate line that is not directly connected to a previous or subsequent scan line 230.

In particular embodiments, a unidirectional scan pattern 200 may be produced by a scanner 120 that includes a polygon mirror (e.g., polygon mirror 301 of FIG. 3), where each scan line 230 is associated with a particular reflective surface 320 of the polygon mirror. As an example, reflective surface 320A of polygon mirror 301 in FIG. 3 may produce scan line 230A in FIG. 5. Similarly, as the polygon mirror 301 rotates, reflective surfaces 320B, 320C, and 320D may successively produce scan lines 230B, 230C, and 230D, respectively. Additionally, for a subsequent revolution of the polygon mirror 301, the scan lines 230A', 230B', 230C', and 230D' may be successively produced by reflections of the output beam 125 from reflective surfaces 320A, 320B, 320C, and 320D, respectively. In particular embodiments, N successive scan lines 230 of a unidirectional scan pattern 200 may correspond to one full revolution of a N-sided polygon mirror. As an example, the four scan lines 230A, 230B, 230C, and 230D in FIG. 5 may correspond to one full revolution of the four-sided polygon mirror 301 in FIG. 3. Additionally, a subsequent revolution of the polygon mirror 301 may produce the next four scan lines 230A', 230B', 230C', and 230' in FIG. 5.

Figure 6:
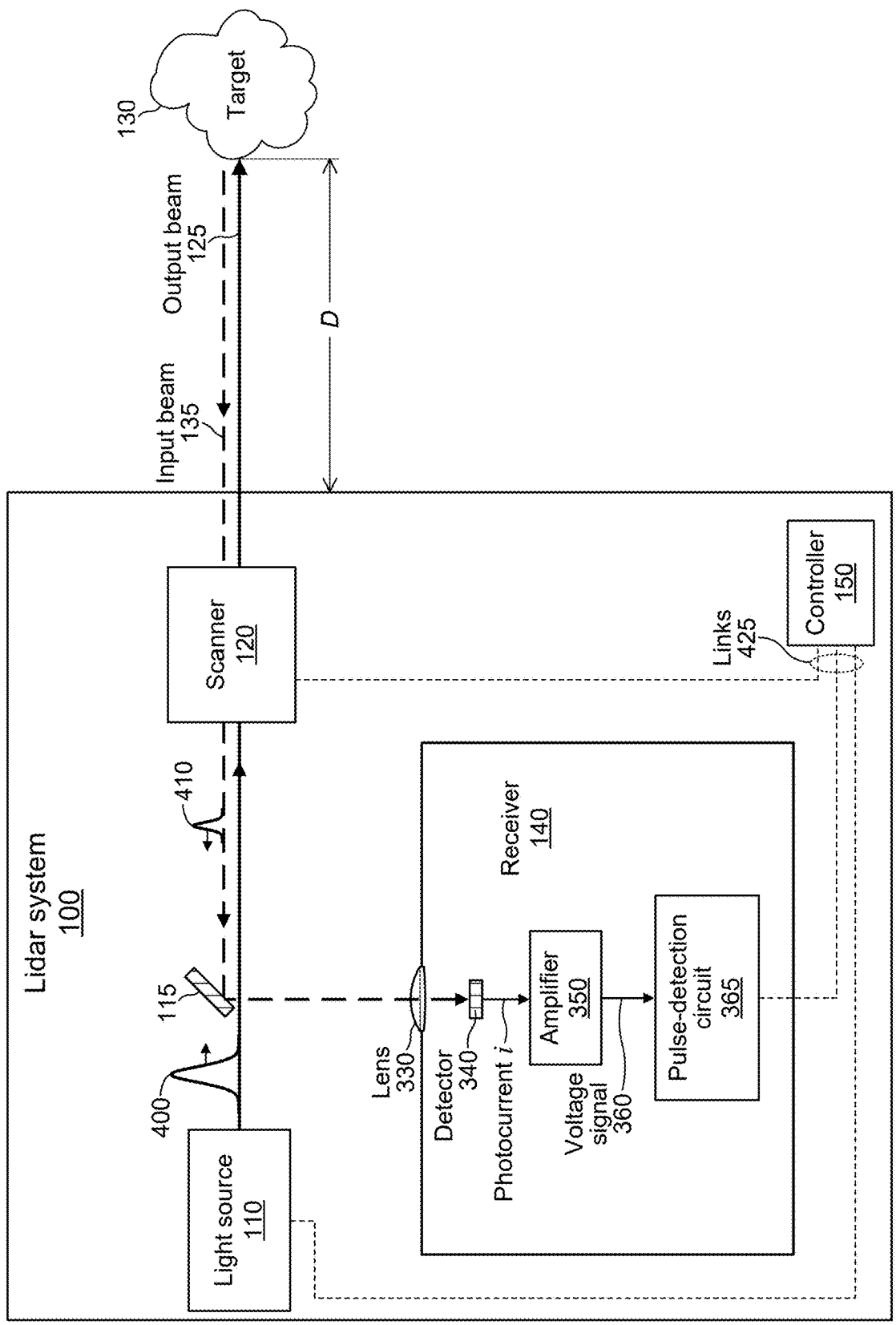
FIG. 6 illustrates an example lidar system that includes a light source that emits pulses of light.

FIG. 6 illustrates an example lidar system 100 that includes a light source 110 that emits pulses of light 400. The lidar system 100 in FIG. 6, which may be referred to as a pulsed lidar system, includes a light source 110, a scanner 120, a receiver 140, and a controller 150. The receiver 140 includes a focusing lens 330, a detector 340, an electronic amplifier 350, and a pulse-detection circuit 365.

In particular embodiments, a pulsed lidar system 100 may include a light source 110 configured to emit pulses of light 400. The emitted pulses of light 400 may be part of an output beam 125 that is scanned by a scanner 120 across a field of regard of the lidar system 100. The light source 110 may include a seed laser that produces seed light and an optical amplifier that amplifies the seed light to produce the emitted pulses of light 400. For example, the optical amplifier may be a pulsed semiconductor optical amplifier (SOA) that amplifies temporal portions of the seed light to produce the emitted pulses of light 400, where each amplified temporal portion of the seed light corresponds to one of the emitted pulses of light 400. The pulses of light 400 emitted by the light source 110 may have one or more of the following optical characteristics: a wavelength between 900 nm and 1700 nm; a pulse energy between 0.01 µJ and 100 µJ; a pulse repetition frequency between 80 kHz and 10 MHz; and a pulse duration between 0.1 ns and 20 ns. For example, the light source 110 may emit pulses of light 400 with a wavelength of approximately 1550 nm, a pulse energy of approximately 0.5 µJ, a pulse repetition frequency of approximately 750 kHz, and a pulse duration of approximately 5 ns. As another example, the light source 110 may emit pulses of light with a wavelength from approximately 1500 nm to approximately 1510 nm.

In particular embodiments, a lidar system 100 may include a scanner 120 configured to scan an output beam 125 across a field of regard of the lidar system 100. The scanner 120 may receive the output beam 125 (which includes emitted pulses of light 400) from the light source 110, and the scanner 120 may include one or more scanning mirrors configured to scan the output beam 125. In addition to scanning the output beam 125, the scanner may also scan a FOV of the detector 340 across the field of regard so that the output beam 125 and the detector FOV are scanned at the same scanning speed or with the same relative position to one another. Alternatively, the lidar system 100 may be configured so that only the output beam 125 is scanned, and the detector has a static FOV that is not scanned. In this case, the input beam 135 (which includes received pulses of light 410) may bypass the scanner 120 and be directed to the receiver 140 without passing through the scanner 120.

In particular embodiments, a lidar system 100 may include a receiver 140 that detects received pulses of light 410. A received pulse of light 410 may include light from one of the emitted pulses of light 400 that is scattered by a target 130 located a distance D from the lidar system 100. The receiver 140 may include one or more detectors 340, and each detector may produce a photocurrent signal i that corresponds to the received pulse of light 410. The lidar system 100 in FIG. 6 includes a receiver 140 with one detector 340 that receives a pulse of light 410 and produces a photocurrent signal i that is amplified by an electronic amplifier 350.

In particular embodiments, a receiver 140 may include a pulse-detection circuit 365 that determines a time-of-arrival for a received pulse of light 410. The time-of-arrival for a received pulse of light 410 may correspond to a time associated with a rising edge, falling edge, peak, or temporal center of the received pulse of light 410. The time-of-arrival may be determined based at least in part on a photocurrent signal i produced by a detector 340 of the receiver 140. For example, a photocurrent signal i may include a pulse of current corresponding to the received pulse of light 410, and the electronic amplifier 350 may produce a voltage signal 360 with a voltage pulse that corresponds to the pulse of current. The pulse-detection circuit 365 may determine the time-of-arrival for the received pulse of light 410 based on a characteristic of the voltage pulse (e.g., based on a time associated with a rising edge, falling edge, peak, or temporal center of the voltage pulse). For example, the pulse-detection circuit 365 may receive an electronic trigger signal (e.g., from the light source 110 or the controller 150) when a pulse of light 400 is emitted, and the pulse-detection circuit 365 may determine the time-of-arrival for the received pulse of light 410 based on a time associated with an edge, peak, or temporal center of the voltage signal 360. The time-of-arrival may be determined based on a difference between a time when the pulse of light 400 is emitted and a time when the received pulse of light 410 is detected.

In particular embodiments, a lidar system 100 may include a processor (e.g., controller 150) that determines the distance to a target 130 based at least in part on a time-of-arrival for a received pulse of light 410. The time-of-arrival for the received pulse of light 410 may correspond to a round-trip time ($\Delta T$) for at least a portion of an emitted pulse of light 400 to travel to the target 130 and back to the lidar system 100, where the portion of the emitted pulse of light 400 that travels back to the target 130 corresponds to the received pulse of light 410. The distance D to the target 130 may be determined from the expression $D = c \cdot \Delta T/2$. For example, if the pulse-detection circuit 365 determines that the time $\Delta T$ between emission of optical pulse 400 and receipt of optical pulse 410 is 1 µs, then the controller 150 may determine that the distance to the target 130 is approximately 150 m. In particular embodiments, a round-trip time may be determined by a receiver 140, by a controller 150, or by a receiver 140 and controller 150 together. For example, a receiver 140 may determine a round-trip time by subtracting a time when a pulse of light 400 is emitted from a time when a received pulse of light 410 is detected. As another example, a receiver 140 may determine a time when a pulse of light 400 is emitted and a time when a received pulse of light 410 is detected. These values may be sent to a controller 150, and the controller 150 may determine a round-trip time by subtracting the time when the pulse of light 400 is emitted from the time when the received pulse of light 410 is detected.

In particular embodiments, a controller 150 of a lidar system 100 may be coupled to one or more components of the lidar system 100 via one or more data links 425. Each link 425 in FIG. 6 represents a data link that couples the controller 150 to another component of the lidar system 100 (e.g., light source 110, scanner 120, receiver 140, or pulse-detection circuit 365). Each data link 425 may include one or more electrical links, one or more wireless links, or one or more optical links, and the data links 425 may be used to send data, signals, or commands to or from the controller 150. For example, the controller 150 may send a command via a link 425 to the light source 110 instructing the light source 110 to emit a pulse of light 400. As another example, the pulse-detection circuit 365 may send a signal via a link 425 to the controller with information about a received pulse of light 410 (e.g., a time-of-arrival for the received pulse of light 410). Additionally, the controller 150 may be coupled via a link (not illustrated in FIG. 6) to a processor of an autonomous-vehicle driving system. The autonomous-vehicle processor may receive point-cloud data from the controller 150 and may make driving decisions based on the received point-cloud data.

Figure 7:
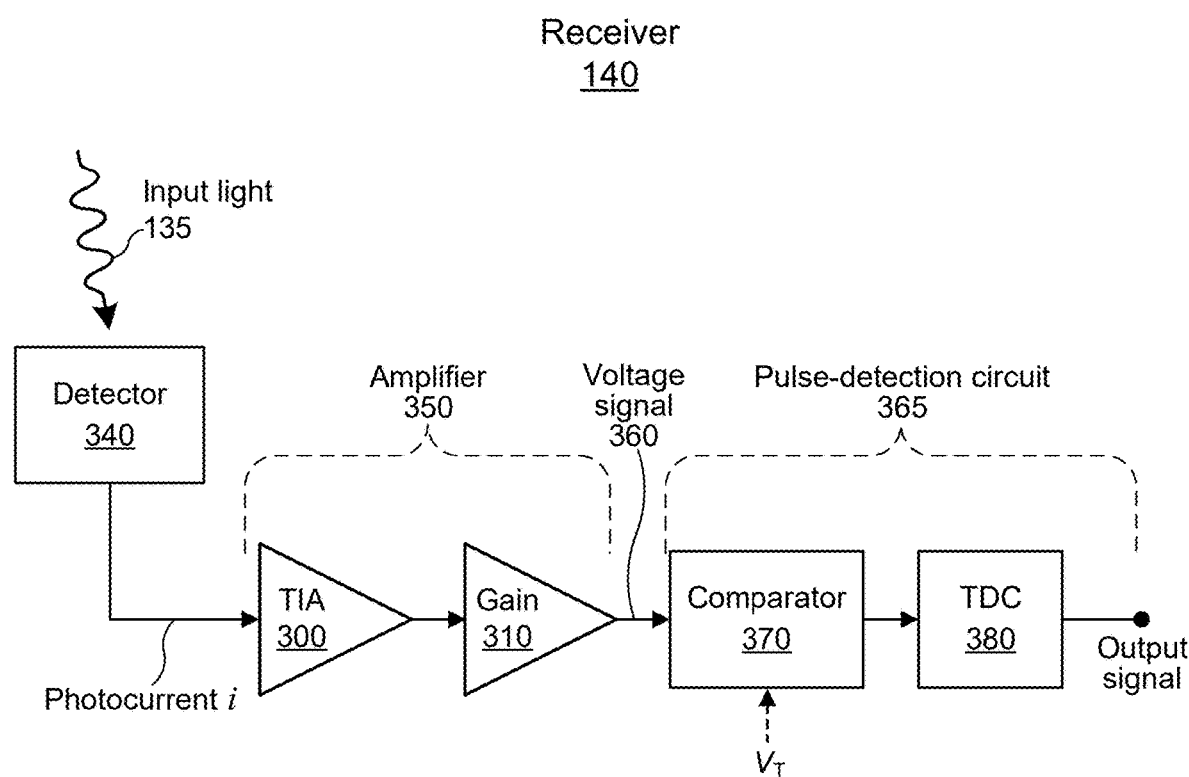
FIG. 7 illustrates an example receiver that includes a detector, an electronic amplifier, and a pulse-detection circuit.

FIG. 7 illustrates an example receiver 140 that includes a detector 340, an electronic amplifier 350, and a pulse-detection circuit 365. In particular embodiments, an electronic amplifier 350 or a pulse-detection circuit 365 may include circuitry that receives an electrical-current signal (e.g., photocurrent i) from a detector 340 (e.g., from an APD) and performs current-to-voltage conversion, signal amplification, sampling, filtering, signal conditioning, analog-to-digital conversion, time-to-digital conversion, pulse detection, threshold detection, rising-edge detection, or falling-edge detection. A pulse-detection circuit 365 may be used to determine (i) whether an optical signal (e.g., a pulse of light 410) has been received by a detector 340 or (ii) a time associated with receipt of an optical signal by a detector 340. An electronic amplifier 350 may include a transimpedance amplifier (TIA) 300 or a voltage-gain circuit 310, and a pulse-detection circuit 365 may include a comparator 370 or a time-to-digital converter (TDC) 380. In particular embodiments, an electronic amplifier 350 and a pulse-detection circuit 365 may be included in a receiver 140 or a controller 150, or parts of an amplifier 350 or pulse-detection circuit 365 may be included in a receiver 140 and other parts may be included in a controller 150. As an example, a TIA 300 and a voltage-gain circuit 310 may be part of a receiver 140, and a comparator 370 and a TDC 380 may be part of a controller 150 that is coupled to the receiver 140. As another example, a TIA 300, gain circuit 310, comparator 370, and TDC 380 may be part of a receiver 140, and an output signal from the TDC 380 may be supplied to a controller 150.

In particular embodiments, an electronic amplifier 350 may include a TIA 300 configured to receive a photocurrent signal i from a detector 340 and produce a voltage signal that corresponds to the received photocurrent. As an example, in response to a received pulse of light 410 (e.g., light from an emitted pulse of light 400 that is scattered by a remote target 130), an APD 340 may produce a pulse of electrical current corresponding to the received pulse of light 410. A TIA 300 may receive the electrical-current pulse from the APD 340 and produce a voltage pulse that corresponds to the received current pulse. In particular embodiments, a TIA 300 may also act as an electronic filter. As an example, a TIA 300 may be configured as a low-pass filter that removes or attenuates high-frequency electrical noise by attenuating signals above a particular frequency (e.g., above 1 MHz, 10 MHz, 20

MHz, 50 MHz, 100 MHz, 200 MHz, 300 MHz, 1 GHz, or any other suitable frequency). In particular embodiments, an electronic amplifier 350 may include a voltage-gain circuit 310 (which may be referred to as a gain circuit or a voltage amplifier) configured to amplify a voltage signal. As an example, a gain circuit 310 may include one or more voltage-amplification stages that amplify a voltage signal received from a TIA 300. For example, the gain circuit 310 may receive a voltage pulse from a TIA 300, and the gain circuit 310 may amplify the voltage pulse by any suitable amount, such as for example, by a gain of approximately 3 dB, 10 dB, 20 dB, 30 dB, 40 dB, or 50 dB. Additionally, the gain circuit 310 may be configured to also act as an electronic filter to remove or attenuate electrical noise. In particular embodiments, an electronic amplifier 350 may not include a separate gain stage 310 (e.g., a TIA 300 may produce a voltage signal 360 that is directly coupled to a comparator 370 without an intervening gain circuit).

In particular embodiments, a pulse-detection circuit 365 may include a comparator 370 configured to receive a voltage signal 360 from a TIA 300 or gain circuit 310 and produce an electrical-edge signal (e.g., a rising edge or a falling edge) when the received voltage signal rises above or falls below a particular threshold voltage $V_T$. As an example, when a received voltage signal 360 rises above $V_T$, a comparator 370 may produce a rising-edge digital-voltage signal (e.g., a signal that steps from approximately 0 V to approximately 2.5 V, 3.3 V, 5 V, or any other suitable digital-high level). Additionally or alternatively, when a received voltage signal 360 falls below $V_T$, a comparator 370 may produce a falling-edge digital-voltage signal (e.g., a signal that steps down from approximately 2.5 V, 3.3 V, 5 V, or any other suitable digital-high level to approximately 0 V). The voltage signal 360 received by the comparator 370 may be received from a TIA 300 or gain circuit 310 and may correspond to a photocurrent signal i produced by an APD 340. As an example, the voltage signal 360 received by the comparator 370 may include a voltage pulse that corresponds to an electrical-current pulse produced by the APD 340 in response to a received pulse of light 410. The voltage signal 360 received by the comparator 370 may be an analog signal, and an electrical-edge signal produced by the comparator 370 may be a digital signal.

In particular embodiments, a pulse-detection circuit 365 may include a time-to-digital converter (TDC) 380 configured to receive an electrical-edge signal from a comparator 370 and determine an interval of time between emission of a pulse of light 400 by a light source 110 and receipt of the electrical-edge signal. The interval of time may correspond to a round-trip time of flight for an emitted pulse of light 400 to travel from the lidar system 100 to a target 130 and back to the lidar system 100. The portion of the emitted pulse of light 400 that is received by the lidar system 100 (e.g., scattered light from target 130) may be referred to as a received pulse of light 410. The output of the TDC 380 may include one or more numerical values, where each numerical value (which may be referred to as a numerical time value, a time value, a digital value, or a digital time value) corresponds to a time interval determined by the TDC 380. In particular embodiments, a TDC 380 may have an internal counter or clock with any suitable period, such as for example, 5 ps, 10 ps, 15 ps, 20 ps, 30 ps, 50 ps, 100 ps, 0.5 ns, 1 ns, 2 ns, 5 ns, or 10 ns. As an example, the TDC 380 may have an internal counter or clock with a 20-ps period, and the TDC 380 may determine that an interval of time between emission and receipt of an optical pulse is equal to 25,000 time periods, which corresponds to a time interval of approximately 0.5 microseconds. The TDC 380 may send a digital output signal that includes the numerical value "25000" to a processor or controller 150 of the lidar system 100. In particular embodiments, a lidar system 100 may include a processor configured to determine a distance from the lidar system 100 to a target 130 based at least in part on an interval of time determined by one or more TDCs 380. As an example, the processor may be an ASIC or FPGA and may be a part of a receiver 140 or controller 150. The processor may receive a numerical value (e.g., "25000") from the TDC 380, and based on the received value, the processor may determine the distance from the lidar system 100 to a target 130.

In particular embodiments, determining an interval of time between emission and receipt of a pulse of light may be based on determining (1) a time associated with the emission of the pulse of light 400 by light source 110 and (2) a time when scattered light from the pulse of light is detected by receiver 140. As an example, a TDC 380 may count the number of time periods or clock cycles between an electrical edge associated with emission of a pulse of light 400 and an electrical edge associated with detection of scattered light from the pulse. Determining when scattered light from the pulse of light is detected by receiver 140 may be based on determining a time for a rising or falling edge (e.g., a rising or falling edge produced by comparator 370) associated with the detected pulse of light. In particular embodiments, determining a time associated with emission of a pulse of light 400 may be based on an electrical trigger signal. As an example, light source 110 may produce an electrical trigger signal for each pulse of light 400 that is emitted, or an electrical device (e.g., controller 150) may provide a trigger signal to the light source 110 to initiate the emission of each pulse of light 400. A trigger signal associated with emission of a pulse of light may be provided to TDC 380, and a rising edge or falling edge of the trigger signal may correspond to a time when the pulse of light is emitted. In particular embodiments, a time associated with emission of a pulse of light 400 may be determined based on an optical trigger signal. As an example, a time associated with the emission of a pulse of light 400 may be determined based at least in part on detection of a portion of light from the emitted pulse of light prior to the emitted pulse of light exiting the lidar system 100 and propagating to a target 130. The portion of the emitted pulse of light (which may be referred to as an optical trigger pulse) may be detected by a separate detector (e.g., a PIN photodiode or an APD) or by the receiver 140. A portion of light from an emitted pulse of light may be scattered or reflected from a surface (e.g., a surface of a beam splitter or window, or a surface of light source 110, mirror 115, or scanner 120) located within lidar system 100. Some of the scattered or reflected light may be received by a detector 340 of receiver 140, and a pulse-detection circuit 365 coupled to the detector 340 may determine that an optical trigger pulse has been received. The time at which the optical trigger pulse was received may be associated with the emission time of the pulse of light 400.

Figure 8:
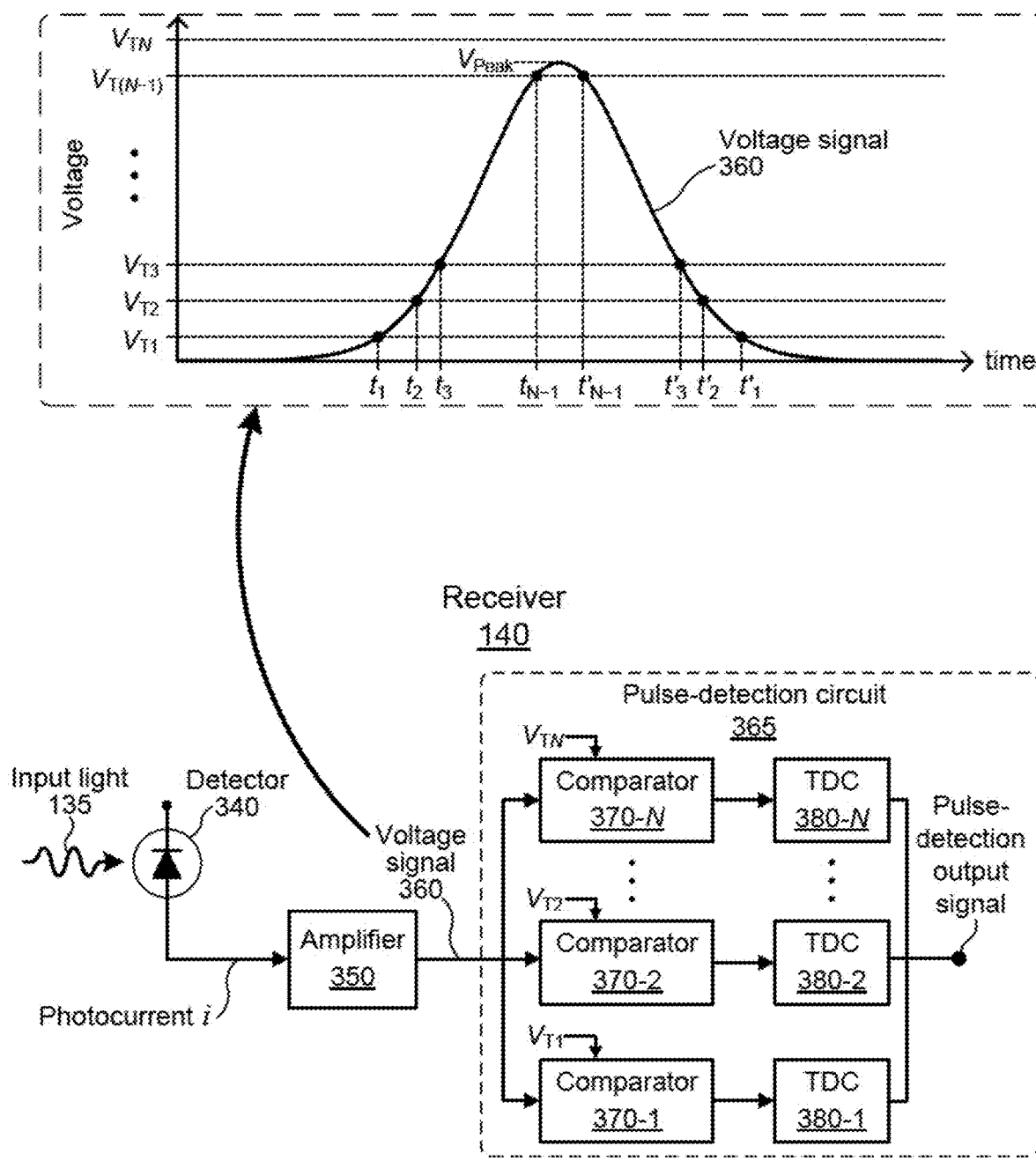
FIG. 8 illustrates an example receiver and an example voltage signal corresponding to a received pulse of light.

FIG. 8 illustrates an example receiver 140 and an example voltage signal 360 corresponding to a received pulse of light 410. A light source 110 of a lidar system 100 may emit a pulse of light 400, and a receiver 140 may be configured to detect an input optical signal 135 that includes a received pulse of light 410. In particular embodiments, a receiver 140 of a lidar system 100 may include one or more detectors 340, one or more amplifiers 350, or one or more pulse-detection circuits 365. A pulse-detection circuit 365 may include one or more comparators 370 or one or more time-to-digital converters (TDCs) 380.

The receiver 140 illustrated in FIG. 8 includes a detector 340 configured to receive input light 135 and produce a photocurrent i that corresponds to a received pulse of light 410 (which is part of the input light 135). The photocurrent i produced by the detector 340 may be referred to as a photocurrent signal or an electrical-current signal. The detector 340 may include an APD, PN photodiode, or PIN photodiode. For example, the detector 340 may include a silicon APD or PIN photodiode configured to detect light at an 800-1100 nm operating wavelength of a lidar system 100, or the detector 340 may include an InGaAs APD or PIN photodiode configured to detect light at a 1200-1600 nm operating wavelength. In FIG. 8, the detector 340 is coupled to an electronic amplifier 350 configured to receive the photocurrent and produce a voltage signal 360 that corresponds to the received photocurrent. For example, the detector 340 may be an APD that produces a pulse of photocurrent in response to detecting a received pulse of light 410, and the voltage signal 360 may be an analog voltage pulse that corresponds to the pulse of photocurrent. The amplifier 350 may include a transimpedance amplifier 300 configured to receive the photocurrent i and amplify the photocurrent to produce a voltage signal that corresponds to the photocurrent signal. Additionally, the amplifier 350 may include a voltage amplifier 310 that amplifies the voltage signal or an electronic filter (e.g., a low-pass or high-pass filter) that filters the photocurrent or the voltage signal.

In FIG. 8, the voltage signal 360 produced by the amplifier 350 is coupled to a pulse-detection circuit 365. The pulse-detection circuit includes N comparators (comparators 370-1, 370-2, ..., 370-N), and each comparator is supplied with a particular threshold or reference voltage ($V_{T1}$, $V_{T2}$, ..., $V_{TN}$). For example, receiver 140 may include N=10 comparators, and the threshold voltages may be set to 10 values between 0 volts and 1 volt (e.g., $V_{T1}$=0.1 V, $V_{T2}$=0.2 V, and $V_{T10}$=1.0 V). A comparator may produce an electrical-edge signal (e.g., a rising or falling electrical edge) when the voltage signal 360 rises above or falls below a particular threshold voltage. For example, comparator 370-2 may produce a rising edge when the voltage signal 360 rises above the threshold voltage $V_{T2}$. Additionally or alternatively, comparator 370-2 may produce a falling edge when the voltage signal 360 falls below the threshold voltage $V_{T2}$.

The pulse-detection circuit 365 in FIG. 8 includes N time-to-digital converters (TDCs 380-1, 380-2, ..., 380-N), and each comparator is coupled to one of the TDCs. Each comparator-TDC pair in FIG. 8 (e.g., comparator 370-1 and TDC 380-1) may be referred to as a threshold detector. A comparator may provide an electrical-edge signal to a corresponding TDC, and the TDC may act as a timer that produces an electrical output signal (e.g., a digital signal, a digital word, or a digital value) that represents a time when the edge signal is received from the comparator. For example, if the voltage signal 360 rises above the threshold voltage $V_{T1}$, then the comparator 370-1 may produce a rising-edge signal that is supplied to the input of TDC 380-1, and the TDC 380-1 may produce a digital time value corresponding to a time when the edge signal was received by TDC 380-1. The digital time value may be referenced to the time when a pulse of light 400 is emitted, and the digital time value may correspond to or may be used to determine a round-trip time for the pulse of light 400 to travel to a target 130 and back to the lidar system 100. Additionally, if the voltage signal 360 subsequently falls below the threshold voltage $V_{T1}$, then the comparator 370-1 may produce a falling-edge signal that is supplied to the input of TDC 380-1, and the TDC 380-1 may produce a digital time value corresponding to a time when the edge signal was received by TDC 380-1.

In particular embodiments, a pulse-detection output signal may be an electrical signal that corresponds to a received pulse of light 410. For example, the pulse-detection output signal in FIG. 8 may be a digital signal that corresponds to the analog voltage signal 360, which in turn corresponds to the photocurrent signal i, which in turn corresponds to a received pulse of light 410. If an input light signal 135 includes a received pulse of light 410, the pulse-detection circuit 365 may receive a voltage signal 360 (corresponding to the photocurrent i) and produce a pulse-detection output signal that corresponds to the received pulse of light 410. The pulse-detection output signal may include one or more digital time values from each of the TDCs 380 that received one or more edge signals from a comparator 370, and the digital time values may represent the analog voltage signal 360. The pulse-detection output signal may be sent to a controller 150, and a time-of-arrival for the received pulse of light 410 may be determined based at least in part on the one or more time values produced by the TDCs. For example, the time-of-arrival may be determined from a time associated with the peak (e.g., $V_{peak}$), a rising edge, or a temporal center of the voltage signal 360. The pulse-detection output signal in FIG. 8 may correspond to the electrical output signal 145 in FIG. 1.

In particular embodiments, a pulse-detection output signal may include one or more digital values that correspond to a time interval between (1) a time when a pulse of light 400 is emitted and (2) a time when a received pulse of light 410 is detected by a receiver 140. The pulse-detection output signal in FIG. 8 may include digital values from each of the TDCs that receive an edge signal from a comparator, and each digital value may represent a time interval between the emission of an optical pulse 400 by a light source 110 and the receipt of an edge signal from a comparator. For example, a light source 110 may emit a pulse of light 400 that is scattered by a target 130, and a receiver 140 may receive a portion of the scattered pulse of light as an input pulse of light 410. When the light source emits the pulse of light 400, a count value of the TDCs may be reset to zero counts. Alternatively, the TDCs in receiver 140 may accumulate counts continuously over multiple pulse periods (e.g., for 10, 100, 1,000, 10,000, or 100,000 pulse periods), and when a pulse of light 400 is emitted, the current TDC count may be stored in memory. After the pulse of light 400 is emitted, the TDCs may continue to accumulate counts that correspond to elapsed time (e.g., the TDCs may count in terms of clock cycles or some fraction of clock cycles).

In FIG. 8, when TDC 380-1 receives an edge signal from comparator 370-1, the TDC 380-1 may produce a digital signal that represents the time interval between emission of the pulse of light 400 and receipt of the edge signal. For example, the digital signal may include a digital value that corresponds to the number of clock cycles that elapsed between emission of the pulse of light 400 and receipt of the edge signal. Alternatively, if the TDC 380-1 accumulates counts over multiple pulse periods, then the digital signal may include a digital value that corresponds to the TDC count at the time of receipt of the edge signal. The pulse-detection output signal may include digital values corresponding to one or more times when a pulse of light 400 was emitted and one or more times when a TDC received an edge signal. A pulse-detection output signal from a pulse-detection circuit 365 may correspond to a received pulse of light 410 and may include digital values from each of the TDCs that receive an edge signal from a comparator. The pulse-detection output signal may be sent to a controller 150, and the controller may determine the distance to the target 130 based at least in part on the pulse-detection output signal. Additionally or alternatively, the controller 150 may determine an optical characteristic of a received pulse of light 410 based at least in part on the pulse-detection output signal received from the TDCs of a pulse-detection circuit 365.

In particular embodiments, a receiver 140 of a lidar system 100 may include one or more analog-to-digital converters (ADCs). As an example, instead of including multiple comparators and TDCs, a receiver 140 may include an ADC that receives a voltage signal 360 from amplifier 350 and produces a digital representation of the voltage signal 360. Although this disclosure describes or illustrates example receivers 140 that include one or more comparators 370 and one or more TDCs 380, a receiver 140 may additionally or alternatively include one or more ADCs. As an example, in FIG. 8, instead of the N comparators 370 and N TDCs 380, the receiver 140 may include an ADC configured to receive the voltage signal 360 and produce a digital output signal that includes digitized values that correspond to the voltage signal 360.

The example voltage signal 360 illustrated in FIG. 8 corresponds to a received pulse of light 410. The voltage signal 360 may be an analog signal produced by an electronic amplifier 350 and may correspond to a pulse of light detected by the receiver 140 in FIG. 8. The voltage levels on the y-axis correspond to the threshold voltages $V_{T1}$, $V_{T2}$, ..., $V_{TN}$ of the respective comparators 370-1, 370-2, ..., 370-N. The time values $t_1$, $t_2$, $t_3$, $t_{N-1}$ correspond to times when the voltage signal 360 exceeds the corresponding threshold voltages, and the time values $t'_1$, $t'_2$, $t'_3$, ..., $t'_{N-1}$ correspond to times when the voltage signal 360 falls below the corresponding threshold voltages. For example, at time $t_1$ when the voltage signal 360 exceeds the threshold voltage $V_{T1}$, comparator 370-1 may produce an edge signal, and TDC 380-1 may output a digital value corresponding to the time $t_1$. Additionally, the TDC 380-1 may output a digital value corresponding to the time $t'_1$ when the voltage signal 360 falls below the threshold voltage $V_{T1}$. Alternatively, the receiver 140 may include an additional TDC (not illustrated in FIG. 8) configured to produce a digital value corresponding to time $t'_1$ when the voltage signal 360 falls below the threshold voltage $V_{T1}$. The pulse-detection output signal from pulse-detection circuit 365 may include one or more digital values that correspond to one or more of the time values $t_1$, $t_2$, $t_3$, $t_{N-1}$ and $t'_1$, $t'_2$, $t'_3$, ..., $t'_{N-1}$. Additionally, the pulse-detection output signal may also include one or more values corresponding to the threshold voltages associated with the time values. Since the voltage signal 360 in FIG. 8 does not exceed the threshold voltage $V_{TN}$, the corresponding comparator 370-N may not produce an edge signal. As a result, TDC 380-N may not produce a time value, or TDC 380-N may produce a signal indicating that no edge signal was received.

In particular embodiments, a pulse-detection output signal produced by a pulse-detection circuit 365 of a receiver 140 may correspond to or may be used to determine an optical characteristic of a received pulse of light 410 detected by the receiver 140. An optical characteristic of a received pulse of light 410 may correspond to a time of arrival, a peak optical intensity, a peak optical power, an average optical power, an optical energy, a shape or amplitude, a temporal duration, or a temporal center of the received pulse of light 410. For example, a pulse of light 410 detected by receiver 140 may have one or more of the following optical characteristics: a peak optical power between 1 nanowatt and 10 watts; a pulse energy between 1 attojoule and 10 nanojoules; and a pulse duration between 0.1 ns and 50 ns. In particular embodiments, an optical characteristic of a received pulse of light 410 may be determined from a pulse-detection output signal provided by one or more TDCs 380 of a pulse-detection circuit 365 (e.g., as illustrated in FIG. 8), or an optical characteristic may be determined from a pulse-detection output signal provided by one or more ADCs of a pulse-detection circuit 365.

In particular embodiments, a peak optical power or peak optical intensity of a received pulse of light 410 may be determined from one or more values of a pulse-detection output signal provided by a receiver 140. As an example, a controller 150 may determine the peak optical power of a received pulse of light 410 based on a peak voltage ($V_{peak}$) of the voltage signal 360. The controller 150 may use a formula or lookup table that correlates a peak voltage of the voltage signal 360 with a value for the peak optical power. In the example of FIG. 8, the peak optical power of a pulse of light 410 may be determined from the threshold voltage $V_{T(N-1)}$, which is approximately equal to the peak voltage $V_{peak}$ of the voltage signal 360 (e.g., the threshold voltage $V_{T(N-1)}$ may be associated with a pulse of light 410 having a peak optical power of 10 mW). As another example, a controller 150 may apply a curve-fit or interpolation operation to the values of a pulse-detection output signal to determine the peak voltage of the voltage signal 360, and this peak voltage may be used to determine the corresponding peak optical power of a received pulse of light 410.

In particular embodiments, an energy of a received pulse of light 410 may be determined from one or more values of a pulse-detection output signal. For example, a controller 150 may perform a summation of digital values that correspond to a voltage signal 360 to determine an area under the voltage-signal curve, and the area under the voltage-signal curve may be correlated with a pulse energy of a received pulse of light 410. As an example, the approximate area under the voltage-signal curve in FIG. 8 may be determined by subdividing the curve into M subsections (where M is approximately the number of time values included in the pulse-detection output signal) and adding up the areas of each of the subsections (e.g., using a numerical integration technique such as a Riemann sum, trapezoidal rule, or Simpson's rule). For example, the approximate area A under the voltage-signal curve 360 in FIG. 8 may be determined from a Riemann sum using the expression $A = \Sigma_{k=1}^{M} V_{Tk} \times \Delta t_k$, where $V_{Tk}$ is a threshold voltage associated with the time value $t_k$, and $\Delta t_k$ is a width of the subsection associated with time value $t_k$. In the example of FIG. 8, the voltage signal 360 may correspond to a received pulse of light 410 with a pulse energy of 1 picojoule.

In particular embodiments, a duration of a received pulse of light 410 may be determined from a duration or width of a corresponding voltage signal 360. For example, the difference between two time values of a pulse-detection output signal may be used to determine a duration of a received pulse of light 410. In the example of FIG. 8, the duration of the pulse of light 410 corresponding to voltage signal 360 may be determined from the difference ($t'_3 - t_3$), which may correspond to a received pulse of light 410 with a pulse duration of 4 nanoseconds. As another example, a controller 150 may apply a curve-fit or interpolation operation to the values of the pulse-detection output signal, and the duration of the pulse of light 410 may be determined based on the curve-fit or interpolation. One or more of the approaches for determining an optical characteristic of a received pulse of light 410 as described herein may be implemented using a receiver 140 that includes multiple comparators 370 and TDCs 380 (as illustrated in FIG. 8) or using a receiver 140 that includes one or more ADCs.

Figure 9:
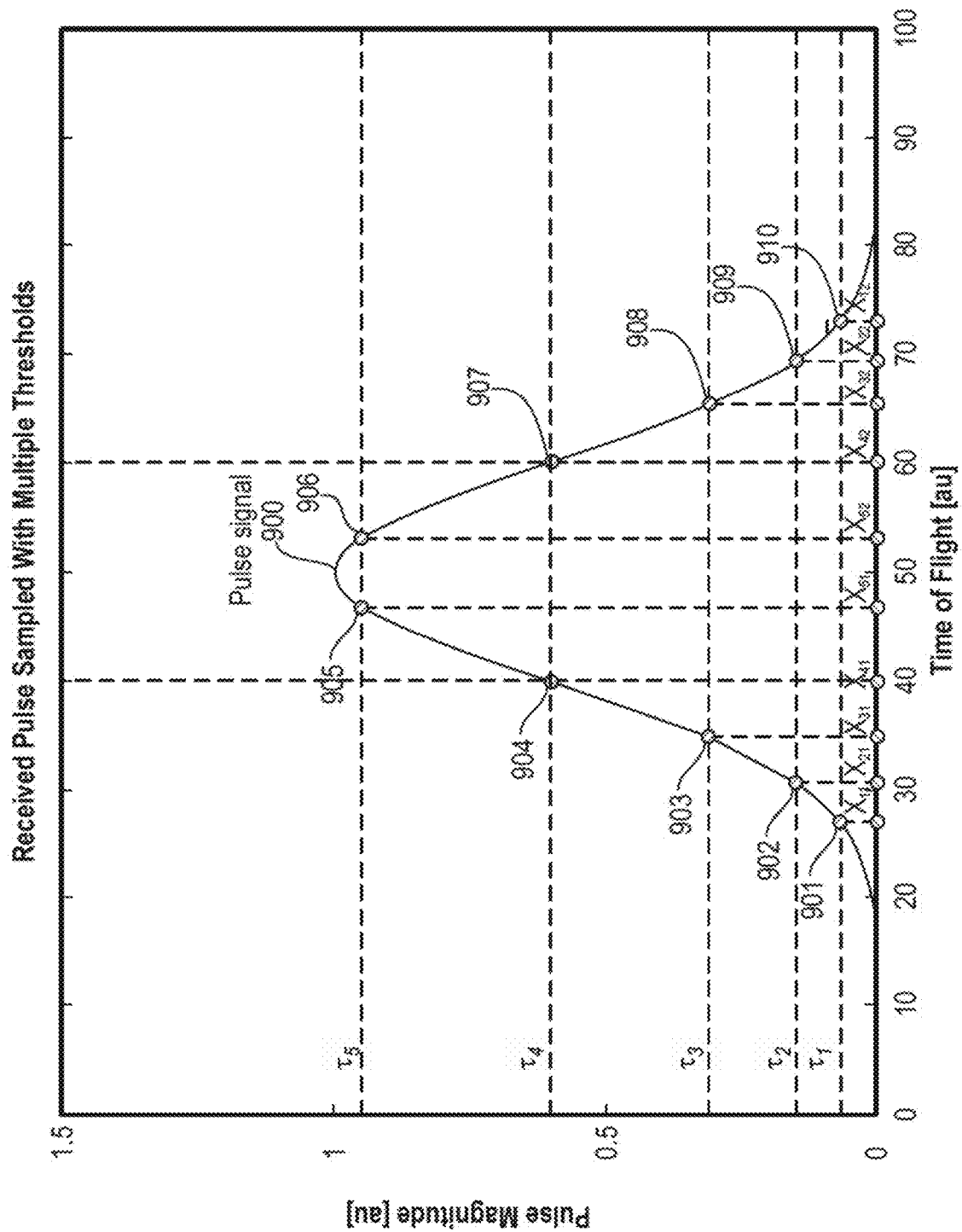
FIG. 9 illustrates an example non-uniformly sampled pulse signal.

FIG. 9 illustrates an example non-uniformly sampled pulse signal. The x-axis displays time in arbitrary units and the y-axis displays pulse magnitude in arbitrary units. In some embodiments, pulse signal 900 is a received laser pulse of a lidar system. In some embodiments, pulse signal 900 is voltage signal 360 of FIG. 8. Stated alternatively, in some embodiments, samples 901-910 of pulse signal 900 are determined by a receiver with a pulse detection circuit comprising a plurality of comparators configured to sample pulse signal 900 at different intensity threshold levels (e.g., pulse-detection circuit 365 of FIG. 8). The plurality of comparators sampling approach has the advantage of reducing cost and power consumption (compared to an ADC sampling approach), but the resulting sampling of pulse signal 900 is not uniform. Stated alternatively, as shown in the example illustrated, pulse signal 900 comprises samples 901-910 that are distributed unevenly in time. As described below, various signal artifacts can occur as a result of utilizing the plurality of comparators sampling approach. These artifacts can be resolved by using the techniques disclosed herein.

Figure 10:
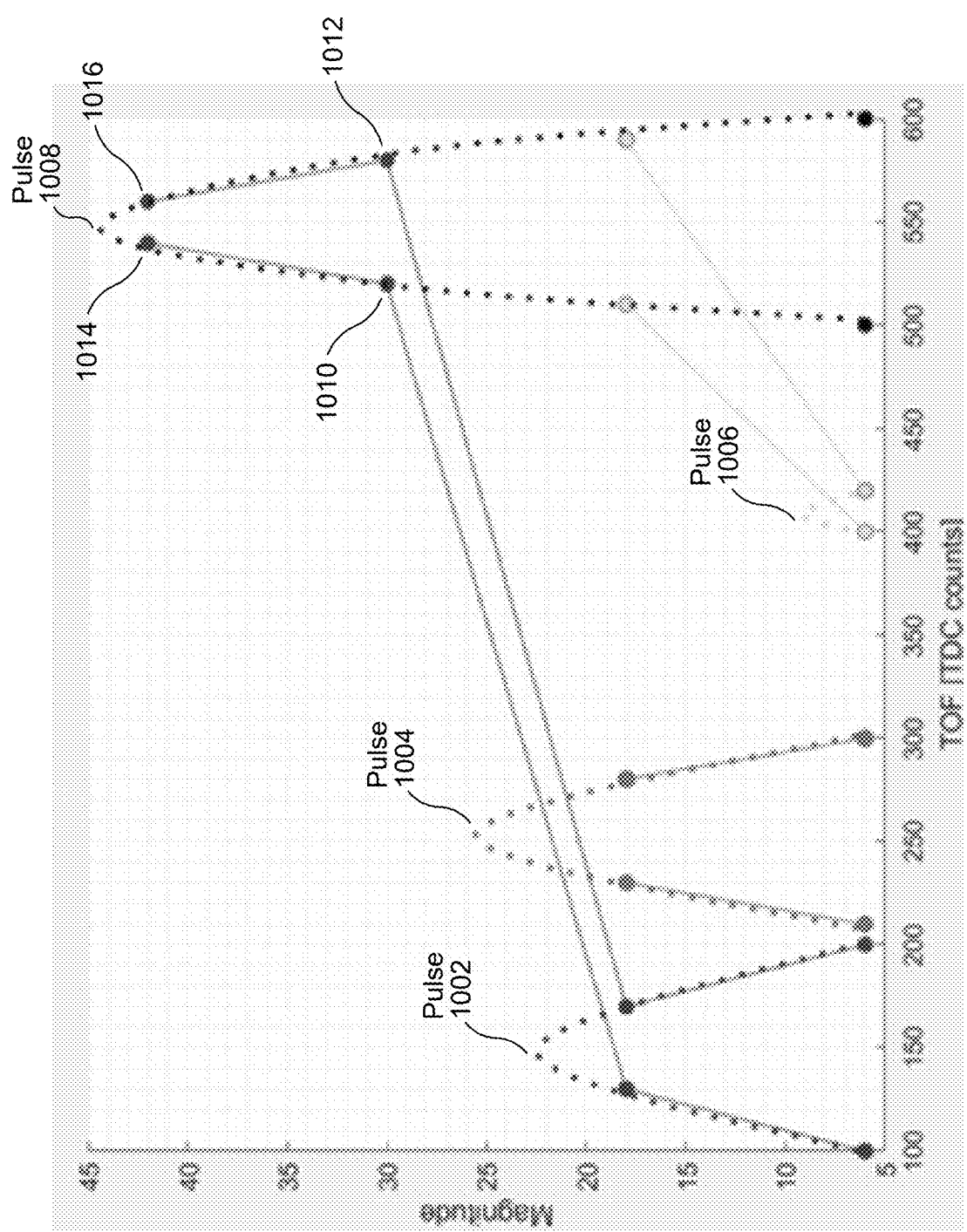
FIG. 10 illustrates an example of an artifact requiring pulse realignment.

FIG. 10 illustrates an example of an artifact requiring pulse realignment. The x-axis displays time in TDC counts and the y-axis displays pulse magnitude in arbitrary units. The artifact shown occurs in a system with multiple comparators because not all comparators agree as to which pulses correspond to which comparator thresholds. Smaller pulses may be missed by high-threshold comparators and detected by lower ones, which calls for the realignment of pulses from raw data samples. In the example shown, four pulses (pulse 1002, pulse 1004, pulse 1006, and pulse 1008) are present and would ideally be detected. In the example shown, samples of the pulses occur at four different comparator threshold levels (as a consequence of four comparators being used). Samples 1010 and 1012 of pulse 1008 are the first points detected by the third comparator, and samples 1014 and 1016 are the first points detected by the fourth comparator. Because in the raw data output, each column is allocated to a single pulse edge, the first column of data will contain two samples from the rising edge of pulse 1002 and also samples 1010 and 1014 from the rising edge of pulse 1008. Stated alternatively, if lower magnitude pulses reach the receiver first or if there are pulses that do not reach all of the different threshold levels of the comparators and/or have different magnitudes, the raw data output may need to be rearranged.

Figure 11:
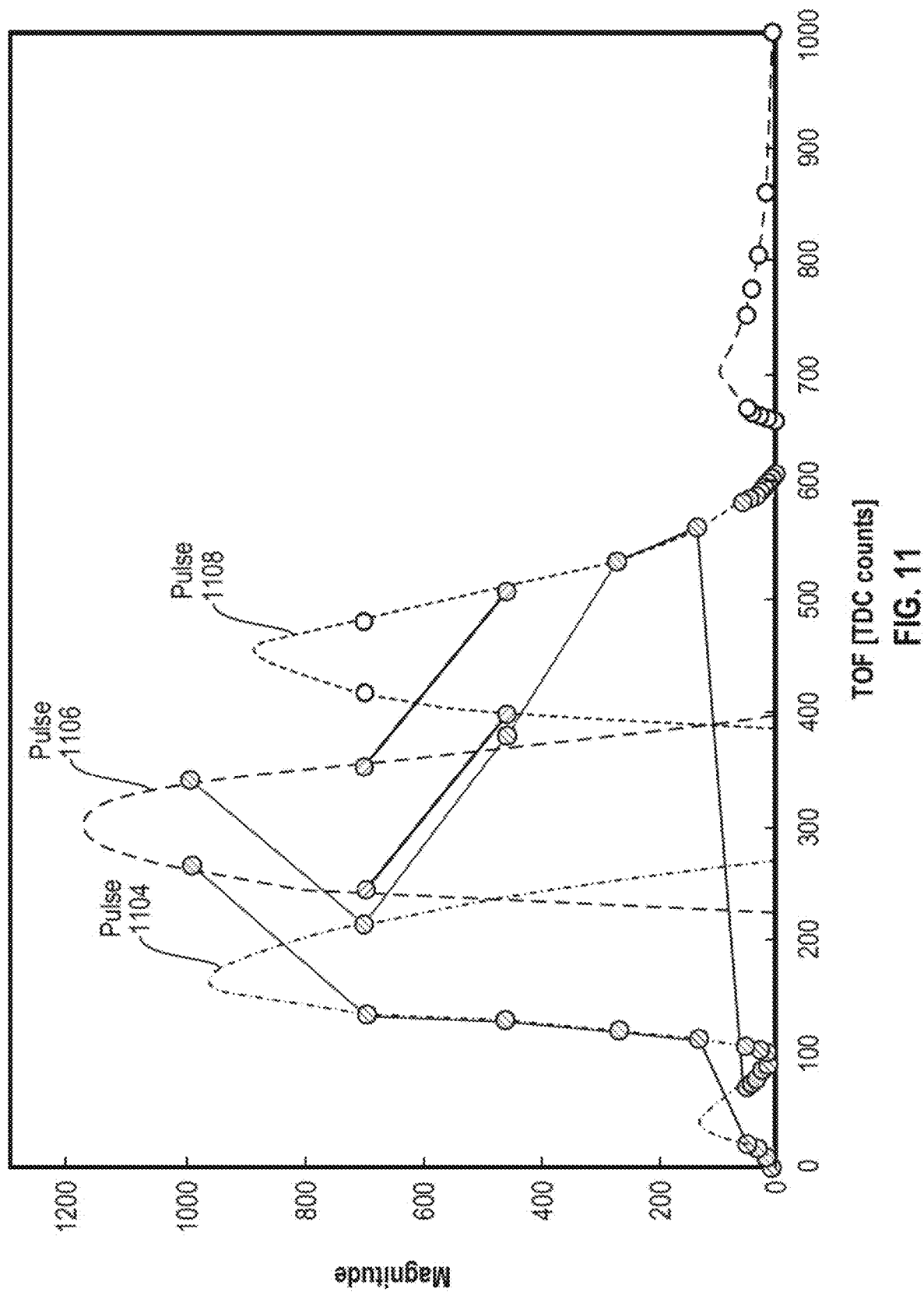
FIG. 11 illustrates an example of a fused pulse artifact.

FIG. 11 illustrates an example of a fused pulse artifact. The x-axis displays time in TDC counts and the y-axis displays pulse magnitude in arbitrary units. With respect to lidar systems, certain objects (e.g., tree foliage, transparent windshields, or solid objects that have been partly hit by a laser beam) return a multitude of pulses for each single transmitted pulse that intercepts them. Two or more of these multiple returns may be partly overlapped or fused together and must be disambiguated in order to resolve the respective targets. In the example shown, pulses 1104, 1106, and 1108 are fused together. In the overlap region, each of these three fused pulses are missing samples, which must then be generated during pulse reconstruction. In the example shown, the pulse alignment artifact of FIG. 10 is also present.

Figure 12:
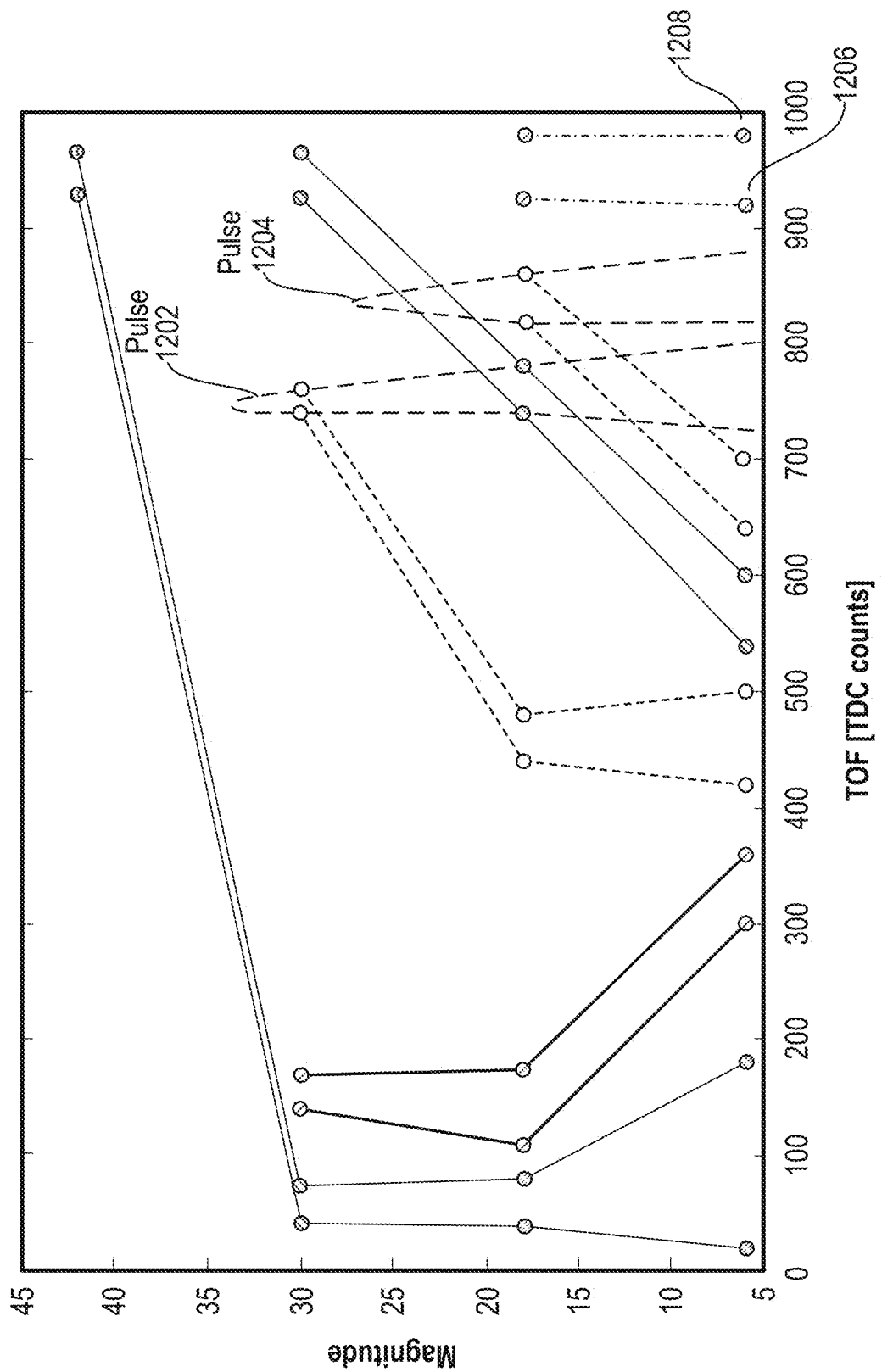
FIG. 12 illustrates an example of a floating pulse artifact.

FIG. 12 illustrates an example of a floating pulse artifact. The x-axis displays time in TDC counts and the y-axis displays pulse magnitude in arbitrary units. In order to save bandwidth and memory usage, some systems (e.g., some lidar systems) detect and store only a limited number of returns, irrespective of how many returns arrive at a receiver. After this number is reached, the last stored return is overwritten with every new detection. Because the most sensitive comparators are the ones with low thresholds, they are the most likely to overwrite legitimate pulses. However, there is a high likelihood that the overwritten pulses will be detected by higher-threshold comparators. The end result is referred to as a floating pulse, or a pulse that includes samples at the higher thresholds but not at the lowest thresholds. In the example shown, pulse 1202 and pulse 1204 (shown in dotted lines) are floating pulses. Pulse 1202 and pulse 1204 are missing their foundations, as they were overwritten by the lowest comparator in order to make room for samples 1206 and 1208. Stated alternatively, assuming storage space is limited to six pulses (two samples per comparator threshold per pulse), then the rising edge samples and falling edge samples for pulse 1202 and pulse 1204 at the comparator threshold level corresponding to samples 1206 and 1208 would be overwritten because samples 1206 and 1208 would occupy the sixth pulse storage slot for the lowest comparator threshold as the last to arrive samples at that threshold level. The missing samples from pulse 1202 and pulse 1204 need to be generated during pulse reconstruction and/or storage space needs to be created for these missing samples.

Figure 13:
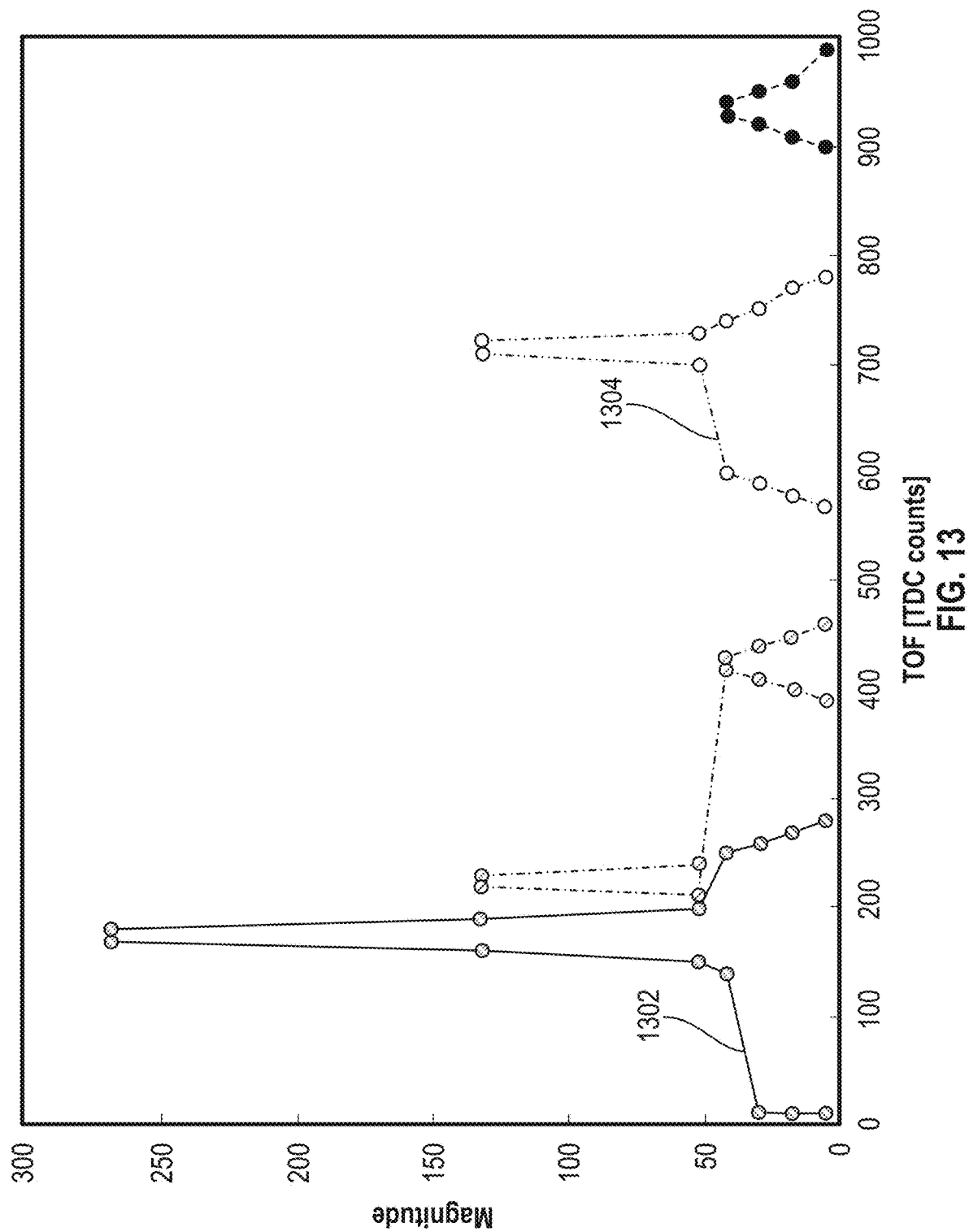
FIG. 13 illustrates an example of an inflection artifact.

FIG. 13 illustrates an example of an inflection artifact. The x-axis displays time in TDC counts and the y-axis displays pulse magnitude in arbitrary units. With respect to lidar systems, this artifact may occur as a consequence of a return from a retroreflective target (e.g., a STOP sign). Inflection artifacts are also referred to as distortion, "runt" pulse, or "porch" artifacts. The inflection artifact has the appearance of a fusion between a small, leading pulse and a larger following pulse. Typically, the leading small pulse is engulfed within the larger pulse and does not have a single falling edge sample, which makes it difficult split the pulses in the same way that the fused pulses of FIG. 11 can be split. In FIG. 11, each of the fused pulses has one or more samples in both the rising and the falling edges. The inflection artifact manifests itself as an inflection within the rising edge of the larger pulse. In the example illustrated, inflection artifacts can be observed at locations 1302 and 1304.

Figure 14A:
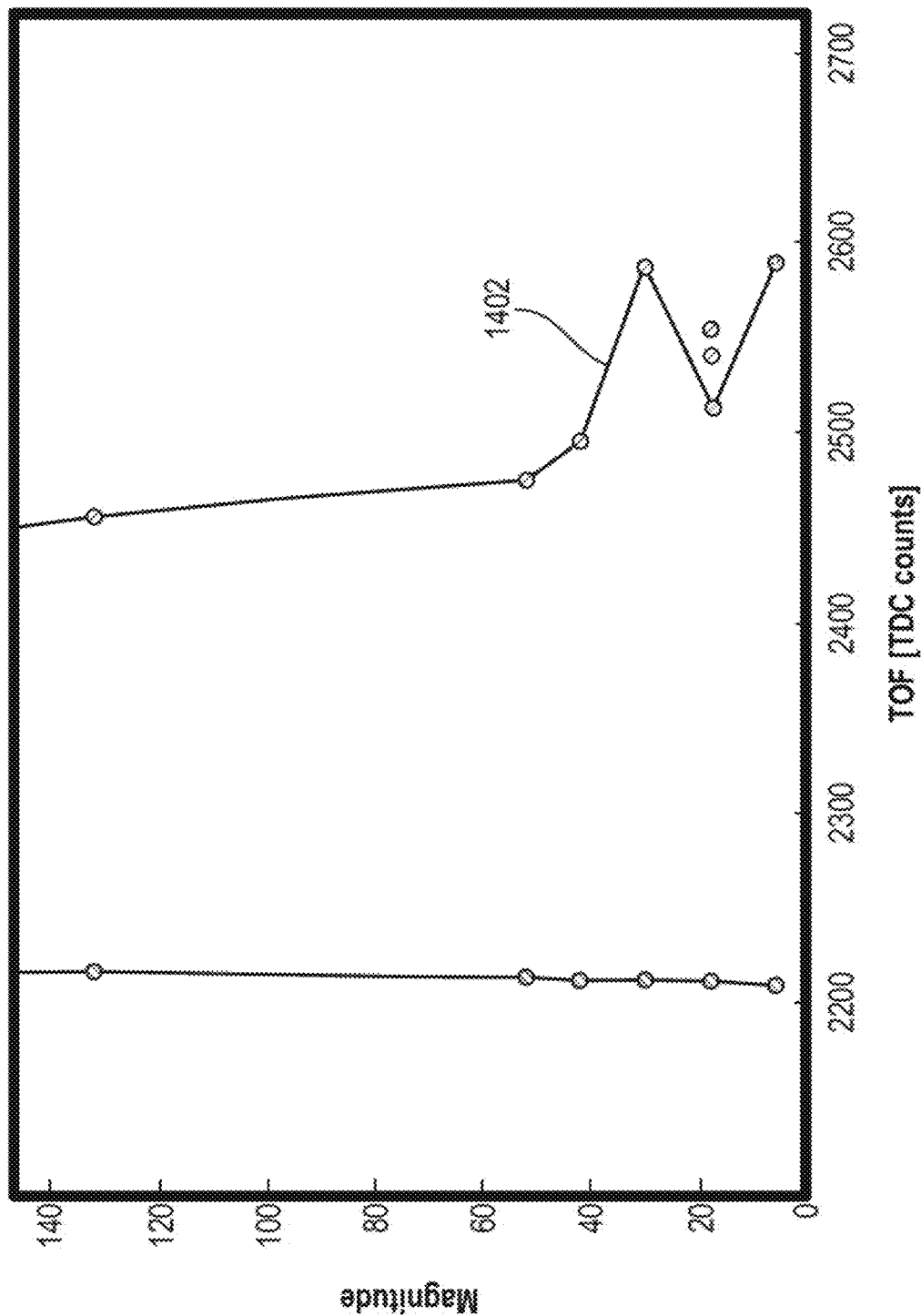
FIGS. 14A-14C illustrate examples of other artifacts.
Figure 14B:
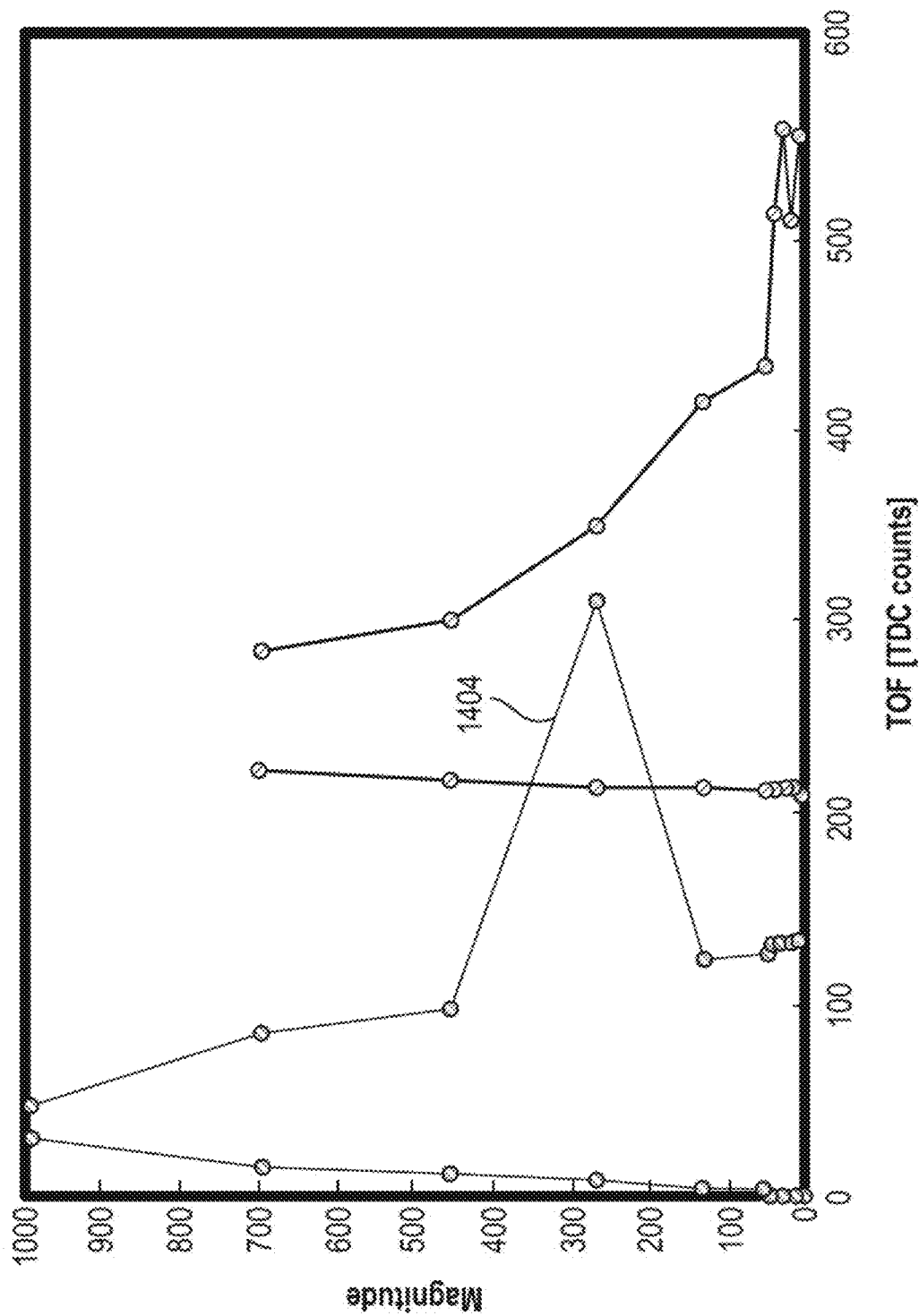
Figure 14C:
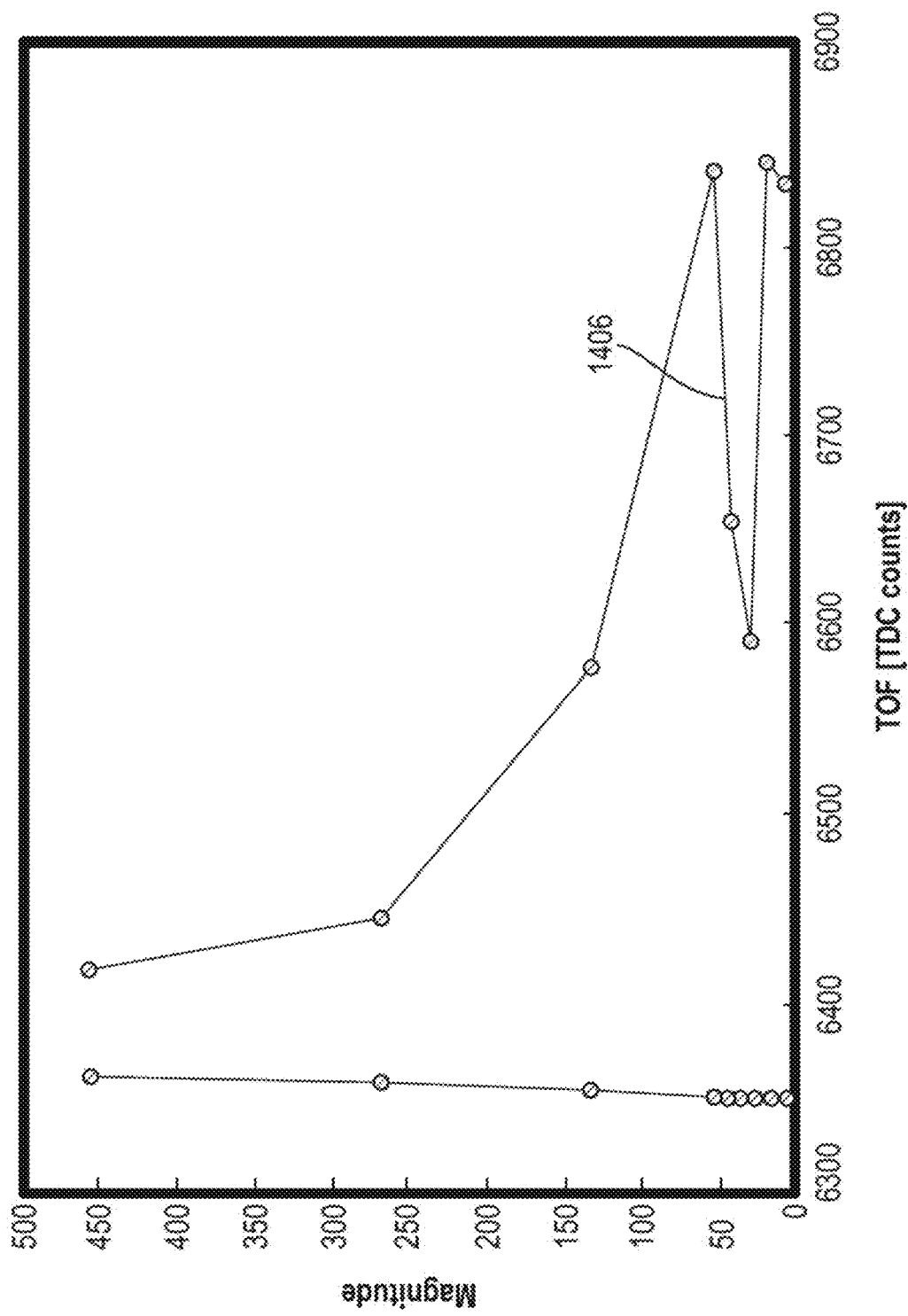

FIGS. 14A-14C illustrate examples of other artifacts. For each figure, the x-axis displays time in TDC counts and the y-axis displays pulse magnitude in arbitrary units. The example artifacts shown are oftentimes related to receiver hardware issues. Examples of such artifacts include zig-zags, identical, or reversed rising-falling samples (a side effect of a "sticky bit" issue) and serializer/de-serializer (SERDES) errors. The raw data output may also occasionally miss samples along certain pulse edges, a phenomenon referred to as an "orphan" edge. FIG. 14A illustrates a zig-zag at location 1402. FIG. 14B illustrates a corruption in two adjacent pulses at location 1404 due to SERDES errors. FIG. 14C illustrates a small pulse hidden in folds of a zig-zag at location 1406.

An accurate reconstruction in light of the artifacts shown in FIGS. 10-14 is desirable. The resolution of target objects as well as the estimation of their ranges and reflectance values depend on an accurate reconstruction. As demonstrated by FIGS. 10-14, an accurate reconstruction requires the capability to perform pulse realignment, separate fused pulses (including interpolation of missing samples), reconstruct floating pulses (including interpolation of missing samples), and provide robustness in the presence of pulse artifacts such as reversed samples and zig-zags (e.g., be able to recognize a zig-zag and the complications that may arise from a zig-zag and construct a single pulse despite the nonmonotonic edges and also be able to restore reversed edges).

Figure 15:
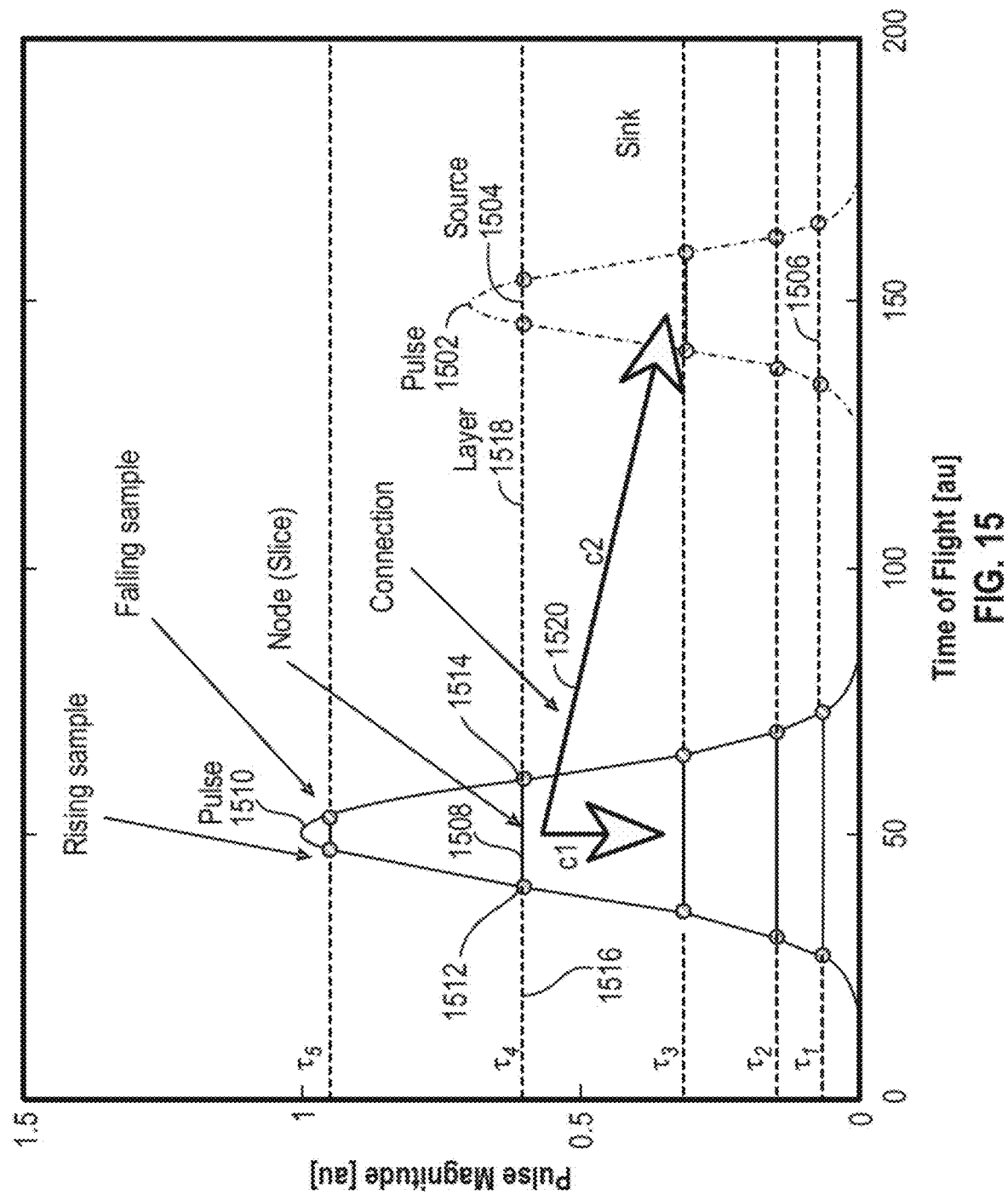
FIG. 15 illustrates notation and naming conventions.

FIG. 15 illustrates notation and naming conventions. In the diagram shown, the x-axis displays time in arbitrary units and the y-axis displays pulse magnitude in arbitrary units. With respect to the techniques disclosed herein, and as illustrated in FIG. 15, a pulse is represented as a directed graph in which the source (graph origin) is the top of the pulse and the sink (exit point) is the base of the pulse. For example, pulse 1502 has source 1504 and sink 1506. From the source to the sink, a pulse is a succession of nodes linked together through connections that each have a certain cost. Each node is a "slice" through the pulse consisting of a rising edge sample and a falling edge sample ("node" and "slice" are used interchangeably herein). For example, for node (slice) 1508 of pulse 1510, sample 1512 is its rising edge sample and sample 1514 is its falling edge sample. A slice through a pulse is defined by a threshold. For example, node (slice) 1508 through pulse 1510 is defined by threshold 1516. In the example shown, there are five thresholds corresponding to a bank of five comparators, each with a different threshold. The five thresholds in the example illustrated are $\tau_1$, $\tau_2$, $\tau_3$, $\tau_4$, and $\tau_5$, with threshold 1516 being $\tau_4$, the second to largest threshold shown. In its graph representation, each pulse has as many nodes as thresholds it intersects. The totality of nodes defined by the same threshold across multiple pulses is referred to as a layer. For example, layer 1518 comprises nodes at threshold 1516 of pulse 1502 and pulse 1510.

Using the notation described above, in various embodiments, a goal of pulse reconstruction is to iteratively connect nodes from a higher layer (referred to as the up-layer or u-layer) to nodes from the immediately lower layer (referred to as the down-layer or d-layer) based on minimizing a connection cost. For example, node 1508 has connection 1520 to two nodes in its immediately lower layer, with connection costs c1 and c2. In various embodiments, processing starts from the top (highest) layer and processes all nodes in a layer in a same iteration. In various embodiments, a cost matrix is derived for each two successive layers (the u-layer above and the d-layer below) starting from the top layer. If the u-layer has M nodes and the d-layer has N nodes, the dimensions of the cost matrix will be M×N, as the cost matrix will incorporate the costs of all possible node-to-node connections that can be established between the two layers. For example, in a channel with as many as 10 pulses, the cost matrix could be as large as 10×10. Also, as used herein, nodes in the u-layer are referred to as u-nodes, and nodes in the d-layer are referred to as d-nodes.

Figure 16B:
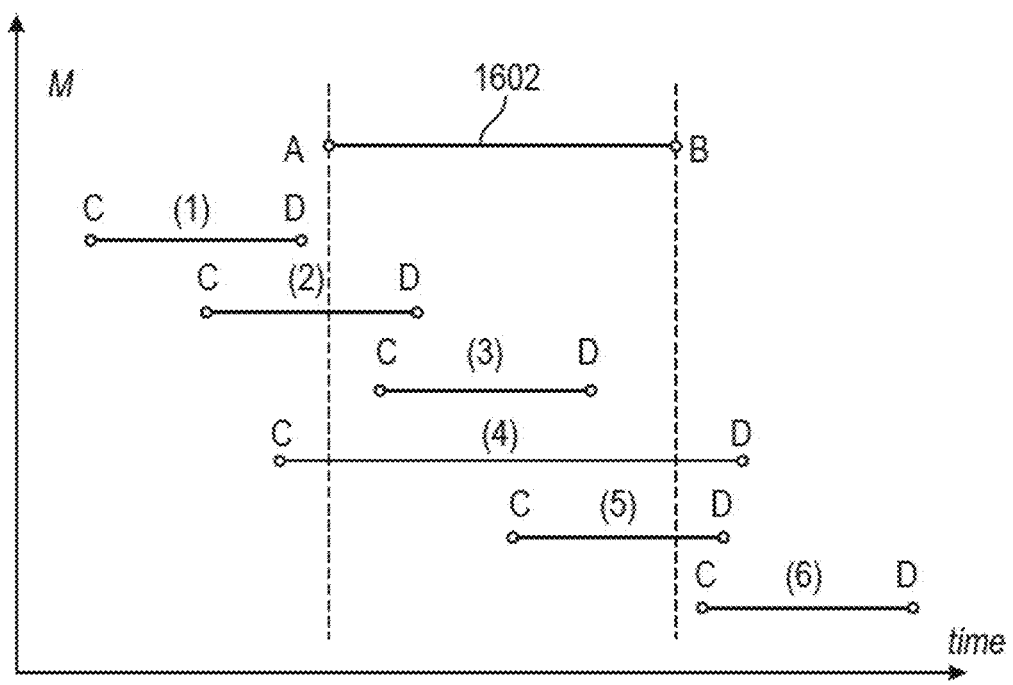

FIGS. 16A and 16B illustrate determination of a connection cost. In each figure, the x-axis corresponds to time and the y-axis corresponds to pulse magnitude. The connection cost is calculated for a pair of nodes. Stated alternatively, each calculated connection cost corresponds to an element in a cost matrix. Consider a pair of nodes as shown in FIG. 16A, source node S 1602 and sink node K 1604, situated on an arbitrary u-layer and corresponding d-layer, respectively. A and C, respectively, denote the rising edge samples of S and K. Similarly, B and D are their respective falling edge samples. Although the illustration suggests that S and K are part of the same pulse, that is not necessarily the case. There are in fact six possibilities with regard to the relative position of K with respect to S, and these are labeled (1) to (6) in FIG. 16B. In various embodiments, the cost between S and K corresponds to which of these six possibilities has occurred, in other words, the degree of overlap between the two nodes. FIG. 16B shows source node S 1602 (connected by samples A and B) and six different possible relative overlap positions for node K labeled (1) to (6).

In case (1), the two nodes do not overlap, as both the rising and the falling edges of node K occur before the rising edge of node S. In case (2), the two nodes partially overlap, as the falling edge of node K occurs after the rising edge but before the falling edge of node S. In case (3), the two nodes completely overlap, as both the rising and the falling edges of node K occur after the rising edge and before the falling edge of node S. In case (4), the two nodes completely overlap, as the rising edge of node K occurs before the rising edge of node S and the falling edge of node K occurs after the falling edge of node S. In case (5), the two nodes partially overlap, as the rising edge of node K occurs after the rising edge but before the falling edge of node S. In case (6), the two nodes do not overlap, as both the rising and falling edges of node K occur after the falling edge of node S. There are four cases in which there is some degree of overlap, namely, cases (2), (3), (4), and (5). Of these four cases, cases (3) and (4) exhibit complete overlap in which a node is completely enclosed within the other node from a geometric standpoint.

In various embodiments, for a given pair of nodes (e.g., nodes S and K), a cost value is assigned (to be part of a cost matrix) based on the relative positions (different overlaps as shown in FIG. 16B) of the pair of nodes. In some embodiments, each cost value to be assigned to the cost matrix is either a 0 or a 1. Stated alternatively, in these embodiments, the cost matrix is a logical matrix, with true (1) and false (0) values. An advantage of this formulation is computational efficiency. In the examples to follow, a specific formulation is described. Other formulations are also possible. Furthermore, any cost minimization technique can be equivalently formulated as maximization of a property that is the opposite of cost. In some embodiments, assignment of logical values to the six cases illustrated in FIG. 16B is as follows: a value of 1 is assigned to pairs that do not overlap (cases (1) and (6)), a value of 0 is assigned to pairs with complete overlap (cases (3) and (4)), and a value of either 0 or 1 is assigned to pairs that partially overlap depending on the amount of overlap (cases (2) and (5)). Specifically, an example rule for case (2) is to assign a value of 1 if $$\frac{D-A}{\min(W_u, W_d)} \leq \text{MIN\_ALLOWED\_OVERLAP} \quad \text{(Equation 1)}$$

and 0 otherwise, and an example rule for case (5) is to assign a value of 1 if $$\frac{B-C}{\min(W_u, W_d)} \leq \text{MIN\_ALLOWED\_OVERLAP} \quad \text{(Equation 2)}$$

and 0 otherwise. For Equations 1 and 2, $W_u$=B−A, $W_d$=D−C, MIN_ALLOWED_OVERLAP is an adjustable threshold (e.g., may be set to 0.7), and the variables A, B, C, and D are the x-axis time values for the node S rising edge, node S falling edge, node K rising edge, and node K falling edge, respectively. Thus, in Equations 1 and 2, a value of 1 is assigned if the overlap is less than or equal to a specified threshold and a value of 0 is assigned otherwise. Thus, for the given pair of nodes, in various embodiments, first an overlap case (e.g., cases (1) through (6)) is determined and then a value is assigned based on the overlap case. As described earlier, due to sticky bits and SERDES errors, there is a possibility that B<A and/or C>D. For these situations, additional logic in the above cost framework can be included to check for and swap faulty pairs.

Figure 17:
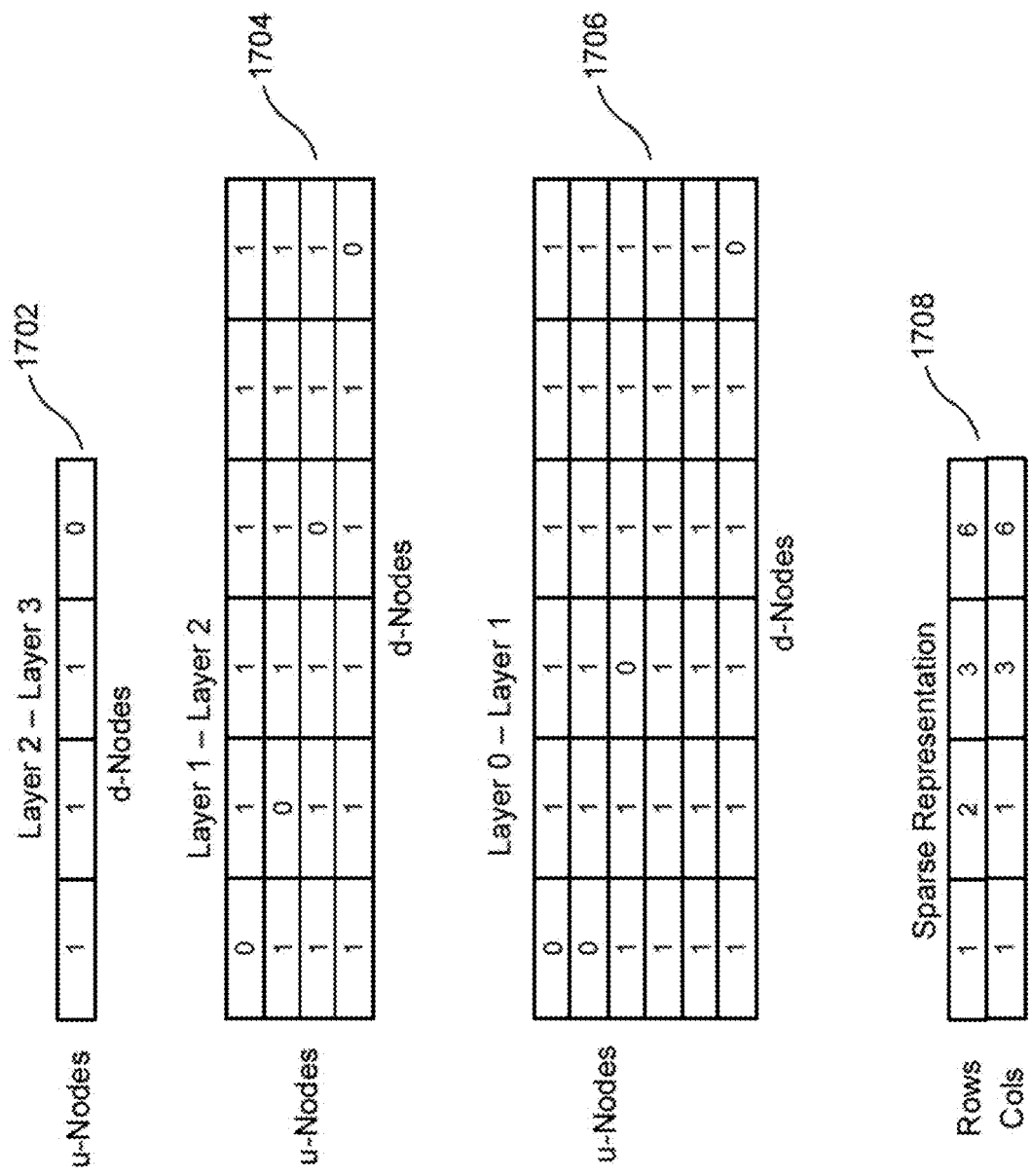
FIG. 17 illustrates cost matrices for the pulse configuration of FIG. 12.

FIG. 17 illustrates cost matrices for the pulse configuration of FIG. 12. The cost matrices illustrated follow the conventions described in FIGS. 15, 16A, and 16B. Cost matrix 1702 corresponds to the top layer shown in FIG. 12 being the u-layer. Because this u-layer has only one node and its corresponding d-layer has four nodes, cost matrix 1702 has one row of four entries. Cost matrix 1704 corresponds to the second highest layer shown in FIG. 12 being the u-layer. Because this u-layer has four nodes and its corresponding d-layer has six nodes, cost matrix 1704 has four rows, each with six entries. Cost matrix 1706 corresponds to the second lowest layer shown in FIG. 12 being the u-layer. Because this u-layer has six nodes and its corresponding d-layer has six nodes, cost matrix 1706 has six rows, each with six entries. Various patterns can be discerned from the cost matrices. For example, in cost matrix 1706, the first column has two zeros, which indicates two fused pulses that need to be split. Indeed, in FIG. 12, the first and second u-nodes of the second lowest layer are both connected to (overlap substantially with) the first d-node of the lowest layer. Another artifact is also indicated by cost matrix 1706. Two floating pulses are indicated by the fourth and fifth rows of matrix 1706 because these rows contain only ones. The floating pulses are illustrated in FIG. 12 as pulse 1202 and pulse 1204. These pulses need to be extended to the baseline by adding appropriate d-nodes in the bottom layer.

After an entire cost matrix between a pair of adjacent layers has been computed, some particular patterns may be observed that are associated with specific artifacts to be resolved during pulse reconstruction. Examples of these patterns are as follows. A zero-diagonal matrix (single zero observed in any given row) is a canonical form that indicates an ideal case in which each u-node is connected to a single d-node, which should be the case after pulse reconstruction. A pattern of two zeros in a row (one u-node connects to two d-nodes) should not be possible (a node should not split by itself through the middle), but artifacts like the one shown in FIG. 1A may create this pattern, which can be corrected by selecting the d-node with the earliest rising edge (so the u-node connects to only one d-node). A pattern of two zeros in a column (two u-nodes connect to a single d-node) indicates a fused pulse, e.g., as shown in FIG. 11, which can be corrected using a split procedure that is described in further detail herein. A pattern of all ones in a column (a d-node not connected to anything on the u-layer) indicates a situation in which a pulse ends before it can reach the threshold that defines the u-layer. A pattern of all ones in a row (a u-node not connected to anything on the d-layer) indicates a floating pulse (pulse that terminates before it reaches the baseline, e.g., as shown in FIG. 12), which can be corrected using a floating pulse restoration procedure (as described in further detail herein) that creates a new node on the d-layer that would provide a continuation of the floating pulse. There is no pattern in the cost matrix that indicates the inflection artifact shown in FIG. 13, meaning such an artifact would need to be detected and corrected separately.

As a final observation, after corrections for fused, floating, and inflection artifacts are applied, a cost matrix between respective layers will change, such as by having a new column added. This new column corresponds to a new node on the d-layer. As mentioned earlier, in some scenarios, a cost matrix may have up to 10×10 elements. Repeatedly inserting columns in a matrix this size will entail major amounts of data shuffling and affects compute efficiency. In addition, the cost matrix is typically 0-sparse, in the sense that it should have many more ones than zeros. These observations suggest that, as a practical consideration, the cost matrix can be stored and maintained as a sparse matrix. Stated alternatively, instead of storing an entire 10×10 matrix, it is possible to store just the i (row) and j (column) coordinates of the zeros, which are the sparse and relevant values. Cost matrix 1708 illustrates such a sparse matrix representation of cost matrix 1706. It indicates that the zeros are located at four coordinates: (row 1, column 1), (row 2, column 1), (row 3, column 3), and (row 6, column 6) by reading each column of cost matrix 1708 as a coordinate.

Figure 18:
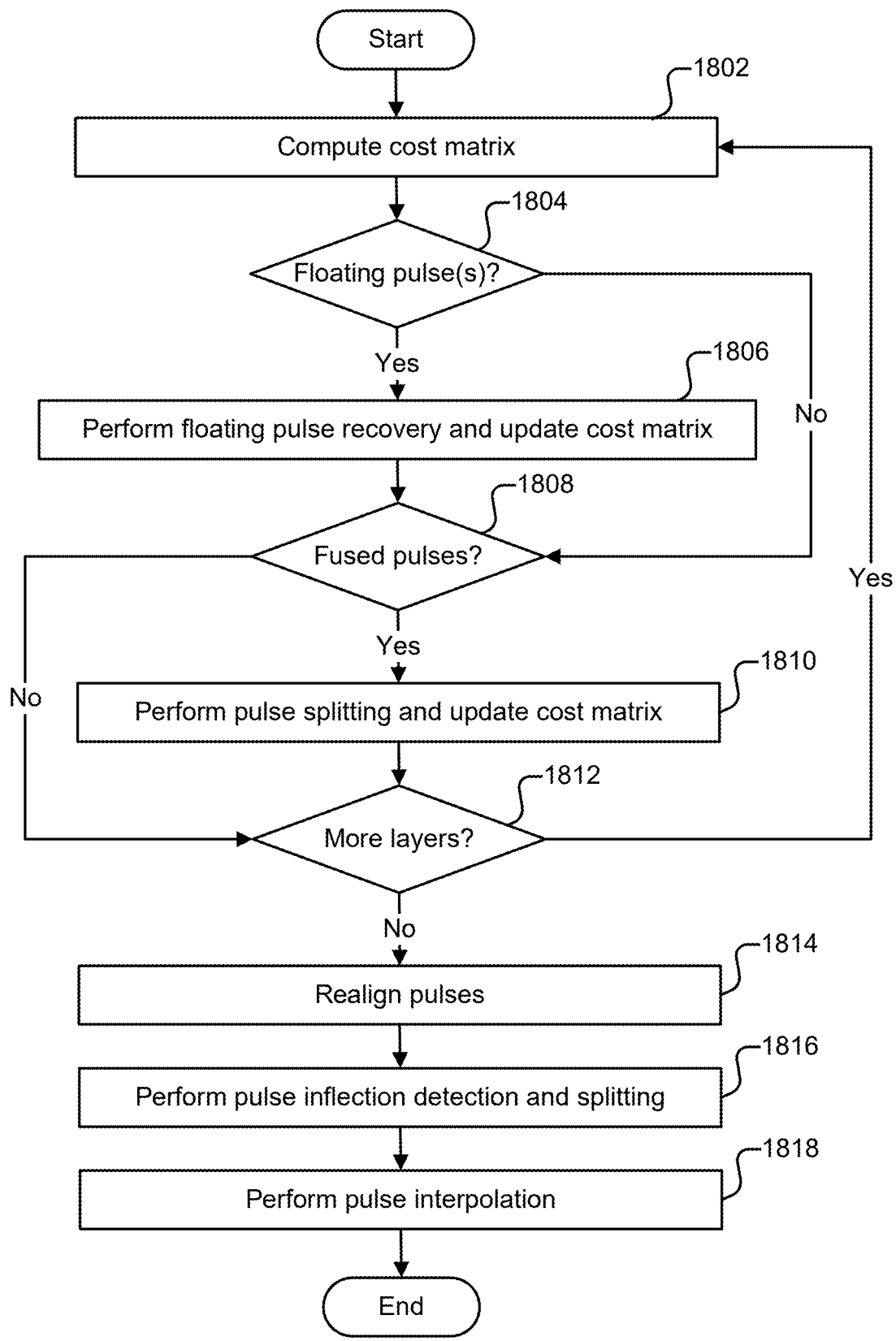
FIG. 18 illustrates an example process for performing pulse reconstruction.

FIG. 18 illustrates an example process for performing pulse reconstruction. The process of FIG. 18 is based on the capabilities of cost matrices to diagnose artifacts between two layers. Thus, as described below, a layer loop that starts from the top layer is utilized to correct artifacts in a layer-to-layer manner. The process of FIG. 18 may be performed by various types of processing components. For example, the process of FIG. 18 may be performed by controller 150 of FIGS. 1 and/or 6, computer system 2700 of FIG. 27, and/or one or more other processors.

At 1802, a cost matrix is computed. In various embodiments, the first cost matrix that is computed corresponds to the top two layers (top layer being the u-layer and the layer below the top layer being the d-layer).

At 1804, it is determined whether there are floating pulse(s) as indicated by the computed cost matrix. If at 1804 it is determined that there are floating pulse(s), then at 1806, a floating pulse recovery is performed and the cost matrix is updated. If at 1804 it is determined that there are no floating pulse(s), then 1806 is skipped.

As described above, the signature of a floating pulse is the presence of a row in the cost matrix that has all ones. Because a row corresponds to a u-node, this implies that the respective u-node is not connected to anything in the d-layer. In various embodiments, to correct the floating pulse artifact, a new d-node with a width at least equal to the one of the u-node is created and completely overlapped with the u-node. In various embodiments, for each floating node detected, the following actions are performed: 1) insert a new d-node in the d-layer that aligns with the floating u-node (e.g., by adding a rising edge sample and a falling edge sample in chronologically appropriate positions within the samples associated with the d-layer); and 2) insert a new connection in the cost matrix (e.g., by adding an element into the row and the column arrays of a sparse cost matrix representation in an appropriate position. In FIG. 12, two floating pulses are present, and therefore, the procedure outlined above would be applied twice in succession. FIG. 19 illustrates cost matrix updates reflecting corrections for the floating pulses in FIG. 12. Cost matrix 1902 is an updated version of cost matrix 1706 of FIG. 17. Cost matrix 1902 includes two new columns (the sixth and seventh columns, each with a single zero element) to reflect applying floating pulse restoration twice (for the two floating pulses in FIG. 12). Cost matrix 1904 is the corresponding sparse representation of cost matrix 1902 (updated version of cost matrix 1708 of FIG. 17 to reflect two additional zero elements). Matrix 1906 shows the rising edge and falling edge sample times in the bottom layer of FIG. 12 before floating pulse restoration. Matrix 1908 shows the updated rising edge and falling edge sample times (two sets of rising and falling edge samples are created to reflect two d-nodes being created). In this example, the created d-nodes share the rising edge and falling edge sample times with the nodes in the u-layer. Stated alternatively, the created d-nodes have rising and falling edge sample times identical to those of the last available node through the floating pulse (missing samples are duplicated towards the baseline, which is straight-down interpolation). It is also possible to utilize other interpolation techniques to reconstruct a more natural shape for each floating pulse.

Returning to the process of FIG. 18, at 1808, it is determined whether there are fused pulses as indicated by the computed cost matrix. If at 1808 it is determined that there are fused pulses, then at 1810, pulse splitting is performed and the cost matrix is updated. If at 1808 it is determined that there are no fused pulses, then 1810 is skipped.

Figure 20:
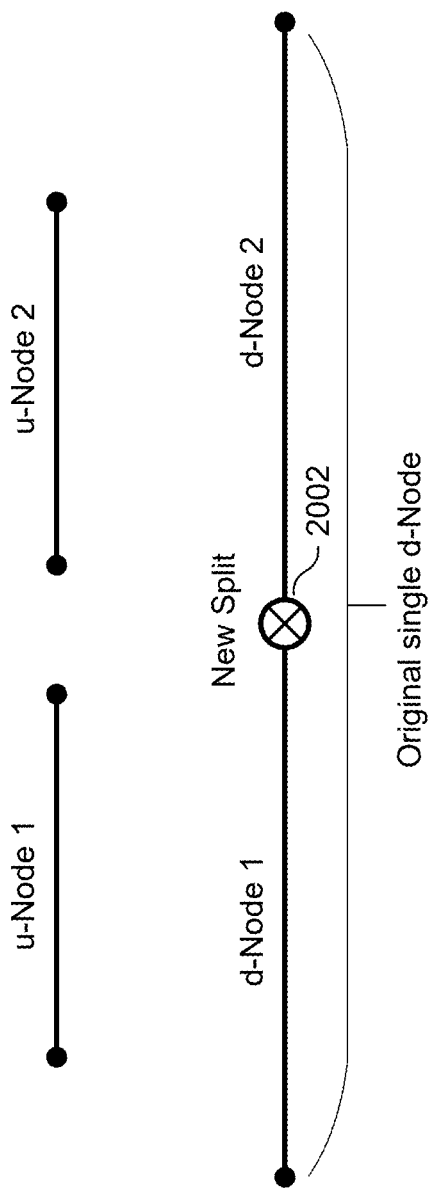
FIG. 20 illustrates an example of a two-pulse split.
Figure 21:
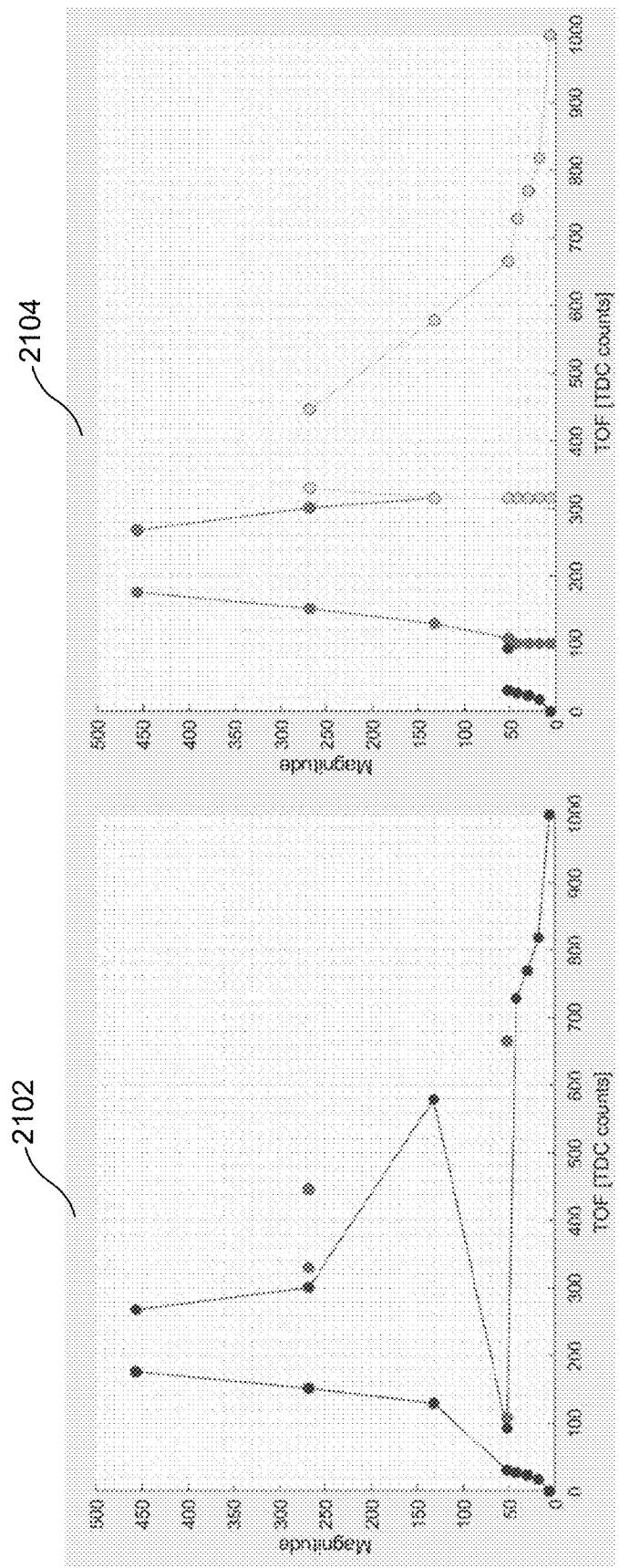
FIG. 21 illustrates an example of a three-pulse split.

As described above, the signature of fused pulses is two zeros in a column, indicating that a d-node associated with the column needs to be split. Fused pulse and floating pulse restoration procedures are similar in the sense that they both create new d-nodes that are calculated to accommodate u-nodes that have no support on the d-layer. In the case of floating pulses, the new d-node is placed to coincide with the u-node with no support. In contrast, in fused pulse restoration, an already existing d-node is split into two or more d-nodes. FIG. 20 illustrates an example of a two-pulse split. As shown in FIG. 20, two d-nodes are created by splitting an original single d-node at split point 2002 in order to support two u-nodes that each connects and overlaps fully with a single d-node. This split introduces two identical edges, a falling edge, which closes the first newly created d-node, and a rising edge, which starts the second newly created d-node. FIG. 21 illustrates an example of a three-pulse split. In FIG. 21, graph 2102 illustrates samples of three fused pulses, and graph 2104 illustrates the resolved pulses after splitting.

Figure 22:
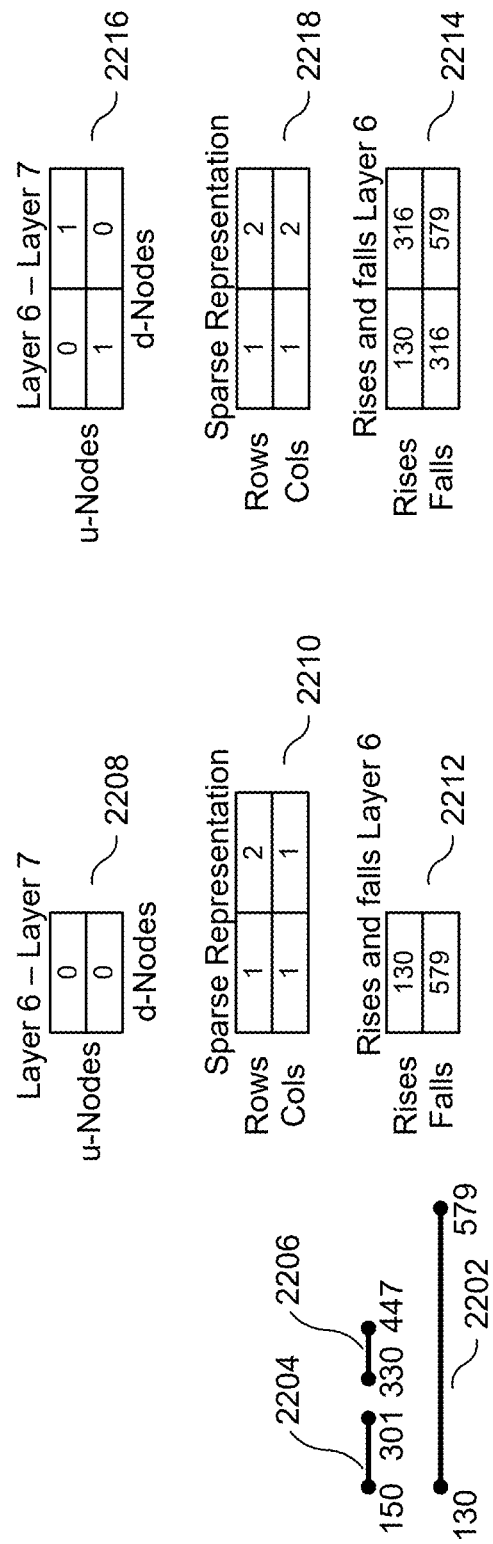
FIG. 22 illustrates a zoomed-in representation, cost matrices, and rise and fall vectors for FIG. 21.

The example shown in graph 2102 of FIG. 21 has eight layers, out of which the bottom six need a pulse splitting operation. The first split, which is a one-in-two split, is needed in the sixth layer (from the bottom) that sits at a pulse magnitude threshold of 132. FIG. 22 illustrates a zoomed-in representation, cost matrices, and rise and fall vectors for FIG. 21. Timing 2202 shows the d-node in the sixth layer (sixth from bottom) of graph 2102 extending from TDC counts of 130 to 579. Timing 2204 shows the first u-node in the seventh layer (seventh from bottom) extending from TDC counts of 150 to 301. Timing 2206 shows the second u-node in the seventh layer (seventh from bottom) extending from TDC counts of 330 to 447. Cost matrix 2208 corresponds to the sixth and seventh layers and shows the two zeros signature for fused pulses. Cost matrix 2210 is the sparse representation of cost matrix 2208. Matrix 2212 shows the rising edge and falling edge sample times for the sixth layer. In FIG. 22, matrix 2214 shows pulse splitting has the effect of creating a new falling edge and a new rising edge introduced in succession in the sixth layer. The split point here is the midpoint (TDC count 316) between the falling edge of timing 2204 and the rising edge of timing 2206. Numerically, in this example, the new falling edge and new rising edge are identical, but alternatives exist in which the newly created samples are positioned so that they confer a natural shape to both new pulses. For example, new samples may be calculated such that the new pulses' rising and falling edges follow the similar edges from adjacent, fully defined pulses that have similar heights. Cost matrix 2216 includes a new column to reflect a d-node being added as a result of the pulse splitting. Cost matrix 2218 is the sparse representation of cost matrix 2216. In the example shown, similar splitting is performed for lower layers. In the bottom four layers, three d-nodes need to be created from a single d-node.

Returning to the process of FIG. 18, at 1812, it is determined whether there are more layers for which cost matrices need to be computed. For example, for a configuration with a total of six layers, the loop comprised of steps 1802 to 1812 would need to be run five times to compute five cost matrices. If at 1812 it is determined that there are one or more additional layers for which cost matrices should be computed, then the process of FIG. 18 returns to 1802. Otherwise, the process of FIG. 18 continues to 1814.

Figure 23:
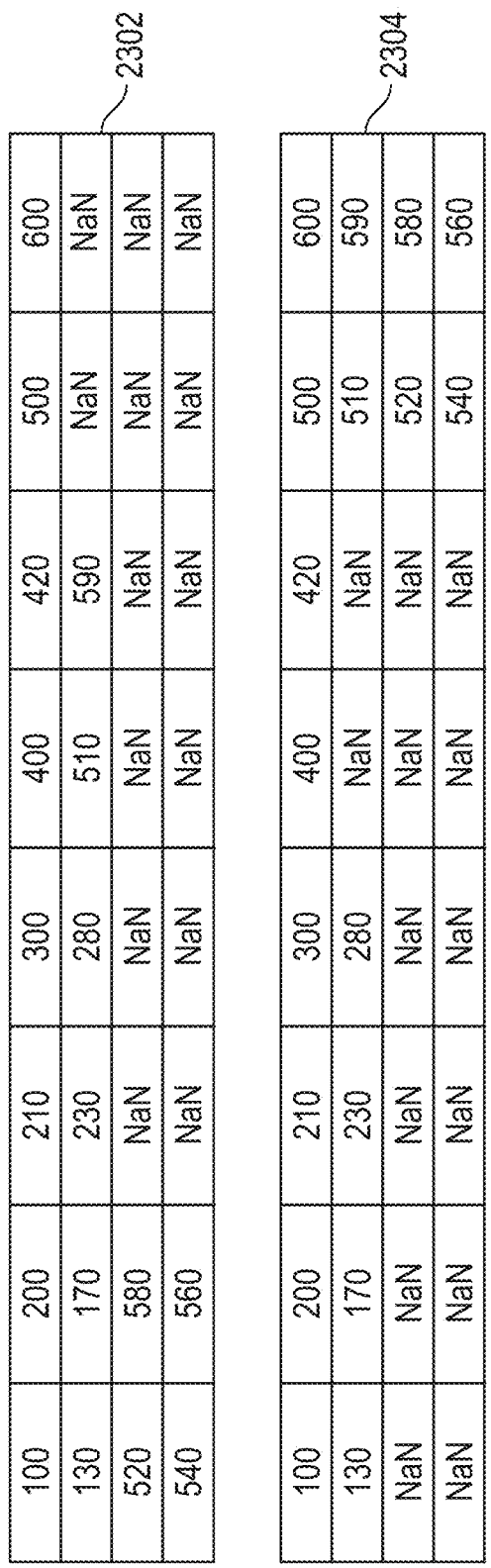
FIG. 23 illustrates realignment of the pulse configuration of FIG. 10.

At 1814, pulses are realigned. After floating and fused pulses have been resolved, realignment may be conducted so as to resolve the situation shown in FIG. 10 in which nodes belonging to a certain pulse may be reported in different positions by different comparators depending on their threshold settings and the relative magnitudes of the pulses in the sequence of pulses. For example, pulse 1008 in FIG. 10 is perceived as pulse 1002 by the top two comparators. After realignment, pulse 1008 should appear in the fourth position in all comparators that detected it. In some embodiments, a "not-a-number" value (e.g., NaN symbol) or an equivalent convention is used to signify the fact that no samples are detected in the respective pulse slots. In addition, oftentimes this correction requires additional pulse slots to capture pulses that are newly produced during floating pulse restoration and pulse splitting. With respect to lidar systems, scenes that include a lot of foliage or a multitude of small objects can produce an unusually high number of returns (e.g., 10), which oftentimes requires adding pulse slots. FIG. 23 illustrates realignment of the pulse configuration of FIG. 10. Matrix 2302 shows assignments of comparator readings to pulses before realignment. Each pair of columns indicates the nodes of a detected pulse (8 columns for 4 pulses). However, matrix 2302 shows mis-alignment (e.g., the top two nodes of pulse 1008 listed in the columns for pulse 1002). Matrix 2304 shows the comparator readings re-arranged so that they correspond to the correct pulse locations (e.g., the 520 to 580 and 540 and 560 listings in the first two columns of matrix 2302 being moved to the last two columns of matrix 2304, which correspond to pulse 1008). It is apparent in FIG. 23 that nodes from pulse 1008 that were distributed over comparator columns assigned to the pulse 1002 and pulse 1006 are now realigned back to the comparator columns for pulse 1008.

Figure 24:
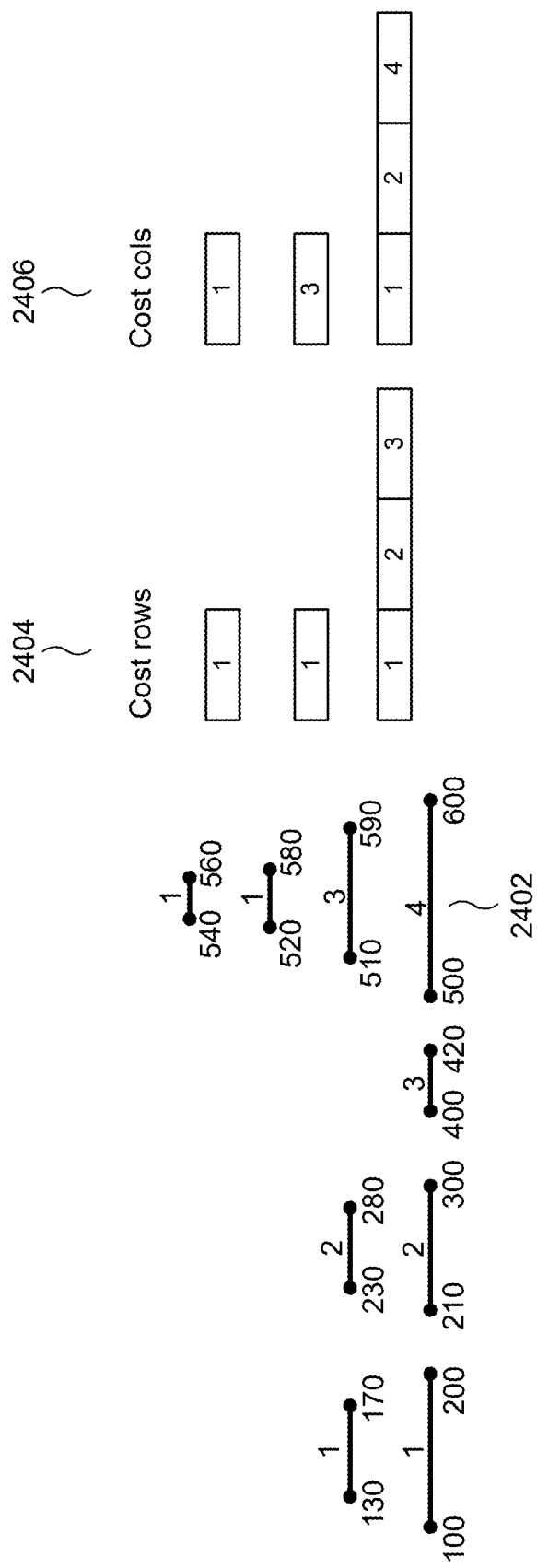
FIG. 24 illustrates node structure and cost arrays for the pulse configuration of FIG. 10.

In various embodiments, performing realignment starts from the baseline because the baseline layer (bottom layer) has the highest number of nodes. In various embodiments, cost matrices are utilized, layer-by-layer, to perform the realignment. Because the baseline layer is already in pulse chronological order, the baseline layer remains unchanged. Realignment may be needed from the second layer (layer above the baseline layer) and up. FIG. 24 illustrates node structure and cost arrays for the pulse configuration of FIG. 10. The numbers on top of the node timings shown on the lefthand portion of FIG. 24 indicate which comparator is assigned each node timing. As mentioned above, the baseline row has the correct comparator assignments, thus producing the correct pulse order. However, the rest of the layers do not. The values 1, 1, and 3 in the last group of node timings (group 2402) should read 4 to correspond to pulse 1008 of FIG. 10. In the second layer (layer above the baseline layer), the last node's label should be changed from 3 to 4. This can be ascertained by examining the cost matrix for the pulse configuration of FIG. 10. The cost matrix is shown in FIG. 24 in sparse representation as cost rows 2404 and cost columns 2406. Because the cost matrix shows the coordinate (3,4) as a zero, this indicates the node whose timing is 510 to 590 is the u-node for the node whose timing is 500 to 600, which indicates the former is part of the same pulse as the latter. This means the label 3 in the second layer should be changed to 4. The above amounts to assigning to each node the pulse corresponding to that node's d-node. Stated alternatively, because the cost matrix indicates the node whose timing is 510 to 590 overlaps with the node whose timing is 500 to 600, the latter is the former's d-node, meaning the former and latter are part of the same pulse. This analysis based on the cost matrix can be applied iteratively upward until all nodes are assigned to the correct pulses.

Figure 25:
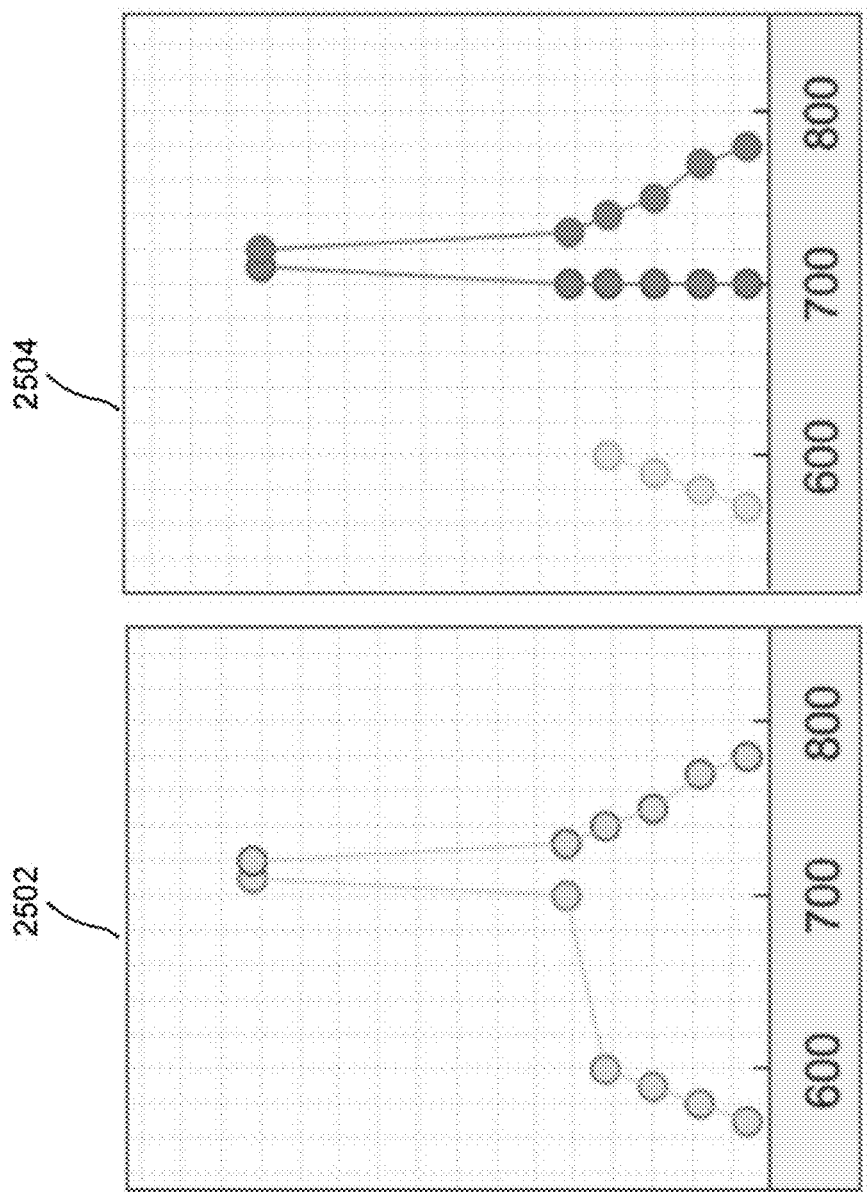
FIG. 25 illustrates an example of a pulse corrected for an inflection artifact.

Returning to the process of FIG. 18, at 1816, pulse inflection detection and splitting is performed. Inflections are detected and corrected outside the layer loop because the detection logic needs the pulses to be aligned and correctly positioned. As previously mentioned, inflection artifacts can be caused by small pulses completely engulfed within larger pulses, to the point where the small pulse (typically the preceding pulse) does not have a single falling edge sample. With respect to lidar systems, strong reflectors such as a stop sign can cause inflection artifacts, or "runt" pulses. The reason why the inflection separation is not just a particular case of fused pulse separation is that the detection of inflections cannot be conducted before the pulses have been completely aligned. Examples of inflection artifacts can be seen at locations 1302 and 1304 of FIG. 13. To detect such inflections, in some embodiments, a first order derivative of each rising edge is computed. The first order derivative may be defined as the difference between successive rising edge samples. The first order derivative can then be compared with a specified threshold. Inflection artifacts can be characterized as changes from a high first order derivative to a much lower one (corresponding to the flat "porch" portion of the inflection artifact). FIG. 25 illustrates an example of a pulse corrected for an inflection artifact. Graph 2502 shows the pulse from FIG. 13 with an inflection artifact at location 1304. Graph 2504 shows the pulse of graph 2502 with the inflection artifact corrected.

Returning to the process of FIG. 18, at 1818, pulse interpolation is performed. During pulse interpolation, new values that more naturally follow pulse shapes are determined. In some embodiments, 1818 is optional and may be skipped to improve computational efficiency. In the absence of pulse interpolation, missing samples can be filled with straight-down interpolates.

FIG. 19 illustrates cost matrix updates reflecting corrections for the floating pulses in FIG. 12. FIG. 19 is described in detail above with respect to FIG. 18.

FIG. 20 illustrates an example of a two-pulse split. FIG. 20 is described in detail above with respect to FIG. 18.

FIG. 21 illustrates an example of a three-pulse split. In the diagram shown, the x-axis displays time in TDC counts and the y-axis displays pulse magnitude in arbitrary units. FIG. 21 is described in detail above with respect to FIG. 18.

FIG. 22 illustrates a zoomed-in representation, cost matrices, and rise and fall vectors for FIG. 21. FIG. 22 is described in detail above with respect to FIG. 18.

FIG. 23 illustrates realignment of the pulse configuration of FIG. 10. FIG. 23 is described in detail above with respect to FIG. 18.

FIG. 24 illustrates node structure and cost arrays for the pulse configuration of FIG. 10. FIG. 24 is described in detail above with respect to FIG. 18.

FIG. 25 illustrates an example of a pulse corrected for an inflection artifact. In the diagram shown, the x-axis displays time in TDC counts and the y-axis displays pulse magnitude in arbitrary units. FIG. 25 is described in detail above with respect to FIG. 18.

Figure 26:
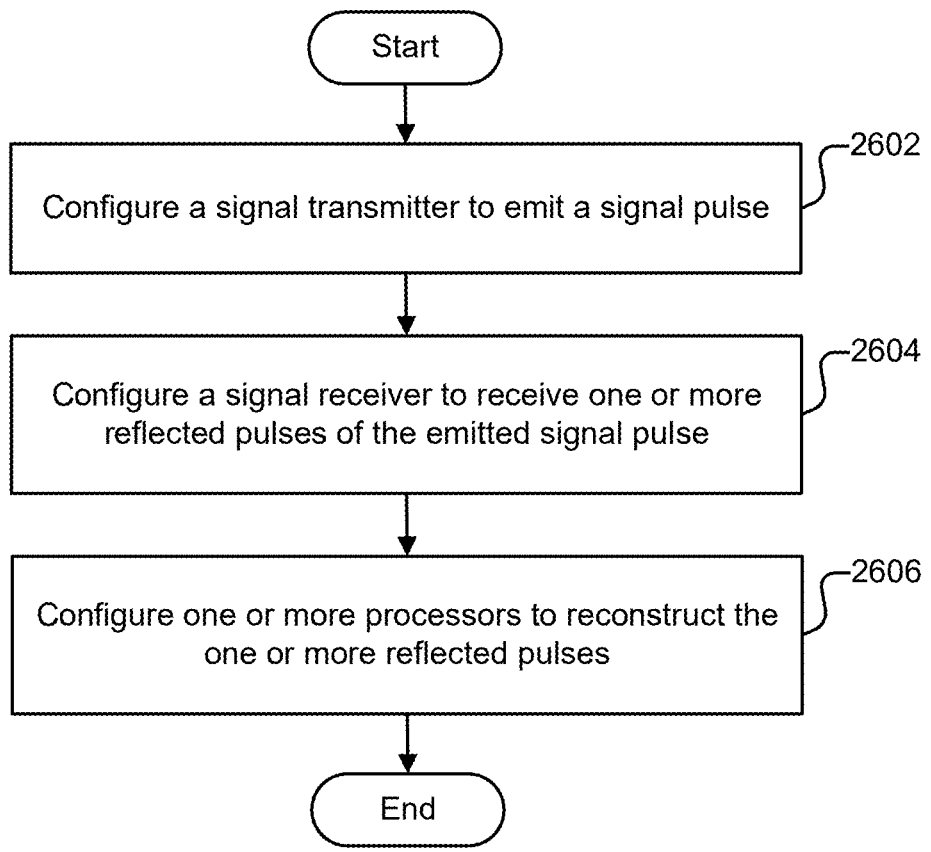
FIG. 26 illustrates an example process for configuring a pulsed ranging system.

FIG. 26 illustrates an example process for configuring a pulsed ranging system. In some embodiments, the pulsed ranging system is a lidar system.

At 2602, a signal transmitter is configured to emit a signal pulse. In some embodiments, the signal transmitter includes light source 110 of FIGS. 1, 3, and/or 6. The signal transmitter may also include a scanner, such as scanner 120 of FIGS. 1, 3, and/or 6.

At 2604, a signal receiver is configured to receive one or more reflected pulses of the emitted signal pulse. In some embodiments, the signal receiver is receiver 140 of FIGS. 1, 3, 6, 7, and/or 8. In some embodiments, the signal receiver includes a plurality of comparators configured to sample the one or more reflected pulses at different intensity threshold levels to determine a group of slices (nodes) representative of the received one or more reflected pulses, wherein each slice of at least a portion of the group of slices identifies a corresponding timing of when at least a portion of the received one or more reflected pulses met a corresponding intensity threshold level. In some embodiments, the signal receiver includes pulse-detection circuit 365 of FIGS. 6, 7, and/or 8.

At 2606, one or more processors are configured to reconstruct the one or more reflected pulses. In some embodiments, the one or more processors are configured to use the determined slices to reconstruct the one or more reflected pulses including by being configured to analyze timing overlaps between a first subgroup of one or more slices of the determined slices at a first threshold level of the different intensity threshold levels and a second subgroup of one or more slices of the determined slices at a second threshold level of the different intensity threshold levels. In some embodiments, the process of FIG. 18 is utilized at least in part to reconstruct the one or more reflected pulses. In some embodiments, the one or more processors include controller 150 of FIGS. 1 and/or 6, computer system 2700 of FIG. 27, and/or one or more other processors.

Figure 27:
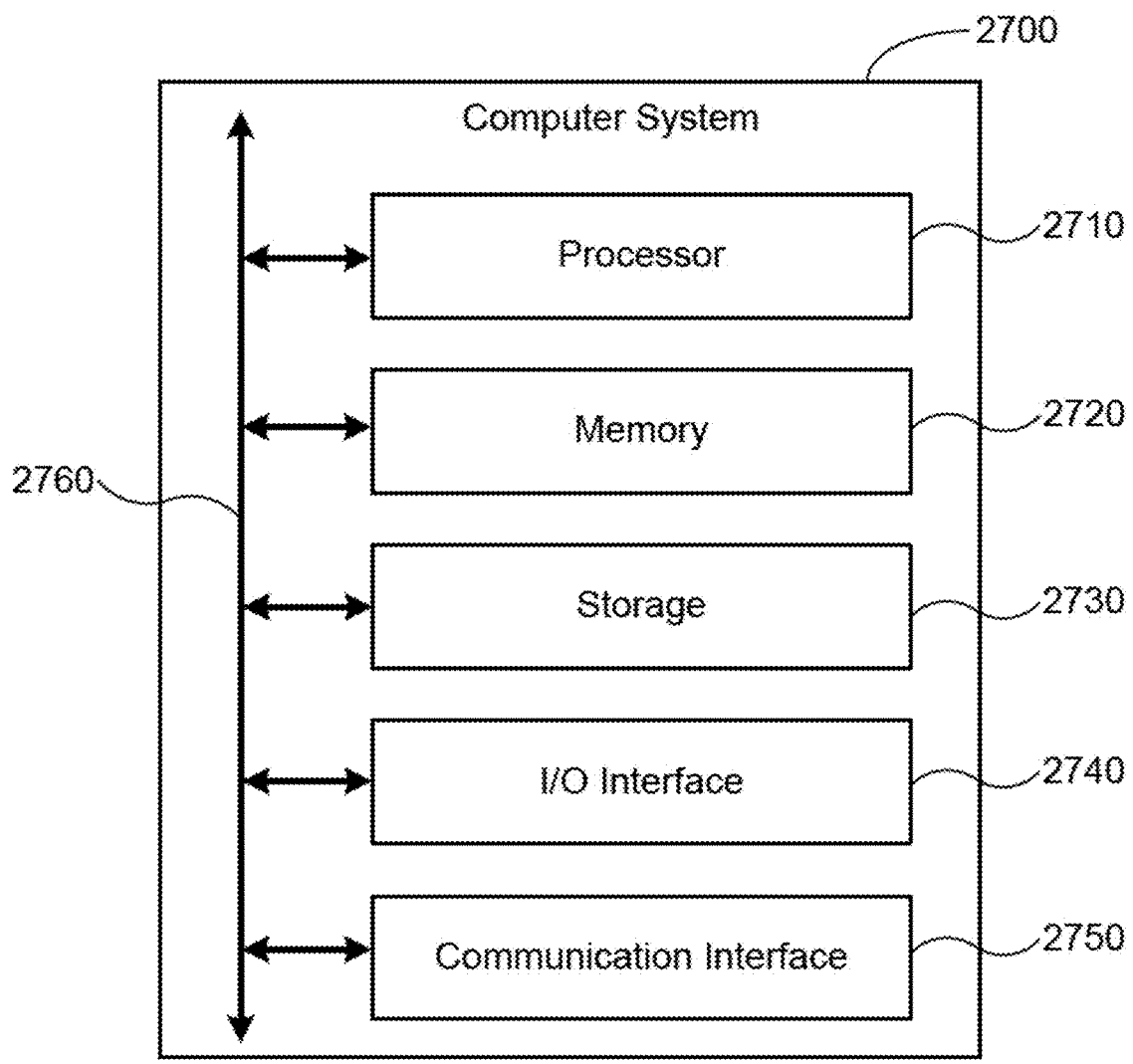
FIG. 27 illustrates an example computer system.

FIG. 27 illustrates an example computer system 2700. In particular embodiments, one or more computer systems 2700 may perform one or more steps of one or more methods described or illustrated herein. In particular embodiments, one or more computer systems 2700 may provide functionality described or illustrated herein. In particular embodiments, software running on one or more computer systems 2700 may perform one or more steps of one or more methods described or illustrated herein or may provide functionality described or illustrated herein. Particular embodiments may include one or more portions of one or more computer systems 2700. In particular embodiments, a computer system may be referred to as a processor, a controller, a computing device, a computing system, a computer, a general-purpose computer, or a data-processing apparatus. Herein, reference to a computer system may encompass one or more computer systems, where appropriate.

Computer system 2700 may take any suitable physical form. As an example, computer system 2700 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 2700 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 2700 may include one or more computer systems 2700; be unitary or distributed; span multiple locations; span multiple machines; span multiple data centers; or reside in a cloud, which may include one or more cloud components in one or more networks. Where appropriate, one or more computer systems 2700 may perform without substantial spatial or temporal limitation one or more steps of one or more methods described or illustrated herein. As an example, one or more computer systems 2700 may perform in real time or in batch mode one or more steps of one or more methods described or illustrated herein. One or more computer systems 2700 may perform at different times or at different locations one or more steps of one or more methods described or illustrated herein, where appropriate.

As illustrated in the example of FIG. 27, computer system 2700 may include a processor 2710, memory 2720, storage 2730, an input/output (I/O) interface 2740, a communication interface 2750, or a bus 2760. Computer system 2700 may include any suitable number of any suitable components in any suitable arrangement.

In particular embodiments, processor 2710 may include hardware for executing instructions, such as those making up a computer program. As an example, to execute instructions, processor 2710 may retrieve (or fetch) the instructions from an internal register, an internal cache, memory 2720, or storage 2730; decode and execute them; and then write one or more results to an internal register, an internal cache, memory 2720, or storage 2730. In particular embodiments, processor 2710 may include one or more internal caches for data, instructions, or addresses. Processor 2710 may include any suitable number of any suitable internal caches, where appropriate. As an example, processor 2710 may include one or more instruction caches, one or more data caches, or one or more translation lookaside buffers (TLBs). Instructions in the instruction caches may be copies of instructions in memory 2720 or storage 2730, and the instruction caches may speed up retrieval of those instructions by processor 2710. Data in the data caches may be copies of data in memory 2720 or storage 2730 for instructions executing at processor 2710 to operate on; the results of previous instructions executed at processor 2710 for access by subsequent instructions executing at processor 2710 or for writing to memory 2720 or storage 2730; or other suitable data. The data caches may speed up read or write operations by processor 2710. The TLBs may speed up virtual-address translation for processor 2710. In particular embodiments, processor 2710 may include one or more internal registers for data, instructions, or addresses. Processor 2710 may include any suitable number of any suitable internal registers, where appropriate. Where appropriate, processor 2710 may include one or more arithmetic logic units (ALUs); may be a multi-core processor; or may include one or more processors 2710.

In particular embodiments, memory 2720 may include main memory for storing instructions for processor 2710 to execute or data for processor 2710 to operate on. As an example, computer system 2700 may load instructions from storage 2730 or another source (such as, for example, another computer system 2700) to memory 2720. Processor 2710 may then load the instructions from memory 2720 to an internal register or internal cache. To execute the instructions, processor 2710 may retrieve the instructions from the internal register or internal cache and decode them. During or after execution of the instructions, processor 2710 may write one or more results (which may be intermediate or final results) to the internal register or internal cache. Processor 2710 may then write one or more of those results to memory 2720. One or more memory buses (which may each include an address bus and a data bus) may couple processor 2710 to memory 2720. Bus 2760 may include one or more memory buses. In particular embodiments, one or more memory management units (MMUs) may reside between processor 2710 and memory 2720 and facilitate accesses to memory 2720 requested by processor 2710. In particular embodiments, memory 2720 may include random access memory (RAM). This RAM may be volatile memory, where appropriate. Where appropriate, this RAM may be dynamic RAM (DRAM) or static RAM (SRAM). Memory 2720 may include one or more memories 2720, where appropriate.

In particular embodiments, storage 2730 may include mass storage for data or instructions. As an example, storage 2730 may include a hard disk drive (HDD), a floppy disk drive, flash memory, an optical disc, a magneto-optical disc, magnetic tape, or a Universal Serial Bus (USB) drive or a combination of two or more of these. Storage 2730 may include removable or non-removable (or fixed) media, where appropriate. Storage 2730 may be internal or external to computer system 2700, where appropriate. In particular embodiments, storage 2730 may be non-volatile, solid-state memory. In particular embodiments, storage 2730 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 2730 may include one or more storage control units facilitating communication between processor 2710 and storage 2730, where appropriate. Where appropriate, storage 2730 may include one or more storages 2730.

In particular embodiments, I/O interface 2740 may include hardware, software, or both, providing one or more interfaces for communication between computer system 2700 and one or more I/O devices. Computer system 2700 may include one or more of these I/O devices, where appropriate. One or more of these I/O devices may enable communication between a person and computer system 2700. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 2740 may include one or more device or software drivers enabling processor 2710 to drive one or more of these I/O devices. I/O interface 2740 may include one or more I/O interfaces 2740, where appropriate.

In particular embodiments, communication interface 2750 may include hardware, software, or both providing one or more interfaces for communication (such as, for example, packet-based communication) between computer system 2700 and one or more other computer systems 2700 or one or more networks. As an example, communication interface 2750 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 2700 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 2700 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 2700 may communicate using fiber-optic communication based on 100 Gigabit Ethernet (100 GbE), 10 Gigabit Ethernet (10 GbE), or Synchronous Optical Networking (SONET). Computer system 2700 may include any suitable communication interface 2750 for any of these networks, where appropriate. Communication interface 2750 may include one or more communication interfaces 2750, where appropriate.

In particular embodiments, bus 2760 may include hardware, software, or both coupling components of computer system 2700 to each other. As an example, bus 2760 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 2760 may include one or more buses 2760, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 2700. As an example, computer software may include instructions configured to be executed by processor 2710. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blu-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, certain features described herein in the context of separate implementations may also be combined and implemented in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately," "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%. The term "substantially constant" refers to a value that varies by less than a particular amount over any suitable time interval. For example, a value that is substantially constant may vary by less than or equal to 20%, 10%, 1%, 0.5%, or 0.1% over a time interval of approximately $10^4$ s, $10^3$ s, $10^2$ s, 10 s, 1 s, 100 ms, 10 ms, 1 ms, 100 µs, 10 µs, or 1 µs. The term "substantially constant" may be applied to any suitable value, such as for example, an optical power, a pulse repetition frequency, an electrical current, a wavelength, an optical or electrical frequency, or an optical or electrical phase.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a signal transmitter configured to emit a signal pulse;
   a signal receiver configured to receive one or more reflected pulses of the emitted signal pulse, wherein the signal receiver includes a plurality of comparators configured to sample the one or more reflected pulses at different intensity threshold levels to determine a group of slices representative of the received one or more reflected pulses, wherein each slice of at least a portion of the group of slices identifies a corresponding timing of when at least a portion of the received one or more reflected pulses met a corresponding intensity threshold level; and
   one or more processors configured to use the determined slices to reconstruct the one or more reflected pulses including by being configured to:
      compute a cost matrix based on analyzing timing overlaps between a first subgroup of one or more slices of the determined slices at a first threshold level of the different intensity threshold levels and a second subgroup of one or more slices of the determined slices at a second threshold level of the different intensity threshold levels; and
      reconstruct the one or more reflected pulses based on the computed cost matrix.

2. The system of claim 1, wherein the first subgroup of one or more slices at the first threshold level and the second subgroup of one or more slices at the second threshold level comprise adjacent layers of slices that do not include slices at any threshold level between the first threshold level and the second threshold level.

3. The system of claim 1, wherein the one or more processors are configured to analyze timing overlaps between the first subgroup of one or more slices and the second subgroup of one or more slices including by being configured to determine an overlap value associated with at least one slice formed by combining a slice from the first subgroup of one or more slices and a slice from the second subgroup of one or more slices.

4. The system of claim 3, wherein the overlap value is a binary value that indicates whether a specified proportion of overlap exists.

5. The system of claim 3, wherein the one or more processors are further configured to analyze timing overlaps between the first subgroup of one or more slices and the second subgroup of one or more slices including by being configured to analyze patterns of overlap values in a matrix including at least the determined overlap value.

6. The system of claim 5, wherein the patterns of overlap values are indicative of reflected pulse artifacts including one or more of the following: a pulse realignment artifact, a fused pulse artifact, a floating pulse artifact, an inflection artifact, or a hardware-related artifact.

7. The system of claim 6, wherein the reflected pulse artifacts include fused pulses and pulses missing one or more slices.

8. The system of claim 1, wherein the one or more processors are further configured to use the determined slices to reconstruct the one or more reflected pulses including by being configured to determine and restore incomplete pulses based at least in part on the analyzed timing overlaps.

9. The system of claim 1, wherein the one or more processors are further configured to use the determined slices to reconstruct the one or more reflected pulses including by being configured to determine and split fused pulses based at least in part on the analyzed timing overlaps.

10. The system of claim 1, wherein the one or more processors are further configured to analyze a number of timing overlaps that are in addition to the timing overlaps associated with the first subgroup of one or more slices and the second subgroup of one or more slices.

11. The system of claim 10 wherein the number of timing overlaps that are in addition to the timing overlaps associated with the first subgroup of one or more slices and the second subgroup of one or more slices is based on a total number of layers of slices in the one or more reflected pulses.

12. The system of claim 1, wherein the one or more processors are further configured to use the determined slices to reconstruct the one or more reflected pulses including by being configured to realign the determined slices among the one or more reflected pulses.

13. The system of claim 1, wherein the one or more processors are further configured to use the determined slices to reconstruct the one or more reflected pulses including by being configured to detect an inflection fused pulse pattern comprising two fused pulses in which the inflection fused pulse pattern rises monotonically from a baseline of the inflection fused pulse pattern to a peak of the inflection fused pulse pattern.

14. The system of claim 13, wherein the one or more processors are further configured to use the determined slices to reconstruct the one or more reflected pulses including by being configured to split the inflection fused pulse pattern.

15. The system of claim 1, wherein the signal transmitter includes a light source.

16. The system of claim 1, wherein the emitted signal pulse includes a laser pulse.

17. The system of claim 1, wherein the signal transmitter and the signal receiver are included in a vehicle.

18. The system of claim 1, wherein the plurality of comparators are connected in parallel to an amplifier configured to output a voltage signal.

19. A method, comprising:

configuring a signal transmitter to emit a signal pulse;

configuring a signal receiver to receive one or more reflected pulses of the emitted signal pulse, wherein the signal receiver includes a plurality of comparators configured to sample the one or more reflected pulses at different intensity threshold levels to determine a group of slices representative of the received one or more reflected pulses, wherein each slice of at least a portion of the group of slices identifies a corresponding timing of when at least a portion of the received one or more reflected pulses met a corresponding intensity threshold level; and configuring one or more processors to use the determined slices to reconstruct the one or more reflected pulses including by: computing a cost matrix based on analyzing timing overlaps between a first subgroup of one or more slices of the determined slices at a first threshold level of the different intensity threshold levels and a second subgroup of one or more slices of the determined slices at a second threshold level of the different intensity threshold levels, and reconstructing the one or more reflected pulses based on the computed cost matrix.

20. A computer program product embodied in a non-transitory computer readable medium and comprising computer instructions for:

causing a signal transmitter to emit a signal pulse;

causing a signal receiver to receive one or more reflected pulses of the emitted signal pulse, wherein the signal receiver includes a plurality of comparators configured to sample the one or more reflected pulses at different intensity threshold levels to determine a group of slices representative of the received one or more reflected pulses, wherein each slice of at least a portion of the group of slices identifies a corresponding timing of when at least a portion of the received one or more reflected pulses met a corresponding intensity threshold level; and using the determined slices to reconstruct the one or more reflected pulses including by: computing a cost matrix based on analyzing timing overlaps between a first subgroup of one or more slices of the determined slices at a first threshold level of the different intensity threshold levels and a second subgroup of one or more slices of the determined slices at a second threshold level of the different intensity threshold levels, and reconstructing the one or more reflected pulses based on the computed cost matrix.

* * * * *